US007110265B2

(12) United States Patent
Liu et al.

(10) Patent No.: US 7,110,265 B2
(45) Date of Patent: Sep. 19, 2006

(54) NON-ISOLATED DC-DC CONVERTERS WITH DIRECT PRIMARY TO LOAD CURRENT

(75) Inventors: Yan-Fei Liu, Kingston (CA); Sheng Ye, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

(21) Appl. No.: 10/729,971

(22) Filed: Dec. 9, 2003

(65) Prior Publication Data

US 2004/0114397 A1 Jun. 17, 2004

Related U.S. Application Data

(60) Provisional application No. 60/431,740, filed on Dec. 9, 2002.

(51) Int. Cl.
*H02M 3/335* (2006.01)
(52) U.S. Cl. ........................................ 363/16
(58) Field of Classification Search ............. 363/15, 363/16, 17, 20, 21.04, 71
See application file for complete search history.

(56) References Cited

U.S. PATENT DOCUMENTS

| | | | |
|---|---|---|---|
| 4,695,933 A | 9/1987 | Nguyen et al. | |
| 5,875,103 A | 2/1999 | Bhagwat et al. | |
| 6,163,466 A | 12/2000 | Davila, Jr. et al. | |
| 6,388,898 B1 | 5/2002 | Fan et al. | |
| 6,392,902 B1 | 5/2002 | Jang et al. | |
| 6,469,915 B1 | 10/2002 | Huang et al. | |
| 6,757,184 B1 * | 6/2004 | Wei et al. | 363/71 |
| 2002/0118000 A1 | 8/2002 | Xu et al. | |
| 2004/0246748 A1 * | 12/2004 | Xu et al. | 363/17 |

OTHER PUBLICATIONS

Peng Xu, Fred C Lee, Jia Wei; The Coupled-Buck Converter for 12V VRM . . . ; VTIP Disclosure No. 01-002; Virginia Tech Intellectual Properties, Inc.; Blacksburg, Virginia.
Albert M. Wu, Seth R. Sanders: An Active Clamp Circuit for Voltage Regulation Module . . . ; IEEE Transactions On Power Electronics, vol. 16 No. 5 Sep. 2001 pp. 623-634.
Yuri Panov, Milan M. Jovanovic; Design Considerations for 12-V/ 1.5V, 50A Voltage Regulator . . . ; IEEE Transactions On Power Electronics, vol. 16 No. 6 Nov. 2001 pp. 776-783.
Intel; VRM 9.1 DC-DC Converter Design Guidelines; Intel Corporation; Order No. 298646-001; Jan. 2002.
Intel; VRM 9.0 DC-DC Converter Design Guidelines; Intel Corporation; Order No. 249205-004; Apr. 2002.

(Continued)

*Primary Examiner*—Adolf Berhane
(74) *Attorney, Agent, or Firm*—Dowell & Dowell, P.C.

(57) ABSTRACT

DC—DC converters have high side and rectifier circuits, and output capacitor. High side circuit connects between input voltage and output voltage, and has primary winding and auxiliary section that operate transformer properly. Auxiliary may have switches or combination of switches and capacitors. High side circuit converts electrical into magnetic energy through transformer primary, which is then transferred to output through rectifier circuit. It also transfers energy directly to output voltage. Converters have high efficiency, fast dynamic response and high current output. Converters can have large duty cycle and large input voltage and output voltage conversion ratio. High side circuit can be half-bridge, full-bridge or forward converter. Rectifier uses inductors on either side of the secondary, and diodes or synchronous rectifiers, to rectify output voltage. Multi-phase interleaved circuits utilize shared switches to reduce size. High side circuit can utilize resonant tank to decrease switching losses in auxiliary.

66 Claims, 74 Drawing Sheets

OTHER PUBLICATIONS

R.L. Steigerwald, "High frequency resonant transistor DC-DC converters", IEEE Transactions on Industrial Electronics, vol. 31, pp. 181-191, May 1984.

F.S. Tsai, P. Materu, and F.C. Lee, "Constant-frequency, clamped-mode resonant converters", IEEE Transactions on Power Electronics, vol. 3, No. 4, pp. 460-473, Oct. 1988.

Y.F. Liu, P.C. Sen, "Source reactance lossless switch ..", IEEE Transactions on Circuits and Systems—I, Fundamental Theory and Applications, vol. 43, No. 4, pp. 301-312, Apr. 1996.

Jia Wei et al; "A High Efficiency Topology for 12V VRM—Push-Pull Buck and Its Integrated Magnetics Implementations", APEC '02 Mar. 10, 2003, pp. 679-685, vol. 2, IEEE: NY, USA.

Peng Xu et al: "Investigation of Candidate Topologies for 12V VRM", APEC '02, Mar. 10, 2003, pp. 686-692, vol. 2, IEEE: NY, USA.

Yan-Fei Liu, and Paresh C. Sen, New Class-E DC-DC Converter Topologies with Constant Switching Frequency, IEEE Transactions on Industry Applications, vol. 32, No. 4, Jul./Aug. 1996, pp. 961-969, IEEE, USA.

Yan-Fei Liu, and Paresh C. Sen, A Novel Resonant Converter Topology for DC-to-DC Power Supply, IEEE Transactions on Aerospace and Electronic Systems, vol. 31, No. 4, Oct. 1995, pp. 1301-1313, IEEE, USA.

Yan-Fei Liu, and Paresh C. Sen, Source Reactance Lossless Switch (SRLS) for Soft-Switching Converters with Constant Switching Frequency, IEEE Transactions on Circuits and Systems—I: Fundamental Theory and Applications, vol. 43, No. 4, Apr. 1996, pp. 301-312, IEEE, USA.

* cited by examiner

NON-ISOLATED DC-DC CONVERTERS WITH DIRECT PRIMARY TO LOAD CURRENT

CROSS REFERENCE TO RELATED APPLICATIONS

This application claims priority from and is entitled to the benefit of the filing date of U.S. Provisional Patent Application No. 60/431,740 filed 9 Dec. 2002 under the same title and by the same inventors.

FIELD OF THE INVENTION

The invention relates to DC—DC converters. More particularly, it relates to such converters for low voltage central processing unit applications.

BACKGROUND OF THE INVENTION

Computers are widely used both in our personal life and in our work. The heart of the computer is the central processing unit (CPU), which performs all the numerical calculation needed for today's ever demanding operation. In order to increase the calculation speed of the CPU, and, thus the speed of the computer, the voltage required to power the CPU is becoming lower and lower. At the same time, the current that the CPU draws is becoming higher and higher. For example, the next generation CPU will require supply voltage of less than 1V and current of more than 100A. The current view is that the required CPU supply voltage is from 0.8V to 1.6V for the next generation CPU.

For the CPU in a high-end server, the type of computer used to direct our Internet traffic and data transfer, the CPU's current requirement is even larger. The current for a server CPU could be up to 500A.

As an example, in North America, power for a personal computer is typically drawn from a 120V AC wall outlet. This AC voltage is converted into a 12V DC voltage by an AC-to-DC converter. The 12V DC is distributed to a motherboard where the CPU is located. This 12V DC voltage cannot power the CPU directly. A DC—DC converter (often referred to as a voltage regulator module or VRM) is used to convert the 12V DC into the lower voltage required by the CPU. This power system architecture is currently preferred from a performance and cost point of view.

Another requirement of CPU powering is fast dynamic response. During a time when little calculation is required, the CPU will draw very low current. For the time when a lot of calculation is required, the CPU will draw large current. The transition between the low current and large current is very fast. The current change rate can be as high as 10,000A per microsecond. Therefore, the converter should have very fast dynamic response to meet this requirement.

If the response speed of the converter is not fast enough, the voltage across the CPU will have significant overshoot during the transition from large CPU current to low CPU current because an inductor is typically used in the converter. This voltage overshoot could cause damage to the CPU. Similarly, the voltage across the CPU will have significant undershoot during the transition from low CPU current to large CPU current. If the voltage is too low, the CPU may not operate properly.

In addition, the power loss for the converter should also be small in order to reduce the temperature rise of the semiconductors used to implement the converter.

Referring to FIG. 1, a Buck converter is typically used to convert incoming 12V into low output voltage such as 1.5V. The output voltage of a Buck converter is calculated as:

$$Vout = D * Vin$$

Where Vout is the output voltage and Vin is the input voltage. D is the duty cycle and is defined as:

$$D = Ton/Ts$$

Where Ton is the time period during which the top switch Q1 is conducting, and Ts is the switching period of Q1.

In order to achieve Vin=12V to Vout=0.8V conversion, the required duty cycle for Buck converter is D=0.8/12=7%. It is noted that a small duty cycle such as 7% is not optimal for the design and operation of a Buck converter when the switching time of the MOSFET ("metal-oxide semiconductor field-effect transistor") is considered. For example, for a typical MOSFET, the turn on time is around 50 ns and the turn off time is around 100 ns. This means that the MOSFET will be conducting for at least 150 ns regardless of the control signal. If we assume the switching frequency is 300 KHz, the switching period is 3.33 µs. The switching time of 150 ns is equivalent to 150 ns/3.33 µs=4.5%. This means that we only have control of about 2.5% (7%–4.5%) of conducting time of the MOSFET. Considering the delay time of the controller, it is very difficult to design an actual implementation. The compromise is to reduce the switching frequency to a lower level, such as 200 KHz. However, lower switching frequency will also lower the dynamic response, which is a very important performance measurement for DC—DC converters.

In addition, operating at a very small duty cycle has another detrimental impact to the dynamic response. During the transition from low CPU current to high CPU current, the inductor current should be ramped up. This can be done by increasing the duty cycle from 7% (take the above example) to 100% (maximum). The duty cycle has 93% change, which is very beneficial to handle this transition. However, during the transition from high CPU current to low CPU current, the inductor current should be ramped down. The only way to achieve this is to reduce the duty cycle. Nevertheless, the duty cycle can only be reduced from 7% to 0%. The duty cycle has only 7% change, which results in poor dynamic response.

To improve the dynamic response, it is desirable to select higher switching frequency for the converter. It is also desirable for the converter to operate at around 50% duty cycle.

Referring to FIG. 2, in order to improve the dynamic response an interleaved Buck converter can be used, such as a four-phase interleaved Buck converter. By interleaving, the equivalent ripple frequency is 4 times the switching frequency of each phase. For example, if the switching frequency of each Buck converter is 200 KHz, the equivalent switching frequency for four-phase interleaved Buck converter will be 800 KHz. Another benefit of interleaving is that the ripple current through the output capacitor and input capacitor is also significantly reduced. However, each Buck converter still operates at very small duty cycle, which is not desirable.

SUMMARY OF THE INVENTION

In a first aspect the invention provides a DC—DC converter for use with a DC power source having a DC voltage across a first voltage source output and a second voltage source output and with a load. The converter includes an input for accepting the DC voltage, the input having a first voltage input and a second voltage input. It also includes an output for outputting a converter DC voltage, the output having a first voltage output and a second voltage output. Furthermore it includes a high side circuit including a first primary winding of a first transformer and an auxiliary section, the high side circuit connected between the first voltage input and the second voltage output. It also includes a rectifier circuit having a first secondary winding of the first transformer, the rectifier circuit connected between the first voltage output and the second voltage output. There is also an output capacitor connected between the first voltage output and the second voltage output and across the rectifier circuit.

In this first aspect an output converter DC voltage between the first voltage output and the second voltage output has the same polarity as a DC voltage input between the first voltage input and the second voltage input, The auxiliary section is for causing the first transformer to transfer power from the first primary winding to the first secondary winding and to operate without saturation. The high side circuit has a high side circuit output connected such that current flowing through the first primary winding is directed between the high side circuit output and the first voltage output. The rectifier circuit is for converting output of the first secondary winding into a one-direction waveform and converting the one-direction waveform into a DC voltage. The output capacitor is for filtering the converted DC voltage.

The auxiliary section may include switches for repeatedly connecting and disconnecting the primary winding from the input, and allowing for resetting of the first transformer. The auxiliary section may have a combination of switches and capacitors. Alternatively, the auxiliary section may have four switches. Each switch may be a MOSFET.

Alternatively, the auxiliary section may have a first switch connected between a first side of the first primary winding and the first voltage input, a second switch connected between a second side of the first primary winding and the first voltage input, a third switch connected between the first side of the first primary winding and the high side circuit output, and a fourth switch connected between the second side of the first primary winding and the high side circuit output. Each switch may have an input for a gate drive signal for controlling the operation of the switch. The gate drive signals may repeatedly turn on and turn off the first and fourth switch as well as turn on and turn off the second and third switch.

Alternatively, the auxiliary section may have a first switch connected between a first side of the first primary winding and the first voltage input, a first capacitor connected between a second side of the first primary winding and the first voltage input, a second switch connected between the first side of the first primary winding and the high side circuit output, and a second capacitor connected between the second side of the first primary winding and the high side circuit output. Each switch may have an input for a gate drive signal for controlling the operation of the switch. The converter may include gate drive signals adapted to repeatedly turn on and turn off the first switch and second switch, whereby the first transformer can be reset from the capacitors. The capacitors may be large enough that the voltage across the capacitors will not change significantly during normal operation of the converter.

Alternatively, the auxiliary section may have a first switch connected between a first side of the first primary winding and the first voltage input, a first diode connected between a second side of the first primary winding and the first voltage input for forward conduction from the second side of the first primary winding to the first voltage input, a second switch connected between the second side of the first primary winding and the high side circuit output, and a second diode connected between the first side of the first primary winding and the high side circuit output for forward conduction from the high side circuit output to the first side of the first primary winding. Each switch may have an input for a gate drive signal for controlling the operation of the switch. The converter may have gate drive signals adapted to repeatedly turn on and turn off the first switch and second switch, whereby the first transformer can be reset by current flowing through the first and second diodes.

Alternatively, the auxiliary section may have a first side of the first primary winding connected to the first voltage input, the first switch connected between the first side of the first primary winding and the first side of the first capacitor, the second side of the first capacitor connected between the second side of the first switch and the second side of the first primary winding, a second switch connected between the second side of the first primary winding and the high side circuit output. Each switch may have an input for a gate drive signal for controlling the operation of the switch. The converter may have gate drive signals adapted to repeatedly turn on the first switch, while turning off the second switch, and turn off the first switch, while turning on the second switch, whereby the first transformer can be reset from the first capacitor.

The rectifier circuit may have a combination of inductors and switches, wherein the switches are for converting alternating voltage in the first secondary winding into pulsating one-direction voltage and the inductors are for converting pulsating one-direction voltage into DC voltage. Alternatively, the rectifier circuit may have a combination of inductors and diodes, wherein the diodes are for converting pulsating alternating voltage in the first secondary winding into pulsating one-direction voltage and the inductors are for converting pulsating one-direction voltage into DC voltage.

Alternatively, the rectifier circuit may have a first rectifier switch connected between the second voltage output and a first side of the first secondary winding, a second rectifier switch connected between a second side of the first secondary winding and the second voltage output, a first inductor connected between the first side of the first secondary winding and the first voltage output, and a second inductor connected between the second side of the first secondary winding and the first voltage output. Each switch may have an input for a gate drive signal for controlling the operation of the switch. The converter may have gate drive signals adapted to switch the first and second rectifier switches to convert bi-directional AC voltage at the first secondary winding into one-direction pulsating voltage.

Alternatively, the rectifier circuit further may have a first rectifier switch connected between the second voltage output and a first side of the first secondary winding, a second rectifier switch connected between a second side of the first secondary winding and the second voltage output, and a first inductor connected between the first side of the first secondary winding and the first voltage output not in series with the second rectifier switch.

Alternatively, the rectifier circuit may have first and second rectifier diodes and a first inductor, and the first diode is connected between a first side of the first secondary winding and the first inductor, and the inductor is further connected between the first diode and the first voltage output, for forward conduction from the secondary winding through the inductor, and the second diode is connected between (a) a point between the second side of the first secondary winding and the second voltage output and (b) a point between the first inductor and first diode, also for forward conduction from the secondary winding through the inductor. The first and second diodes, the first secondary and second secondary windings and the inductor may be within a first rectifier section, and the rectifier circuit also includes a second rectifier section similar to the first rectifier section, and the first and second rectifier sections are connected in parallel with one another and with the output capacitor and the output Alternatively, the rectifier circuit may have a second secondary winding, first and second rectifier diodes and a first inductor, and a second side of the first secondary winding is connected to a first side of the second secondary winding and the second voltage output, and the first diode is connected between a first side of the first secondary winding and the first inductor, and the inductor is further connected between the first diode and the first voltage output, for forward conduction from the secondary winding through the inductor, and the second diode is connected between (a) a point between a second side of the second secondary winding and (b) a point between the first inductor and first diode, also for forward conduction from the secondary winding through the inductor. The first and second rectifier switches, the first secondary and second secondary windings and the inductor may be within a first rectifier section, and the rectifier circuit further comprises a second rectifier section similar to the first rectifier section, and the first and second rectifier sections are connected in parallel with one another and with the output capacitor and the output.

Alternatively, the rectifier circuit may have a second secondary winding, first and second rectifier switches and a first inductor, and a second side of the first secondary winding is connected to a first side of the second secondary winding and the inductor which is further connected to the first voltage output, and the first rectifier switch is connected between a first side of the first secondary winding and the second voltage output, and the second rectifier switch is connected between a second side of the second secondary winding and the second voltage output. The first and second rectifier switches, the first secondary winding and the first and second inductors may be within a first rectifier section, and the rectifier circuit also includes a second rectifier section similar to the first rectifier section, and the first and second rectifier sections are connected in parallel with one another and with the output capacitor and the output.

The converter may have a second converter similar to the first converter, wherein the two converters are connected in parallel with one another at their respective inputs and outputs. The output capacitors of the two converters may be combined as a single physical capacitor. The two converters may have interleaved gate drive signals, whereby current ripple incoming to the output capacitor is reduced, allowing for reduction in the size of the output capacitor.

The converter may have a second transformer and the high side circuit may have a second primary winding of the second transformer, and first and second second primary switches, wherein the first second primary switch is connected between the first voltage input and a first side of the second primary winding, and the second second primary switch is connected between the first side of the second primary winding and the high side circuit output, and a second side of the second primary winding is connected to a side of the first primary winding, and the rectifier circuit may have a second rectifier circuit similar to and connected in parallel with the first rectifier circuit, wherein the second rectifier circuit includes a second second rectifier secondary winding of the second transformer. The second primary switches may have input for gate drive signals for operating the second primary winding out of phase with the first primary winding.

The converter may have a second transformer and the high side circuit may have a second primary winding of the second transformer, and first and second second primary switches, wherein the first second primary switch is connected between the first voltage input and a first side of the second primary winding, and the second second primary switch is connected between the first side of the second primary winding and the high side circuit output, and a second side of the second primary winding is connected to a side of the first primary winding, and the rectifier circuit may have a second rectifier secondary winding, a second rectifier inductor and a second rectifier switch, wherein a first side of the second rectifier secondary winding is connected to a first side of the first secondary winding and the second rectifier switch is connected between a second side of the second secondary winding and the second voltage output, and the inductor is connected between the second side of the second secondary winding and the high side circuit output, not in series with the second rectifier switch. The second primary switches may have inputs for gate drive signals for operating the second primary winding out of phase with the first primary winding, and the first and second rectifier circuit have inputs for gate drive signals for operating the rectifier circuit secondary windings phase shifted from one another.

The converter may have a second transformer and a third transformer, and the high side circuit may have a second primary winding of the second transformer, and first and second second primary switches, wherein the first second primary switch is connected between the first voltage input and a first side of the second primary winding, and the second second primary switch is connected between the first side of the second primary winding and the high side circuit output, and a second side of the second primary winding is connected to a side of the first primary winding, and the rectifier circuit may have a second rectifier circuit and a third rectifier circuit each similar to and connected in parallel with the first rectifier circuit, wherein the second rectifier circuit includes a second second rectifier secondary winding of the second transformer and the third rectifier circuit includes a third third rectifier secondary winding of the third transformer.

The second primary switches may have input for gate drive signals for operating the second primary winding out of phase with the first primary winding, and no additional drive components are added for the third primary winding, wherein the converter has gate drive inputs for operating the third primary winding partially in phase with the first primary winding and partially in phase with the second primary winding.

The first voltage input may be for accepting a DC potential that is positive when compared to a DC potential for acceptance by the second voltage input. The DC potential of the first voltage output may be positive when compared to the DC potential of the second voltage output.

The input voltage of the converter may be within a range of 10.8 volts DC to 13.2 volts DC, and the out put voltage is within a range of 0.8 volts DC to 1.6 volts DC.

The duty cycle of single phase and two-phase converters may be between 40% and 60%. The duty cycle may be approximately 50%. The duty cycle of three-phase converters may be approximately 33⅓%.

The converter may have a second high side circuit similar to the first high side circuit, connected in parallel with the first high side circuit, and a second rectifier circuit connected in parallel with the first rectifier circuit. The converter may have inputs for drive signals to operate the first high side circuit and the first rectifier circuit out of phase with the second high side circuit and the second rectifier circuit, respectively. The converter may have gate drive signals for operating the first high side circuit and the first rectifier circuit out of phase with the second high side circuit and the second rectifier circuit, respectively.

The converter may have a current sensor in series with the high side circuit. Current sensed at the current sensor may be for use in determining the timing of gate drive signals for operating the high side circuit. The current sensed at the current sensor may also be used to make current sharing between two or more parallel connected converters.

The output of the first secondary winding may be a pulsating voltage and the one-direction waveform may be a one-direction voltage.

The high side circuit may have a resonant tank.

The resonant tank may have a first capacitor in parallel with the first primary winding and a first inductor in series with the first primary winding between the first primary winding and the auxiliary section.

The resonant tank further may also have a second capacitor in series with the first inductor between the first primary winding and the auxiliary section.

The resonant tank may also have a second inductor in parallel with the first primary winding and the first capacitor.

The resonant tank may have a first inductor and a first capacitor in series with one another between the first primary winding and the auxiliary section. In this case, the rectifier circuit may have a duty cycle and the duty cycle may be altered to change the output voltage of the converter.

For a resonant tank converter, the rectifier circuit may have a full-bridge rectifier. In such case, switches within the rectifier circuit may be controlled by phase control to regulate output voltage.

The rectifier circuit may have a half-bridge rectifier.

Switches in the resonant tank converter may be controlled by switching frequency control to regulate output voltage.

The auxiliary section may be a full-bridge auxiliary section. In such case for a resonant tank converter, switches within the auxiliary section may be controlled by phase shift control to regulate output voltage.

In another aspect the invention provides a method of operating a converter of the type described above including the steps of driving the auxiliary section to cause the first transformer to transfer power from the first primary winding to the first secondary winding, while at the same time driving the auxiliary section to cause the transformer to operate without saturation.

Other aspects of the invention, including other methods employing converters, will be evident from the figures and detailed description herein.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 16 is a schematic diagram of an equivalent circuit for the converter of FIG. 15 when Q1, Q4 and Q6 are on;

FIG. 17 is a schematic diagram of an equivalent circuit for the converter of FIG. 15 when Q1, Q2, Q3 and Q4 are off and Q5, Q6 are on;

FIG. 18 is a schematic diagram of an equivalent circuit for the converter of FIG. 15 when Q2, Q3 and Q5 are on;

FIG. 41 is a schematic diagram of an equivalent circuit for the converter of FIG. 40 when Q1, Q4 and Q6 are on;

FIG. 42 is a schematic diagram of an equivalent circuit for the converter of FIG. 40 when Q3 and Q4 are on;

FIG. 43 is a schematic diagram of an equivalent circuit for the converter of FIG. 40 when Q2 and Q4 are on;

DETAILED DESCRIPTION OF THE PREFERRED EMBODIMENT

Figure 1:
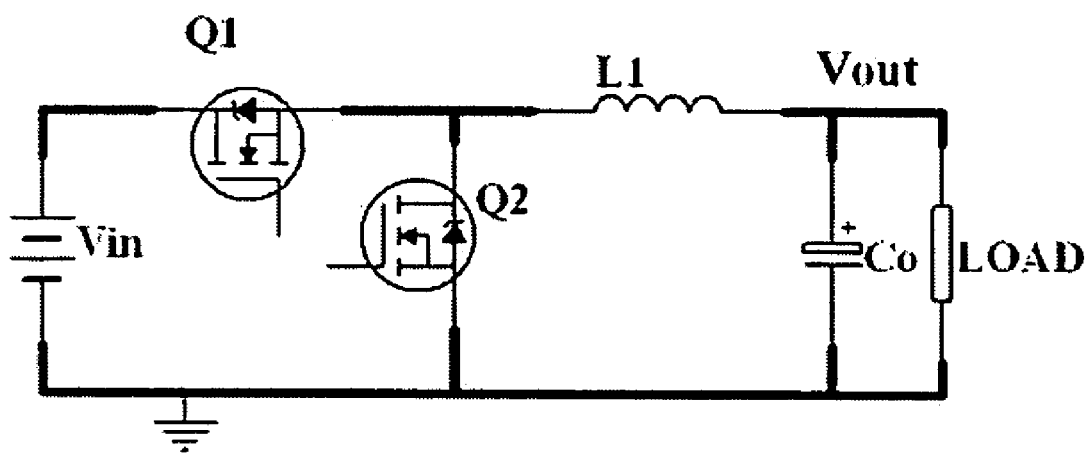
FIG. 1 is a schematic diagram of a Buck converter of known configuration.
Figure 2:
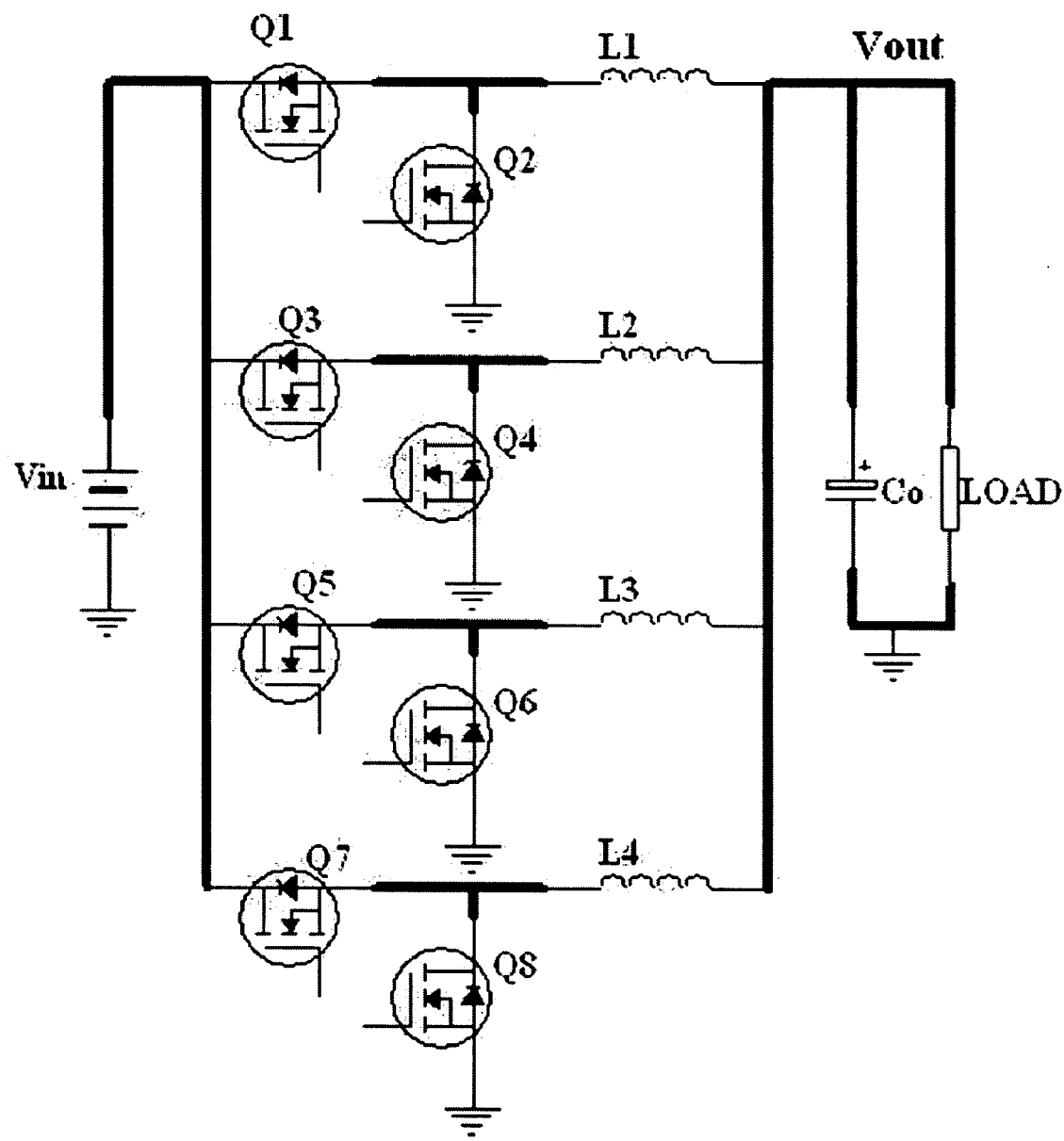
FIG. 2 is a schematic diagram of a four-phase interleaved Buck converter of known configuration.
Figure 3:
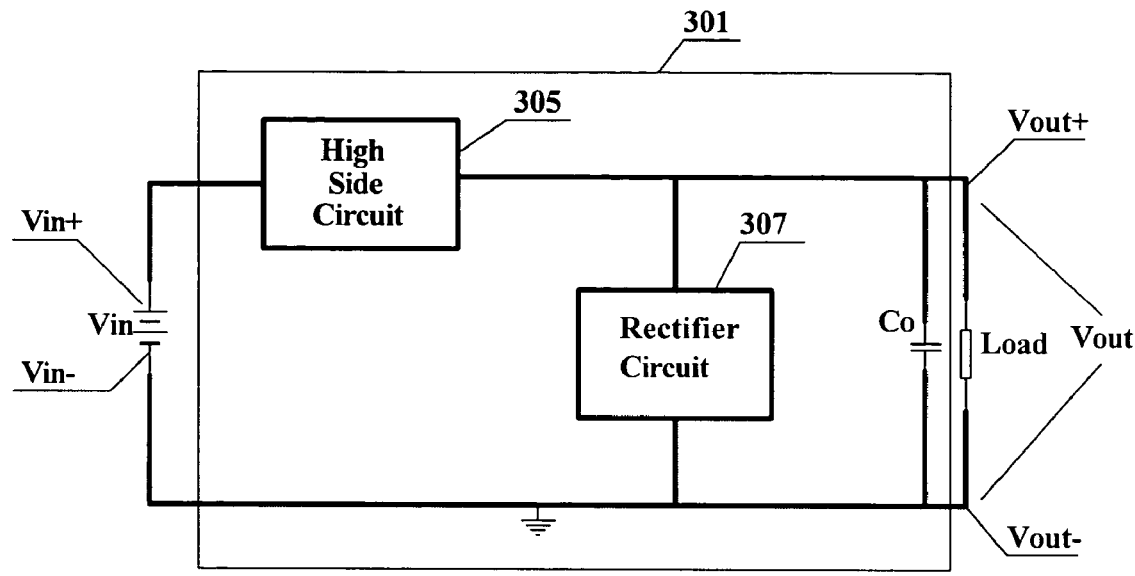
FIG. 3 is a schematic diagram of a non-isolated DC converter in accordance with a preferred embodiment of the present invention.

Referring to FIG. 3, a non-isolated DC converter 301 (outlined in dashed lines) consists of three blocks: high side circuit 305, rectifier circuit 307 and output filter capacitor Co. The high side circuit 305 connects directly between positive point $V_{in+}$ of the input voltage $V_{in}$ and the positive point $V_{out+}$ of the output $V_{out}$. The high side circuit 305 is therefore not isolated from the rectifier circuit 307 and, thus, the converter is "non-isolated".

As will be discussed, the high side circuit 305 includes one or more transformer primary winding(s) and an auxiliary section that will operate the transformer(s) properly. This auxiliary section may consist of switches (such as MOSFET, BJT ("bipolar junction transistor"), etc). This auxiliary section may also consist of a combination of switches and capacitors. The function of this auxiliary section is to make the transformer operate properly. The term "operate properly" means that the transformer will not saturate and the power can be transferred from each primary winding to its secondary winding(s) efficiently. Various examples of auxiliary sections, such as full-bridge, half-bridge, and forward will be described herein.

The high side circuit 305 serves two functions. One is that it converts the electrical energy into magnetic energy through the transformer primary winding(s). The other function is to transfer energy directly to the output voltage $V_{out}$.

The converter 301 can be used to meet the stringent power requirement of the next generation CPU. The circuit topologies described herein are able to achieve high efficiency, fast dynamic response and provide high current to the CPU.

Also to be described are methods of operating the non-isolated DC converter 301. Using these methods, the non-isolated DC converter will operate with a large duty cycle and at the same time, have a large input voltage to output voltage conversion ratio.

Figure 4:
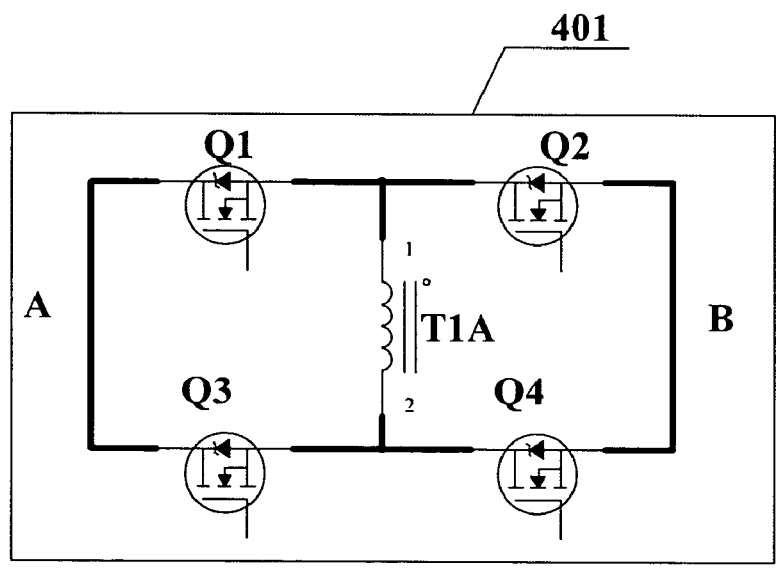
FIG. 4 is a schematic diagram of one embodiment of a high side circuit for the converter of FIG. 3.

Referring to FIG. 4, one embodiment 401 of the high side circuit 305 consists of one primary winding of transformer T1A and four MOSFETs Q1, Q2, Q3, Q4. The left point A of the high side circuit 401 is connected to Vin and the right point B of the high side circuit 401 is connected to Vout.

Figure 5:
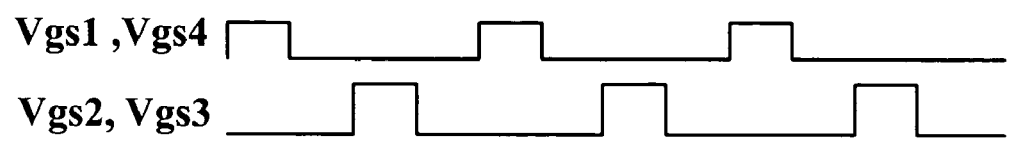
FIG. 5 is a schematic diagram of gate drive signals for Q1 and Q2 for the embodiment shown in FIG. 4.

Gate drive signals of Q1, Q2, Q3, and Q4 should be arranged so that transformer T1A can operate properly. Referring to FIG. 5, one example of such as arrangement is shown as Vgs1, Vgs2, Vgs3 and Vgs4. The gate signals Vgs1 and Vgs4 for Q1 and Q4 are the same and gate signals Vgs2 and Vgs3 for Q2 and Q3 are the same. In the figure, a high voltage level means the MOSFET is turned on and a low voltage level means the MOSFET is turned off.

Figure 6:
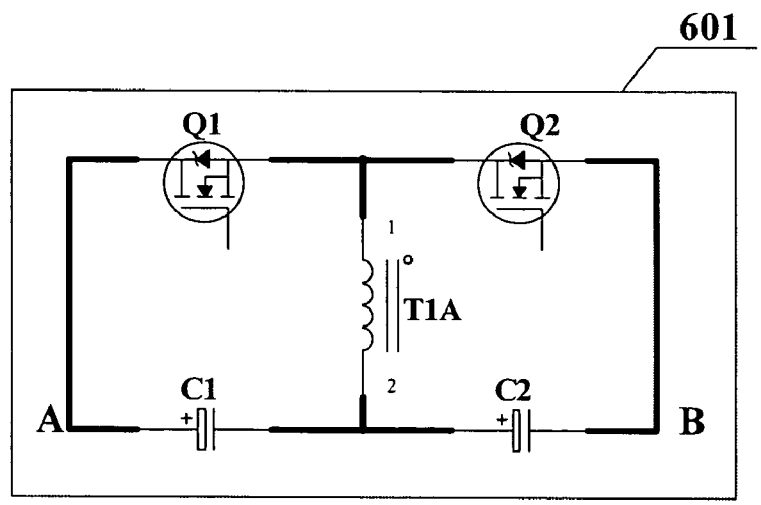
FIG. 6 is a schematic diagram of another embodiment of a high side circuit for the converter of FIG. 3.

Referring to FIG. 6, another embodiment 601 of the high side circuit 305 is shown. The high side circuit 601 consists of one transformer primary winding T1A, two MOSFETs Q1, Q2 and two capacitors C1, C2. The left point A of the high side circuit 601 is connected to Vin and the right point B of the high side circuit is connected to Vout.

Figure 7:
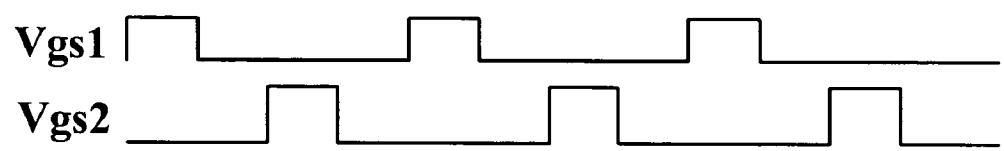
FIG. 7 is a schematic diagram of gate drive signals for Q1 and Q2 for the embodiment shown in FIG. 6.

The value of C1 and C2 should be large enough so that the voltage across C1 and C2 does not change significantly during normal operation of the circuit 601. In other words, the voltage across C1 and C2 is a DC voltage with small voltage ripple. The gate drive of Q1 and Q2 should be arranged so that transformer T1A can operate properly. Referring to FIG. 7, one example of such as arrangement is shown as Vgs1 and Vgs2.

Figure 8:
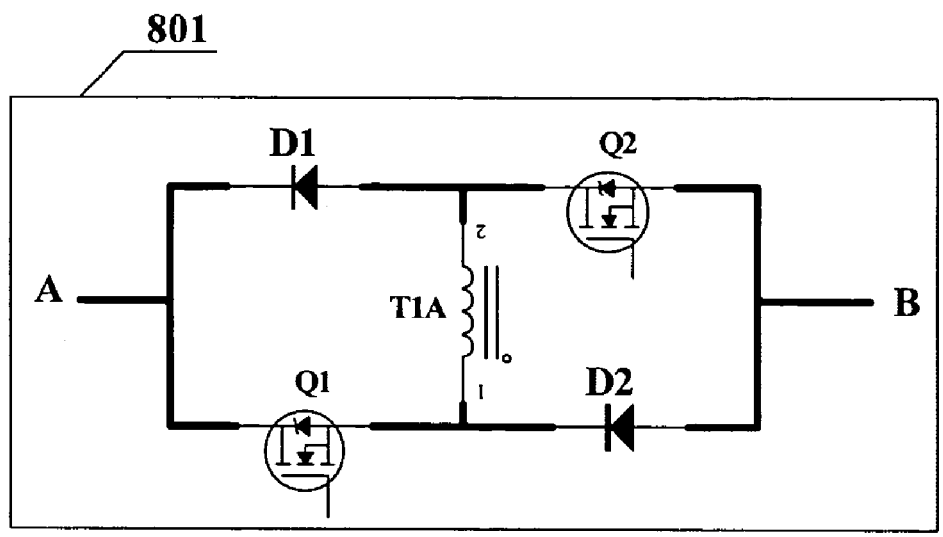
FIG. 8 is a schematic diagram of another embodiment of a high side circuit for the converter of FIG. 3 using two MOSFETs and two diodes.

Referring to FIG. 8, another embodiment 801 of the high side circuit 305 is shown. This embodiment 801 consists of one transformer primary winding T1A, two MOSFETs Q1,Q2 and two diodes D1, D2. The left side A of the high side circuit 801 is connected to the input voltage Vin. The right side B of the high side circuit 801 is connected to the output voltage Vout.

Q1 and Q2 are turned on at same time. When Q1 and Q2 are off, magnetizing current flows through D1 and D2 from point B to point A and thus resets the core of transformer T1.

Figure 9:
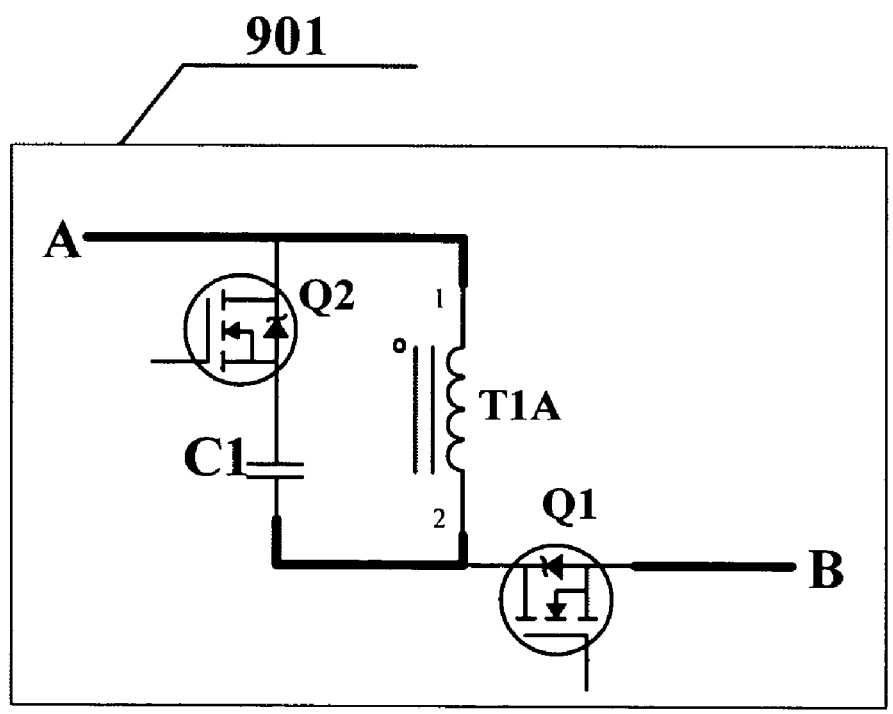
FIG. 9 is a schematic diagram of another embodiment of a high side circuit for the converter of FIG. 3.

Referring to FIG. 9, another embodiment 901 of the high side circuit 305 is illustrated using one transformer primary winding T1A, two MOSFETs Q1,Q2 and one capacitor C1. Point A is connected to the input voltage Vin and point B is connected to the output voltage Vout.

It is noted that MOSFET Q1 carries input current. MOSFET Q2 carries only the magnetizing current. When Q1 is on, Q2 is off. When Q1 is off, Q2 is on. The voltage developed across C1 is used to reset the core of transformer T1.

It is noted that there are other embodiments of the high side circuit 305 as will be evident to one skilled in the art using this description. Not all of them have been described, nor will they be. Some additional examples will be given later.

Returning to FIG. 3, the rectifier circuit 307 is connected in parallel with the output voltage Vout and in parallel with the output capacitor Co. It includes one or more transformer secondary winding(s). It includes diodes that will convert the bi-directional voltage from the transformer secondary winding into a pulsating, one-direction voltage. In addition, it consists of one or more inductors that will convert the pulsating, one-direction voltage through the secondary winding(s) into a DC voltage.

It is noted that the diodes can be replaced by MOSFETs in order to reduce the power loss.

The function of the rectifier circuit 307 is to convert the AC voltage from the transformer secondary winding(s) into a DC voltage Vout. It also provides a portion of the total load current.

Figure 10:
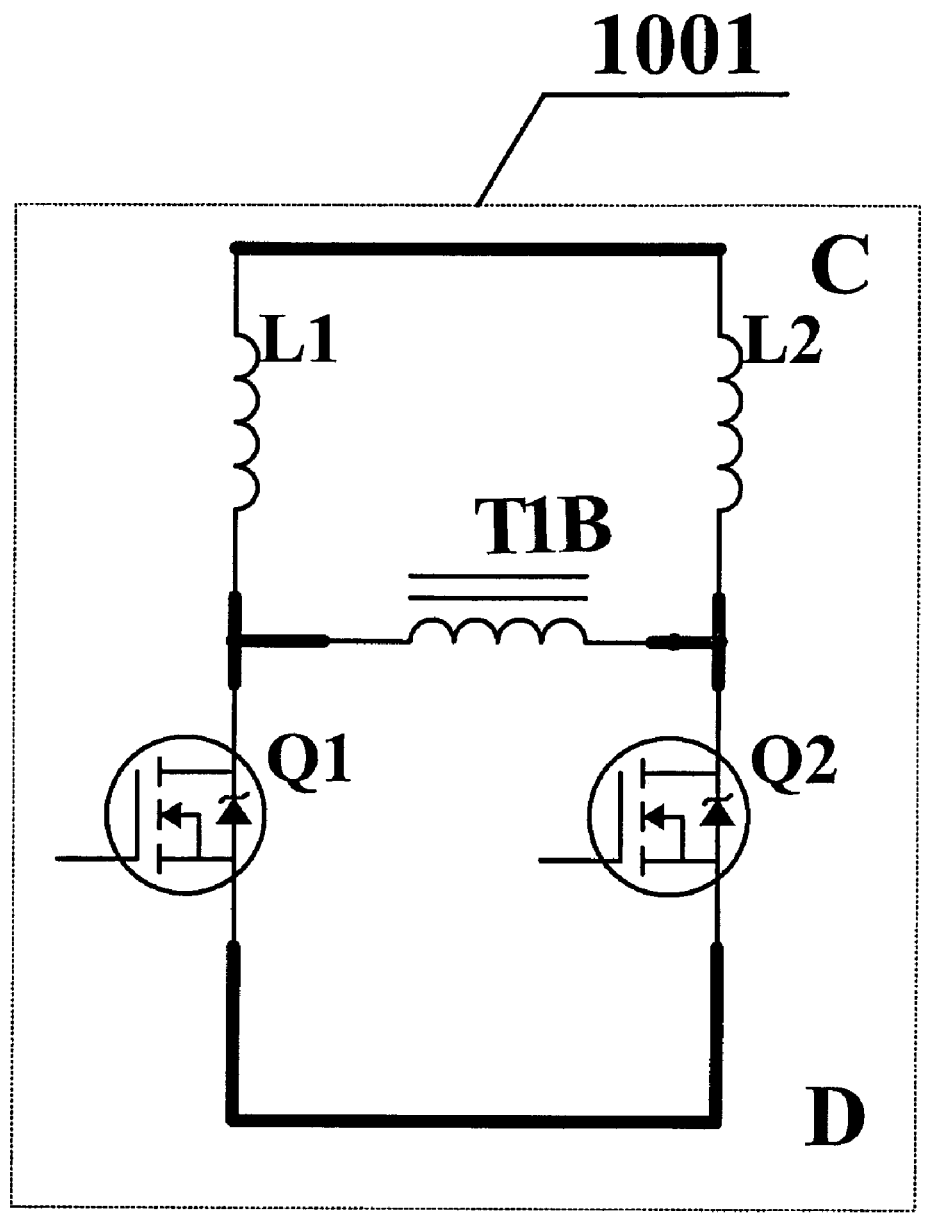
FIG. 10 is a schematic diagram of an embodiment of a rectifier circuit for the converter of FIG. 3 using one transformer winding and synchronous rectifiers.

Referring to FIG. 10, one embodiment 1001 of the rectifier circuit 307 is shown. In this case, the rectifier circuit 1001 includes one transformer secondary winding T, two MOSFETs Q1,Q2 and two inductors L1,L2. The top point C is connected to the positive point Vout+ of output voltage Vout. The bottom point D is connected to negative point Vout− of the output voltage Vout. In this embodiment, MOSFETs Q1 and Q2 are used as synchronous rectifiers to reduce power loss. The waveform of the gate drive signals Vgs1, Vgs2 for Q1 and Q2 will depend on the connection of the high side circuit 305. The objective of Q1 and Q2 is to convert bi-directional AC voltage that appears at the transformer secondary winding T into one-direction pulsating voltage.

Figure 11:
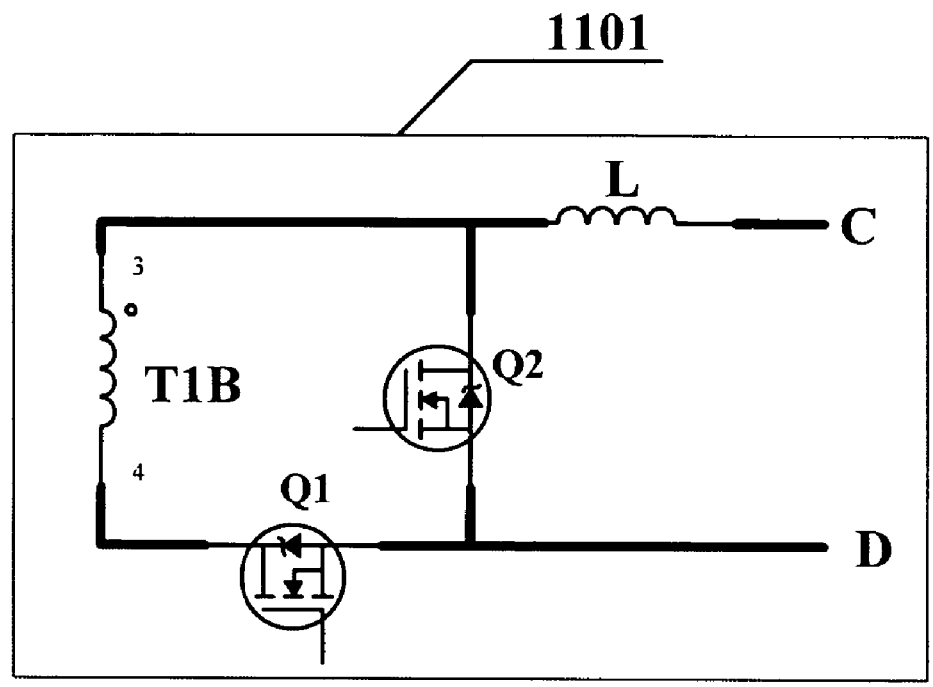
FIG. 11 is a schematic diagram of another embodiment of a rectifier circuit for the converter of FIG. 3 using one transformer winding and synchronous rectifiers.

Referring to FIG. 11, another embodiment 1101 of the rectifier circuit 307 is shown. In this case, the rectifier circuit 1101 consists of one transformer secondary winding T1B, two MOSFETs Q1,Q2 and one inductor L. The top point C is connected to the positive point Vout+ of output voltage Vout. The bottom point D is connected to negative point Vout− of the output voltage Vout. MOSFETs Q1,Q2 are used as synchronous rectifiers to reduce the power loss. The waveform of the gate drive signal Vgs1, Vgs2 for Q1 and Q2 will depend on the connection of the high side circuit 305. The objective of Q1 and Q2 is to convert the bi-directional AC voltage that appears at the transformer secondary winding T1B into one-direction pulsating voltage.

Figure 12:
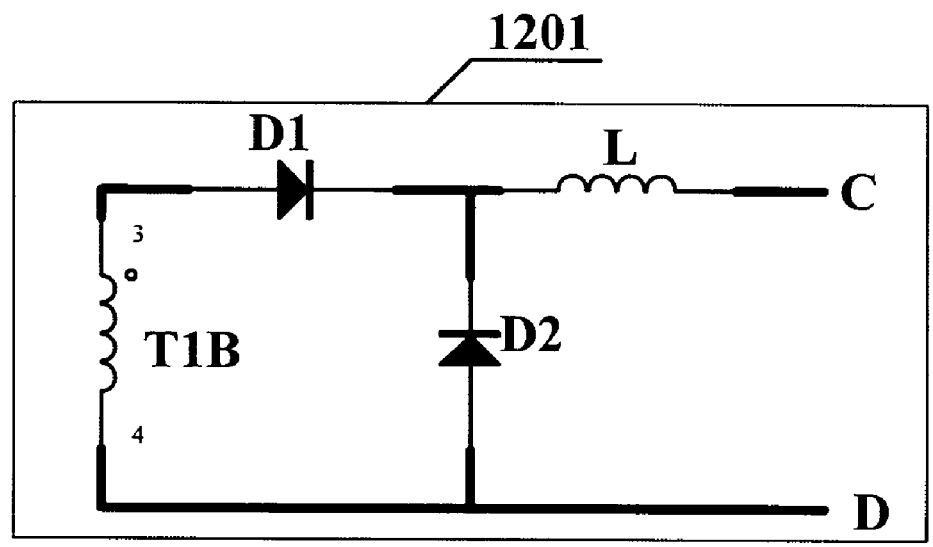
FIG. 12 is a schematic diagram of another embodiment of a rectifier circuit for the converter of FIG. 3 using one transformer winding and diodes.
Figure 13:
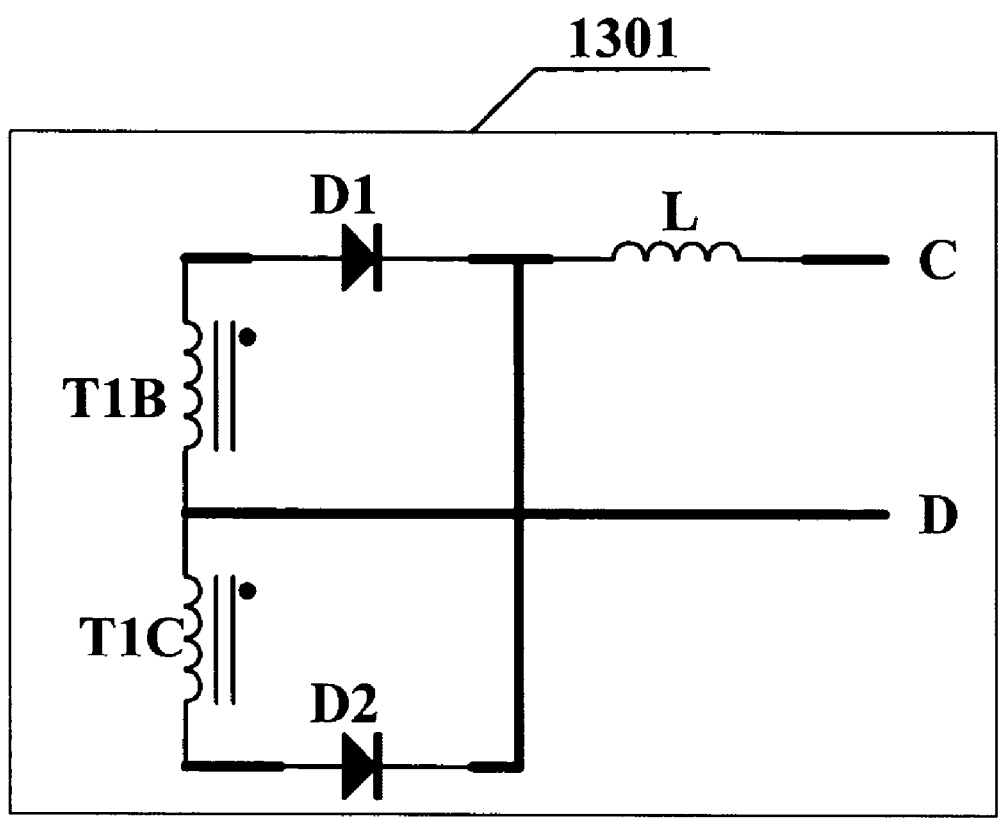
FIG. 13 is a schematic diagram of another embodiment of a rectifier circuit for the converter of FIG. 3 using two windings and two diodes.

Referring to FIG. 12, when the MOSFETs Q1, Q2 in FIG. 11 are replaced by diodes D1, D2, another embodiment 1201 of the rectifier circuit 307 is obtained. In this figure, the diodes D1, D2 are used to convert the bi-directional voltage across the transformer secondary winding T1B into one-direction pulsating voltage. Inductor L is used to filter the pulsating voltage into DC voltage Vout Some rectifier circuits 307 consist of two transformer secondary windings. Referring to FIG. 13, a rectifier circuit 1301 with two transformer secondary windings T1B, T1C is shown. It uses two diodes D1, D2 as rectifier switches. It uses only one inductor L.

Figure 14:
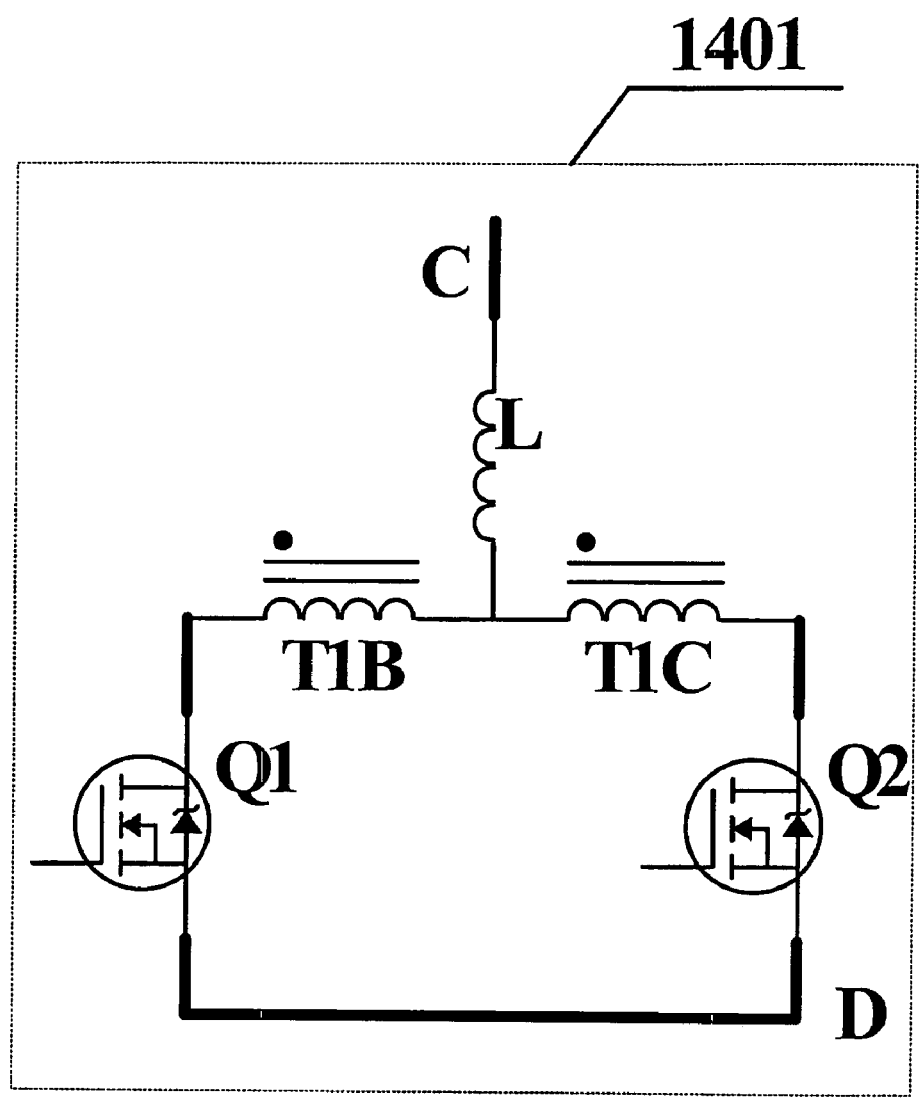
FIG. 14 is a schematic diagram of another embodiment of a rectifier circuit for the converter of FIG. 3 using two windings and synchronous rectifiers.

Referring to FIG. 14, another rectifier circuit 1401 with two secondary windings T1B, T1C and synchronous rectifiers Q1, Q2 is shown. It requires one inductor L.

As will be evident to those skilled in the art using this description, there are other embodiments of the rectifier circuit 307 that have not been described herein.

Referring again to FIG. 3, the output capacitor Co is connected in parallel with the load circuit LOAD. It is also connected in parallel with the rectifier circuit 307. The function of the output capacitor Co is to absorb the pulsating current that comes from the high side circuit 305. The value of the output capacitor Co should be large enough to provide a DC voltage across the load.

If the capacitor Co is not used, the output voltage Vout may have significant ripple voltage such that the load LOAD may not operate properly.

It should be noted that the high side circuits described above only show the basic operation and requirement of the high side circuit 305 as shown in FIG. 3. In actual implementation, some modification of the above high side circuits can be added to further improve the operation of the high side circuits. For example, leakage inductance of the transformer can be intentionally designed larger to make the MOSFET switches operate at more favourable conditions. A snubber circuit can be added to reduce the power dissipated in the MOSFETs, diode, or transformer. Some other auxiliary circuit can be added around the MOSFETs to make the operation of these MOSFETs more favourable, such as reducing the switching loss.

It should also be noted that the rectifier circuits described above only show the basic operation and requirement of the rectifier circuit 307 as shown in FIG. 3. In actual implementation, some modification of the above rectifier circuits can be added to further improve operation of the rectifier circuits. For example, the gate drive signals for the synchronous rectifier switches used in the rectifier circuit 307 can be derived from the transformer secondary winding to simplify the gate drive circuit. Other gate drive timing circuits can be added to further improve the operation of the synchronous rectifier. A snubber circuit may also be added across the synchronous rectifiers or diodes to reduce the power dissipation.

In addition, it should be noted that only one capacitor Co is used as the output filter to smooth output voltage. In actual implementation, other additional filters can be added after Co. For example, a pi filter can be used to further reduce the output voltage ripple. Similarly, no input filter is shown in the circuit diagram of FIG. 3. In actual implementation, at least a capacitor is needed to provide the input ripple current so that the DC source does not need to provide the ripple current. This is usually the preferred implementation. Additional EMI filters can be used to reduce the noise injected into input voltage source.

In converter 301, as shown in FIG. 3, the high side circuit 305 is connected between the positive point of the input voltage (Vin+) and the positive point of the output voltage (Vout+). It should be noted that the converter 301 will also operate properly when the high side circuit is connected between the negative point of the input voltage (Vin−) and the negative point of the output voltage (Vout−). In this implementation, different components might be used for the high side circuit. The connection of the components might also be changed to make the high side circuit operate properly. Based on the fact that in actual implementation, it is preferred to put the high side circuit between the positive points of Vin and Vout, the following description assumes that connection. Nevertheless, the circuit 301 will operate when the high side circuit 305 is connected between the negative points of Vin and Vout.

Thus, the voltage inputs to the converters could simply be a first voltage and a second voltage, rather than always being positive and negative DC voltages (or "potentials") with the positive voltage always being the input voltage to the high side circuit. Similarly, the output voltage of the converter could be first and second DC voltages, rather than requiring the converter output that receives current from the high side circuit to be a positive voltage when compared to the other converter output. In any case the output converter DC voltage between the first voltage and the second voltage has the same polarity as a DC voltage input between the first voltage and the second voltage.

Accordingly, the term "high side circuit" is used herein although the high side circuit may be in the low side of the converter. The "high side circuit" could alternatively be referred to as a "primary side" or "primary side circuit". Similarly, "rectifier circuit" could alternatively be referred to as a "secondary side" or "secondary side circuit".

All of the above variations and any other variations to converters employing the principles described herein are included within the scope of those principles and the invention as later claimed.

Several non-isolated full-bridge DC converters will be described. In these DC converters, the high side circuit 301 includes four MOSFETs as switches and one transformer primary winding, as shown in FIG. 3. An embodiment of a rectifier circuit 307 using multiple rectifier sections (duplicated rectifier circuits) connected in parallel will also be discussed.

Figure 15:
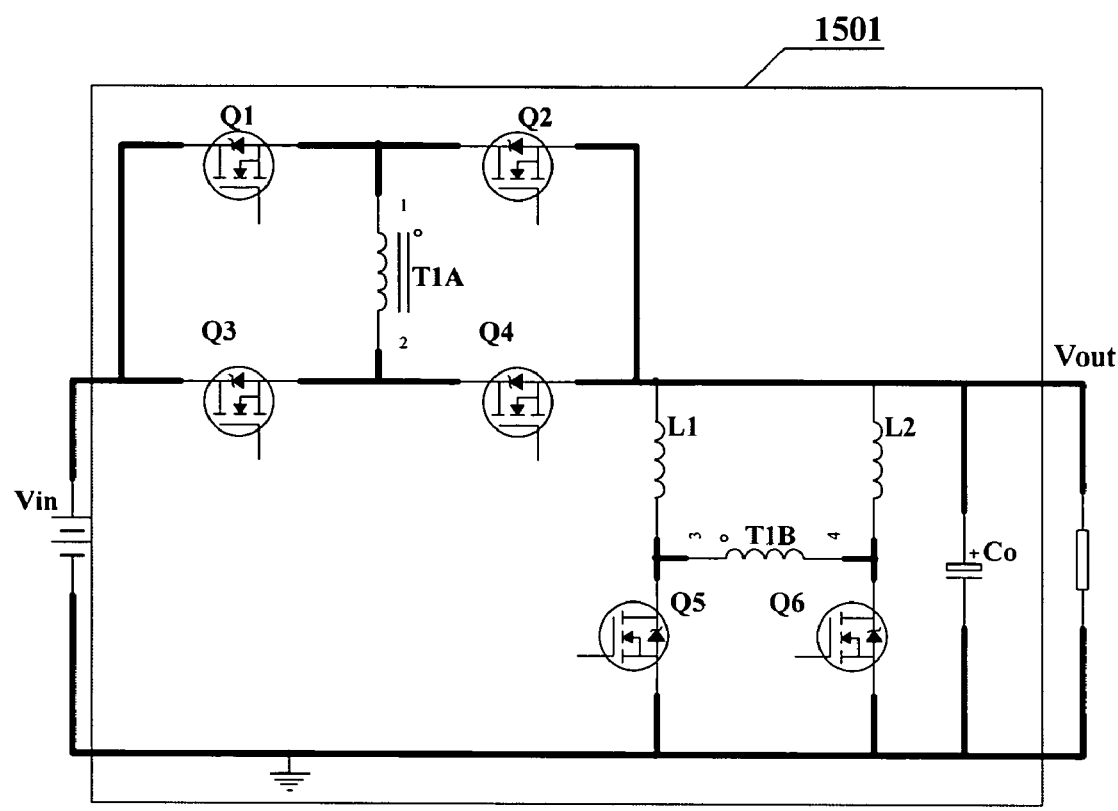
FIG. 15 is a schematic diagram of a non-isolated full-bridge DC converter embodiment of the converter of FIG. 3.

Referring to FIG. 15, a non-isolated full-bridge DC converter 1501 is shown.

The full-bridge converter 1501 topology includes six MOSFETs Q1–Q6, one transformer T1, with one primary winding T1A and one secondary side winding T1B, two inductors L1, L2 and one output capacitor Co. The operation of the circuit 1501 will be discussed later below.

Q1, Q2, Q3 and Q4 are primary switches. They can be implemented, for example, by IRL7467 from International Rectifier. This is true for all the primary switches described herein. The drains of Q1 and Q3 are connected together and then connected to the positive terminal of the input voltage Vin+. The source of Q1 and the drain of Q2 are connected together. The source of Q3 and the drain of Q4 are connected together. The source of Q2 and Q4 are connected together and then connected to the output voltage terminal Vout+.

Q5 and Q6 are synchronous rectifier switches. They can be replaced by diodes. Q5 and Q6 can be implemented by, for example, IRLR8103 from International Rectifier. This is true for each of the secondary MOSFETs described herein. The sources of Q5 and Q6 are connected together and then are connected to ground point (or negative terminal of input voltage, which is the same point as negative terminal of output voltage Vout−). The drain of Q5 is connected with one terminal of inductor L1. The other terminal of L1 is connected to the positive point of output voltage Vout+. The drain of Q6 is connected with one terminal of L2. The other terminal of L2 is connected to the positive terminal of the output voltage Vout+.

The primary winding T1A is connected between the drain of Q2 and drain of Q4. The secondary winding T1B of transformer T1 is connected between drain of Q5 and drain of Q6.

For VRM applications, Q1, Q2, Q3 and Q4 are almost exclusively implemented using MOSFETs. However, other switches, such as power transistors, IGBTs ("insulated gate bipolar transistors"), GTOs ("gate turn off" thyristors), etc, can also be used. This is again true for all the primary switches described herein.

Q5 and Q6 are each operating in synchronous rectifier mode, which means that under normal operating condition, the current will flow from the source terminal to drain terminal. It is noted that Q5 and Q6 can be replaced by diodes. However, the efficiency will be reduced for VRM application because the loss will be much higher for diodes.

Transformer T1 can be implemented, for example, using a conventional wire wound transformer. It can also be implemented, for example, using a planar transformer. It is noted that for VRM application, the planar transformer will be preferred because it can reduce the power loss and reduce the cost. This is true for all the transformers described herein.

The inductors L1, L2 can be implemented, for example, using off the shelf wire wound inductor. It can also be implemented, for example, using planar inductor. This is true for all the inductors described herein.

For a typical application of a converter 301, the input voltage is 12V (which can be changed from 10.8V to 13.2V) and the output voltage is 1.5V (which can be changed from 0.8V to 1.6V). The turns ratio of the transformer, defined as the ratio of secondary turn, Ns, and primary turn, Np, N=Ns/Np, is selected as 0.667 (or Ns=2, Np=3). Then the required duty cycle for Q1, defined as the ratio of on time of Q1, TonQ1, over the half switching period of Q1, 0.5*Ts, D=TonQ1/(0.5 * Ts) is about 0.5, when the loss of the converter 301 is considered. When the duty cycle is around 0.5, the performance of the converter is optimized.

The non-isolated full-bridge DC converter 1501, as shown in FIG. 15, has the advantage of higher conversion efficiency. This is because the primary and secondary sides (high side circuit and rectifier circuit) are not isolated;, i.e., the primary and secondary sides are coupled directly. This will increase the efficiency, or equivalently, reduce the power loss during conversion. This will significantly improve the life of the converter 1501, as the junction temperature of semiconductors is reduced. In addition, this will make the converter size smaller. It can also simplify the mechanical design of a computer motherboard, which can reduce the cost.

As primary current goes directly to the load, this can reduce the current stress of the secondary synchronous rectifiers Q5, Q6. The current ripple in the two output inductors L1, L2 will be cancelled by each other, which reduces the output current ripple significantly. Smaller current ripple means it is possible to select a smaller output capacitor Co. A smaller output capacitor Co and, possibly, smaller inductor L can provide the converter 1501 with faster dynamic response.

Figure 16:
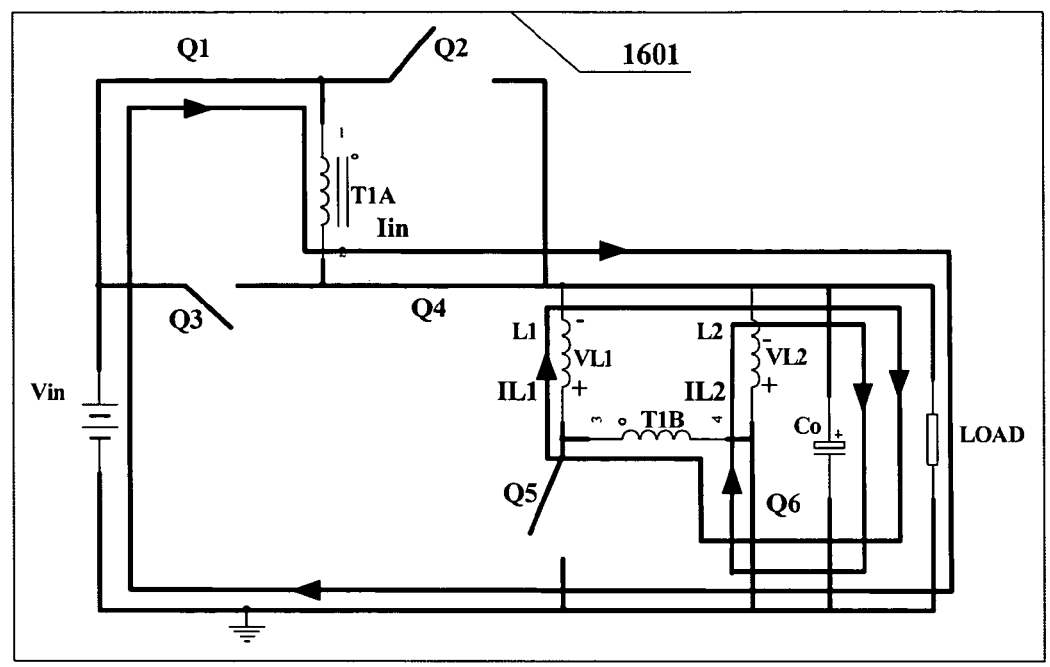
Figure 18:
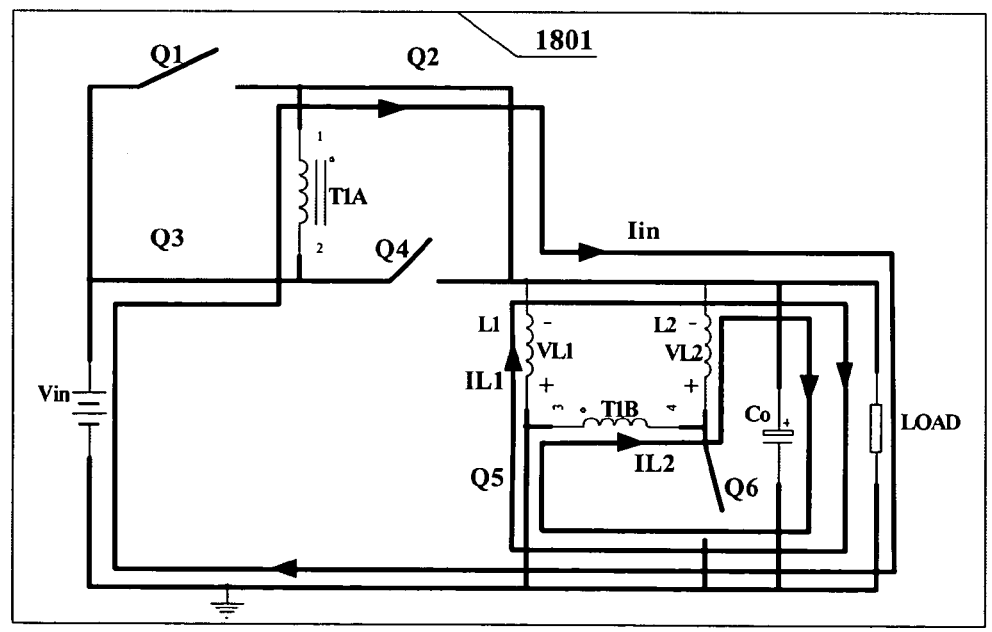
Figure 19:
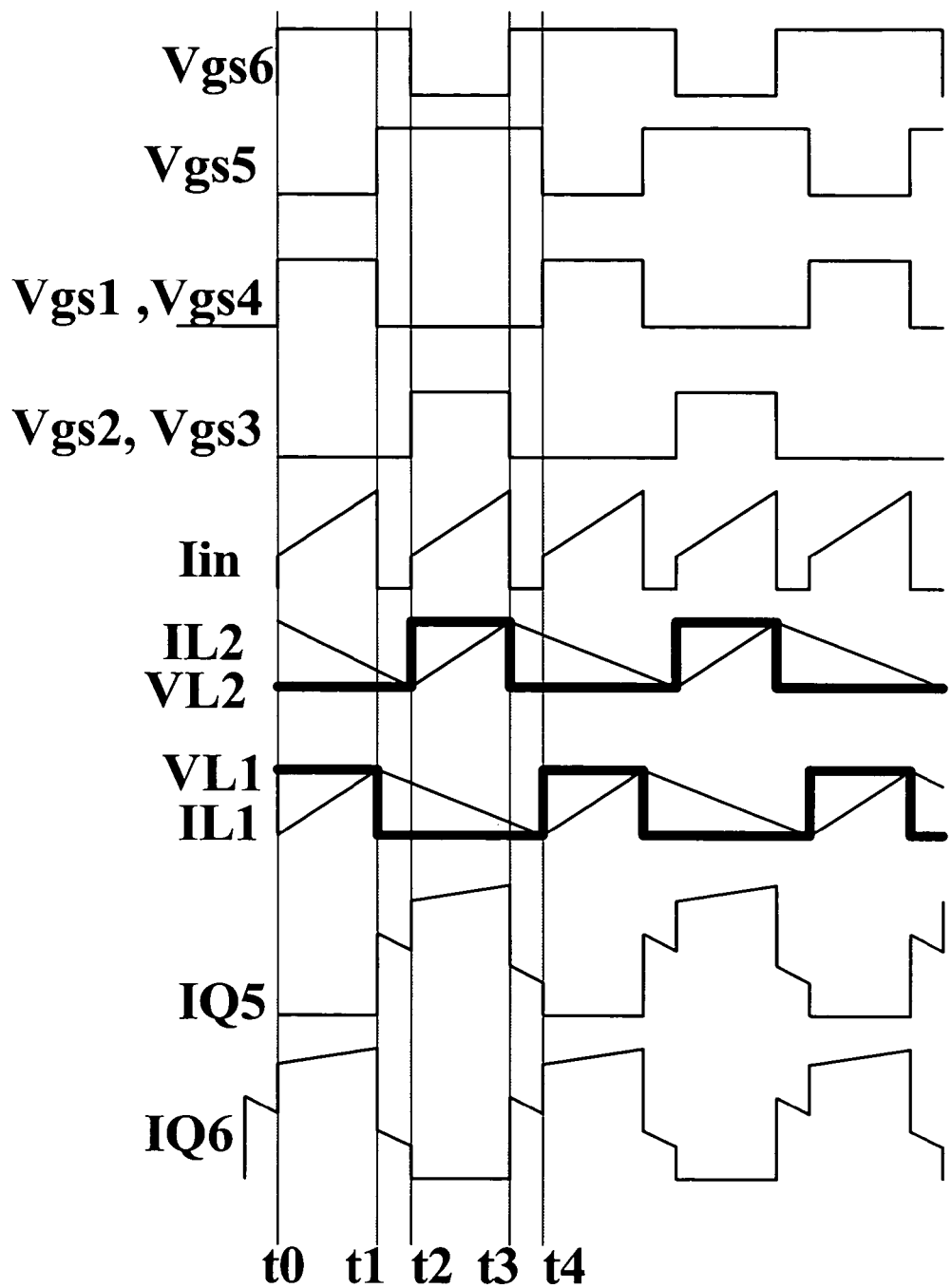
FIG. 19 is a graphic illustration of certain waveforms used with the non-isolated full-bridge DC converter of FIG. 15 for regular PWM (pulse width modulated) gate drive.
Figure 20:
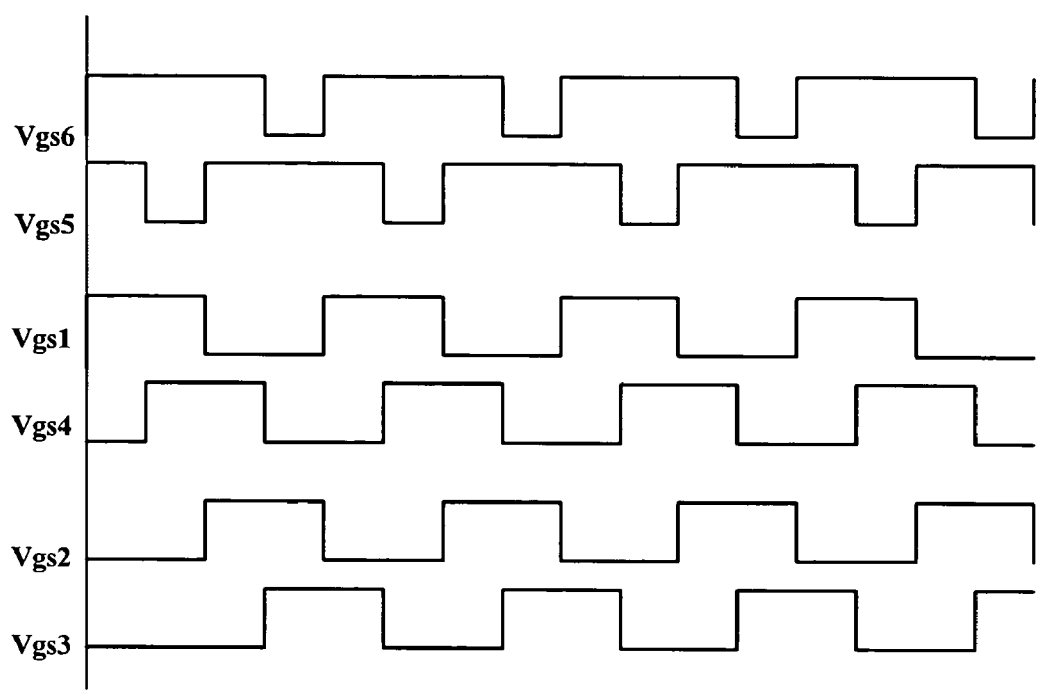
FIG. 20 is a graphic illustration of certain waveforms used with the non-isolated full-bridge DC converter of FIG. 15 for phase-shifted PWM gate drive signals for Q1, Q2, Q3, Q4, Q5 and Q6.

The operation of the full-bridge converter 1501 can more easily be understood if it is assumed that all the components are ideal. In this analysis, the gate drive signals Vgs1–Vgs6 for Q1, Q2, Q,3 Q4, Q5, and Q6 shown in FIG. 19 are used. There are four operating periods. The operation can be explained by using the equivalent circuits shown in FIG. 16, FIG. 17, and FIG. 18, and waveforms shown in FIG. 19. It should be noted that other gate drive schemes can also be used to drive Q1, Q2, Q3, Q4, Q5, and Q6. One such example is the phase shifted PWM gate drive scheme, as shown in FIG. 20.

Referring to FIG. 19, the main waveforms for the full-bridge converter 1501 are:
1. Vgs1 to Vgs6 are the gate signals of the 6 switches.
2. Iin is the input current. IL1 and IL2 are the current in L1 and L2.
3. IQ5 and IQ6 are the current in switches Q5 and Q6.
4. VL1 and VL2 are the voltage across L1 and L2.

Referring to FIG. 19, in Interval 1: From time t0 to t1, Q1, Q4 and Q6 are on, resulting in the equivalent circuit 1601 shown in FIG. 16. The input current Iin flows through Q1 and Q4 to the load side. The inductor current IL1 also flows into the load side. Current in inductor L1 rises and current in L2 is falling.

Figure 17:
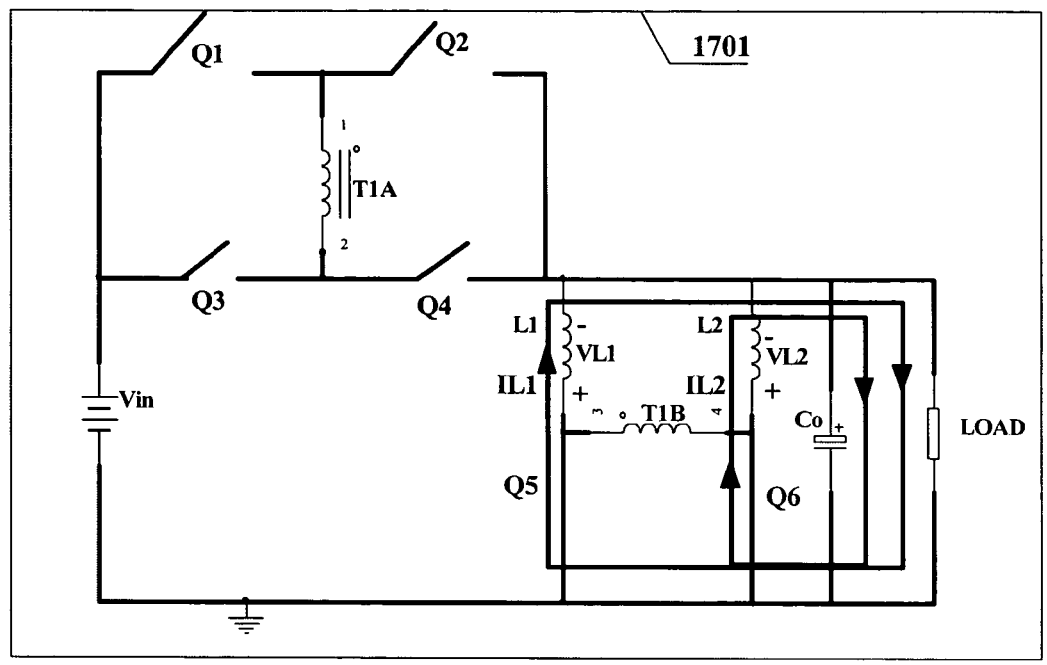

Again referring to FIG. 19, at Interval 2: from time t1 to t2, Q1 and Q4 are turned off and Q5 is turned on, resulting in the equivalent circuit of FIG. 17. Therefore, Q1, Q2, Q3 and Q4 are off and Q5 and Q6 are on. At this time, the input current is zero and the current in L1 and L2 is falling. The energy stored in L1 and L2 is released to the load. The transformer secondary winding is shorted. The equivalent circuit 1701 is shown in FIG. 17.

Again referring to FIG. 19, at Interval 3: from time t2 to time t3, Q2 and Q3 are turned on and Q6 is turned off. The on devices for this interval are Q2, Q3 and Q5. The input current flows through Q2 and Q3 to the load, inductor current in L2 is rising and the current in L1 is falling. The equivalent circuit 1801 is shown in FIG. 18.

Again referring to FIG. 19, at Interval 4: from time t3 to t4, Q2 and Q3 are turned off and Q6 is turned on again. Q1, Q2, Q3 and Q4 are off and Q5, Q6 are on. This stage is the same as interval 2. At this time, the input current Iin is zero, and current IL1 and IL2 in L1 and L2 are falling. The transformer secondary winding T1B is shorted. The equivalent circuit 1701 is shown in FIG. 17.

In the above analysis, the regular PWM gate drive scheme as shown in FIG. 19 is used. A phase-shift PWM gate drive scheme is shown in FIG. 20.

The main difference between the regular PWM control and phase-shift PWM control is that the latter introduces one operating interval when both Q1 and Q3 are on. During this period, the transformer primary winding T1A is shorted. One advantage of the phase-shifted PWM gate drive scheme is that zero voltage switching ("ZVS") for Q1, Q2, Q3 and Q4 can be achieved by the leakage inductance of the transformer T1 and by the load current. This can reduce the switching loss of Q1, Q2, Q3 and Q4. In addition, it reduces the core loss of the transformer T1 by reducing the peak to peak flux density.

Based on the above analysis, some equations for the non-isolated full-bridge DC converter 1501 under ideal conditions will be discussed.

Relationship of output voltage Vout and input voltage Vin is shown in the following equation:

$$V\text{out} = V\text{in} * N * D/(2 + N * D), \quad N = Ns/Np \qquad (1)$$

In the above equation, D is the total duty cycle and defined by D=2*Ton/Ts, where Ton is the on time of Q1 and Ts is the switching period of Q1. Ns is the turns for transformer secondary winding T1B and Np is the turns for transformer primary winding T1A. N is the turns ratio. This equation can be used to determine the turns ratio for a given application.

The relationship between the input current Iin and output current Io is shown in the following equation:

$$I_{\text{in\_avg}} = I_{\text{o\_avg}} \frac{ND}{ND+2} \qquad (2)$$

The above equation can be used to determine the input current requirement. It can also be used to calculate the rms (root mean square) current of MOSFETs Q1, Q2, Q3, and Q4.

The voltage stress of primary MOSFETs Q1, Q2, Q3, and Q4 is given by the following equation.

$$V_{PMOSFET} = V\text{in} - V\text{out} \qquad (3)$$

This equation is used to select MOSFETs with sufficient voltage rating. For example, for a 12V input, a MOSFET with 15V voltage rating can be used.

The rms current in primary MOSFETs Q1, Q2, Q3, and Q4 is given by the following equation:

$$I_{\text{PMOSFET\_RMS}} = \frac{I_{in}}{\sqrt{D}} \frac{\sqrt{2}}{2} \quad (4)$$

The above equation can be used to select MOSFETs with proper current rating. It can also be used to calculate the conduction loss of the MOSFETs.

The current ripple in the output inductors L1, L2 is given in the following equation.

$$\Delta I_L = \frac{V_o}{L}(1 - D/2)Ts \quad (7)$$

In the above equation, L is the inductor value. This equation is used to calculate the peak inductor current, which is required to calculate the switching loss, and design the inductors L1, L2.

The average current in the output inductors L1, L2 is given in the following equation:

$$I_{Lavg} = \frac{(I_o - I_{inavg})}{2} = \frac{I_o}{2}\left(\frac{2}{ND+2}\right) \quad (8)$$

The above equation is used to calculate the rms current for Q5 and Q6, as well as to design the inductors L1, L2.

The rms current through each synchronous rectifier Q5, Q6 is given by the following equation:

$$I_{\text{syn\_RMS}} = \sqrt{(1-D)I_{Lavg}^2 + \frac{D}{2}(I_{L1avg} + I_{L2avg})^2} \quad (9)$$

The above equation can be used to select the synchronous rectifier MOSFETs Q5 and Q6.

The above equations can be used to design the full-bridge converter 1501.

The above section describes in detail the operation and some advantages of the non-isolated full-bridge DC converter 1501 under the assumption that all the components are ideal. It should be noted that under actual condition, the operation will be a little bit different from the above analysis as will be evident to those skilled in the art using this description.

It is also noted that by using the phase-shift PWM gate drive scheme of FIG. 20 for Q1, Q2, Q3 and Q4, zero voltage switching for the primary MOSFETs Q1, Q2, Q3, Q4 can be achieved. This is beneficial in reducing the switching loss and/or increasing the switching frequency.

The previous section discusses in detail the basic non-isolated full-bridge DC converter 1501. It should be noted that when different rectifier circuits 307 are used, other types of non-isolated full-bridge DC converter can be derived. In this section, two alternative embodiments of a non-isolated full-bridge DC converter will be described. Their operation is similar to the original embodiment 1501 as shown in FIG. 15. As will be evident to those skilled in the art, other embodiments can also be derived using similar methods.

Figure 21:
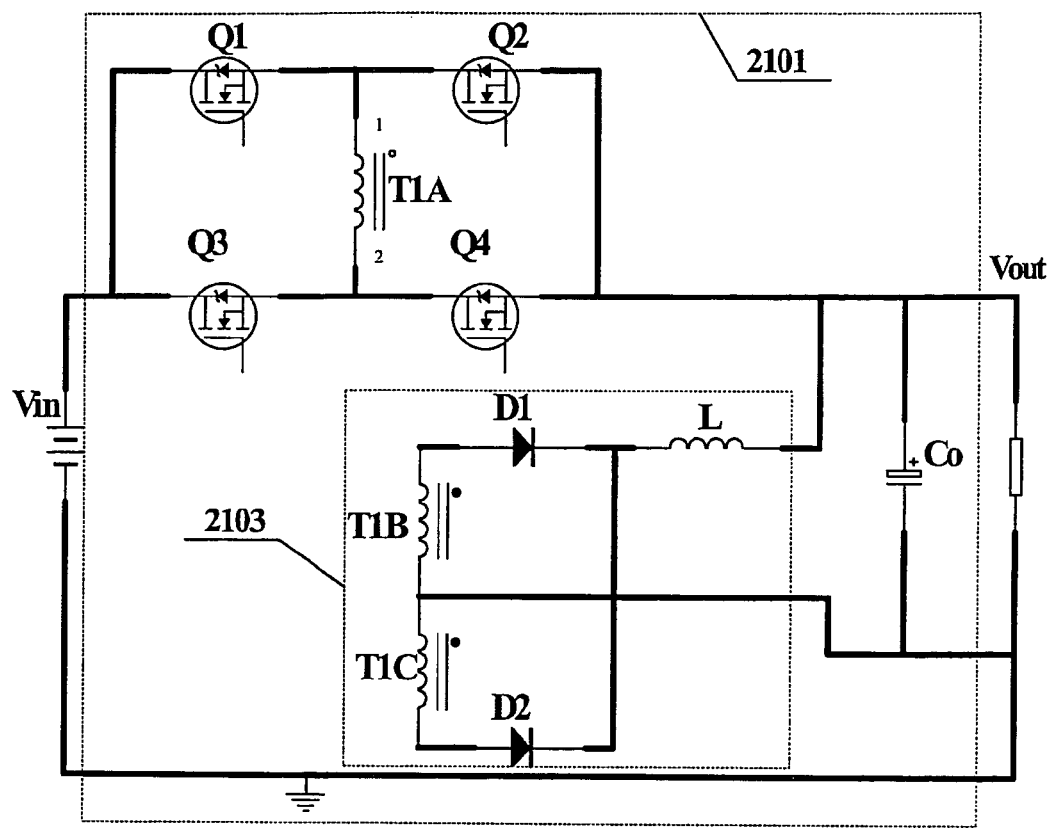
FIG. 21 is a schematic diagram of another non-isolated full-bridge DC converter embodiment of the converter of FIG. 15.

Referring to FIG. 21, another embodiment 2101 of a non-isolated full-bridge converter is shown. In this embodiment, the rectifier circuit includes two secondary windings of the transformer. Diode D1 and D2 are used to convert the bi-directional voltage across the secondary windings of the transformer T1 into one-direction pulsating voltage. Only one inductor L is used.

Figure 22:
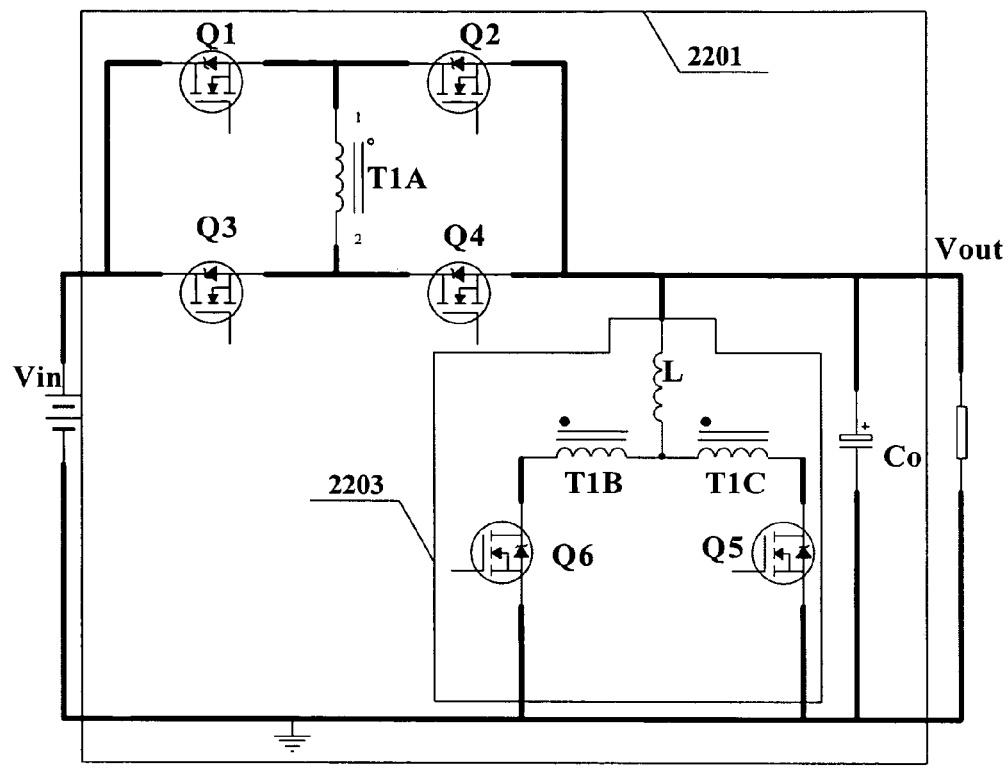
FIG. 22 is a schematic diagram illustrating the use of synchronous rectifiers instead of diodes in the converter of FIG. 21.

Referring to FIG. 22, when the diodes D1, D2 in the circuit 1501 shown in FIG. 15 are replaced by synchronous rectifiers Q5, Q6 in order to reduce the power loss in low output voltage applications, the circuit 2201 is obtained. The position of Q5, Q6 is interchanged with the secondary winding T1B, T1C in order to simplify the requirement for the gate drive of Q5 and Q6.

In order to increase the current carrying capability or to reduce power loss in a rectifier circuit, two or more rectifier sections can be connected in parallel.

Figure 23:
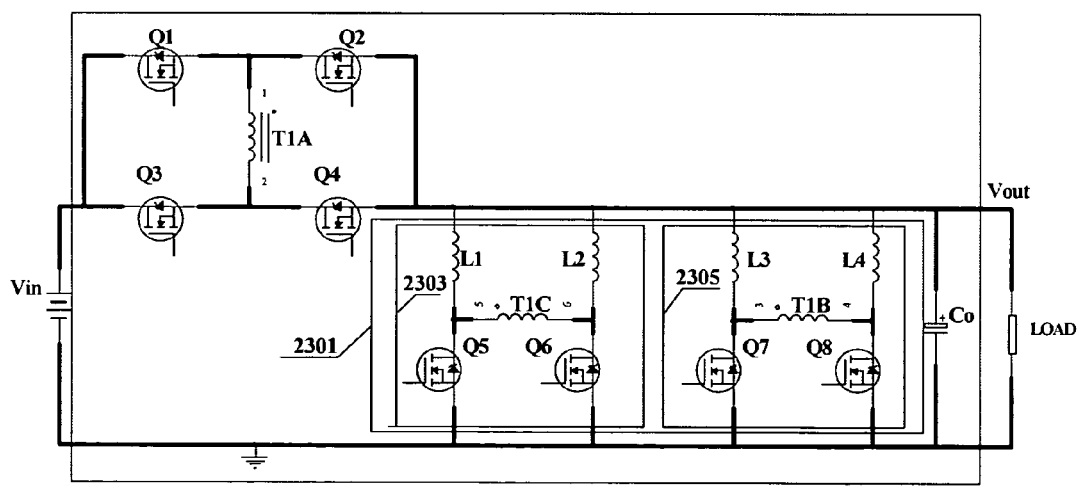
FIG. 23 is a schematic diagram of a non-isolated full-bridge DC converter embodiment of the converter of FIG. 3 with two rectifier sections.

Referring to FIG. 23, one such circuit 2301, which is based on circuit 1501 in FIG. 15, is derived by using two rectifier sections 2303, 2305 (each section forming its own rectifier circuit). The two rectifier sections 2303, 2305 are connected in parallel. One rectifier section 2303 consists of Q5, Q6, L1, L2 and one secondary winding T1C. The other rectifier section 2305 consists of Q7, Q8, L3, L4 and one transformer secondary winding T1B. Transformer T1 has one primary winding T1A (same as in FIG. 15), and has two secondary windings T1B, T1C. These three windings T1A, T1B, T1C are coupled together through magnetic core of transformer T1.

Using this method the output load current is shared in the two secondary windings T1B, T1C. As we know the conduction losses are $I^2R$, if the resistance is the same, and the current becomes half, the conduction losses will reduce four times. This is more effective than using two MOSFETs in parallel to reduce conduction losses when parasitic parameters are considered. In other words, two secondary windings T1B, T1C arrangement will ensure better current sharing in rectifier circuit 2301.

The major advantage of this arrangement is the reduction of the conduction loss for inductors L1–L4 and synchronous rectifiers Q5, Q6, Q7, Q8. When the transformer T1 is implemented by planar transformer, the cost of adding another winding is zero. The gate drive of Q7 is the same as that of Q5 and the gate drive of Q8 is same as that of Q6. When the same MOSFETs are used, the conduction loss for the rectifier circuit can be cut by half. That can increase the efficiency by about 3%.

In cost-sensitive applications, lower cost MOSFETs (which normally have higher on resistance) can be used, and the total conduction loss will be similar to that of FIG. 15, while the cost of four lower cost MOSFETs may well be lower than the cost of two premium MOSFETs.

Figure 24:
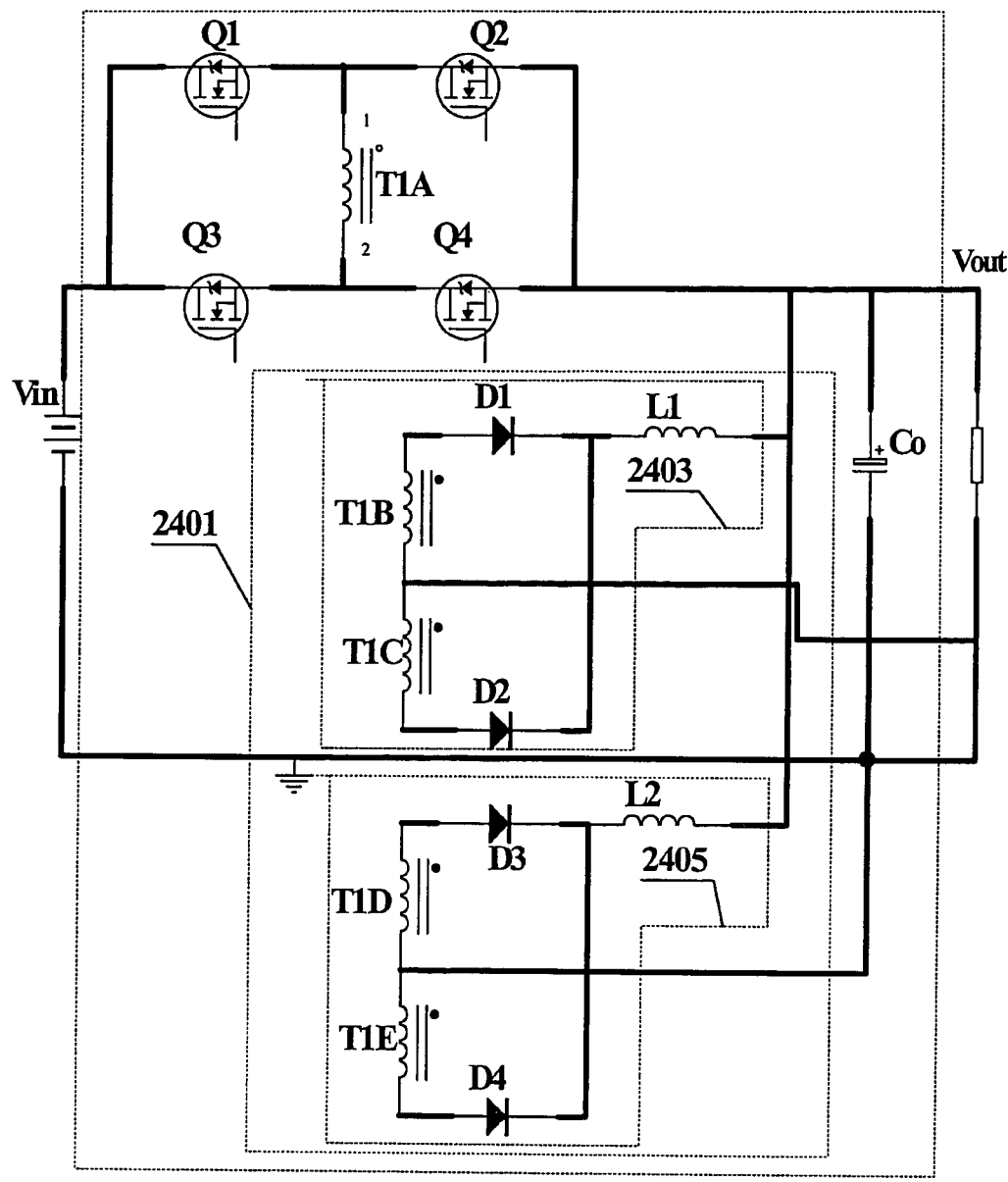
FIG. 24 is a schematic diagram of another non-isolated full-bridge DC converter embodiment of the converter of FIG. 3 with two rectifier sections.

Referring to FIG. 24, another rectifier circuit embodiment 2401 including two rectifier sections 2403, 2405 is shown. In this figure, the two rectifier sections 2403, 2405 are each the same as the rectifier circuit used in FIG. 21, and they are connected in parallel. Rectifier section 2403 consists of secondary windings T1B, T1C, diodes D1 and D2, and inductor L1. Rectifier section 2405 consists of secondary windings T1D, T1E, diodes D3 and D4, and inductor L2. It is noted that all the five transformer windings, T1A, T1B, T1C, T1D and T1E, are coupled to the same magnetic core of transformer T1.

Figure 25A:
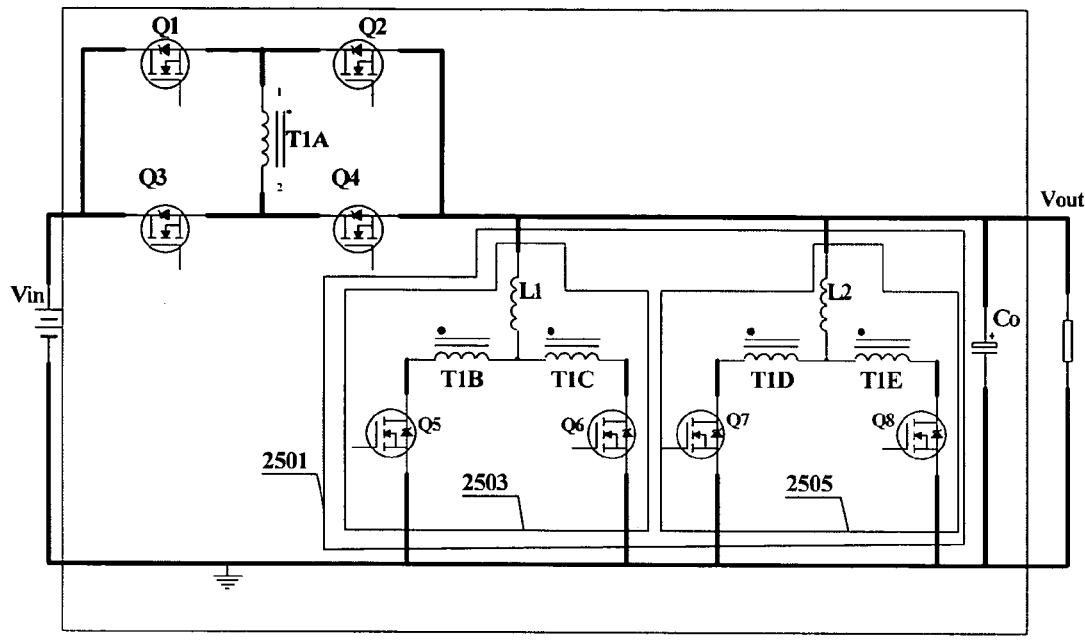
FIG. 25A is a schematic diagram illustrating the use of synchronous rectifiers instead of diodes in the embodiment of FIG. 24.

Referring to FIG. 25A, another rectifier circuit embodiment 2501 including two rectifier sections 2503, 2505 is shown. In this figure, the two rectifier sections 2503, 2505 are each the same as the rectifier circuit used in FIG. 22, and they are connected in parallel. Rectifier section 2503 consists of secondary windings T1B, T1C, MOSFETs Q5, Q6, and inductor L1. Rectifier section 2505 consists of secondary windings T1D, T1E, MOSFETs Q7 and Q8, and inductor L2. It is noted that all the five transformer windings, T1A, T1B, T1C, T1D and T1E, are coupled to same magnetic core of transformer T1.

It is noted that in the above discussion of FIGS. 23–25A, the number of rectifier circuits is limited to two. In actual implementation, three or more rectifier sections can also be used to share the load current in order to reduce the conduction loss in the rectifier circuit.

It should be noted that in actual implementation, adding more secondary windings does not necessarily increase the transformer cost when a planar magnetic structure is used; however, every time a secondary winding is added, more inductors are also needed.

In order to increase the current carrying capability, two or more identical DC converters can be connected in parallel with respective inputs and outputs connected together. Interleaving is a technology that controls the turn on instant of the switches in different DC converters so that the input current ripple and output current ripple can be significantly reduced. For example, the turn on instant of one MOSFET in the second converter is delayed with respect to the same MOSFET in the first converter so that the input currents of these two converters are 180 degrees out of phase. This will result in significant reduction of the input current ripple and, therefore, reduction of the size of the input filter. By interleaving, the output current ripple of each converter is also 180 degrees out of phase. This will also result in significant reduction of the output current ripple and, therefore, the size of the output filter. It should be noted that a smaller input filter and output filter is very beneficial in improving the transient response of the converter.

Figure 25B:
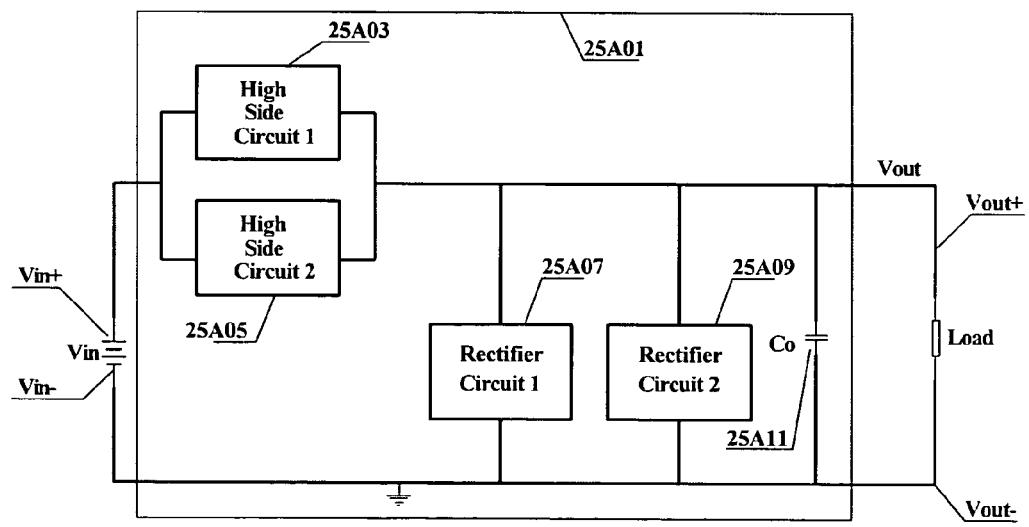
FIG. 25B is a schematic diagram of a two-phase interleaved non-isolated DC converter embodiment of the converter of FIG. 3.

One extension of the circuit 301 shown in FIG. 3 is the two-phase interleaved circuit 25A01, as shown in FIG. 25B. Referring to FIG. 25B, two identical high side circuits are connected in parallel and two identical rectifier circuits are connected in parallel also. The gate drive signals to the high side circuit 1 and high side circuit 2 are phase shifted. The gate drive signals to the rectifier circuit 1 and rectifier circuit 2 are also phase shifted. This arrangement can achieve all the benefits of interleaving.

Interleaving can improve the performance of DC converters significantly. The improvement of the interleaf is even more significant for two-phase interleaving when the duty cycle in each converter is around 50%. It is noted that the steady state duty cycle of the converter is around 50%. Therefore, the benefit of interleaving is very significant as compared with a conventional interleaved Buck converter.

It should be noted that FIG. 25B only shows the implementation of two-phase interleaved converter. Three-phase or even more-phase interleaving can also be derived in same way as will be evident to those skilled in the art using the principles described herein.

Several ways to implement interleaving for non-isolated full-bridge DC converters are described in the following paragraphs. Their operation is discussed briefly.

Figure 26:
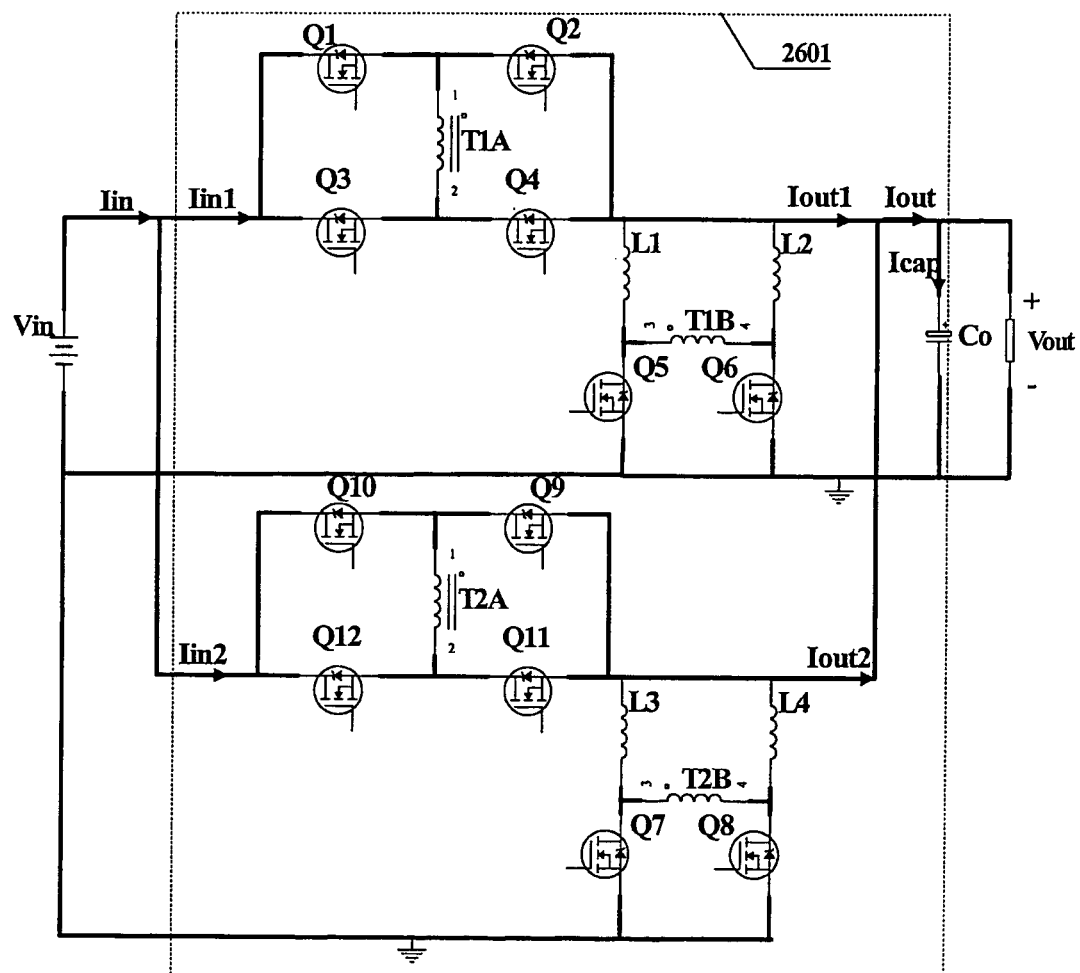
FIG. 26 is a schematic diagram of a two-phase interleaved non-isolated DC converter embodiment of the converter of FIG. 3.

Referring to FIG. 26, a two-phase interleaved non-isolated full-bridge DC converter 2601 is shown. In the figure, top non-isolated full-bridge DC converter 2603 includes Q1, Q2, Q3, Q4, Q5, Q6, T1, L1 and L2. Bottom non-isolated full-bridge DC converter 2605 includes Q7, Q8, Q9, Q10, Q11, Q12, T2, L3 and L4. Capacitor Co belongs to both converters 2603, 2605. Co could be implemented as separate capacitors for each converter 2603, 2605. Due to the interleaving the value of Co can be reduced. In addition, these two power stages operate in 90 degree phase shift.

Figure 27:
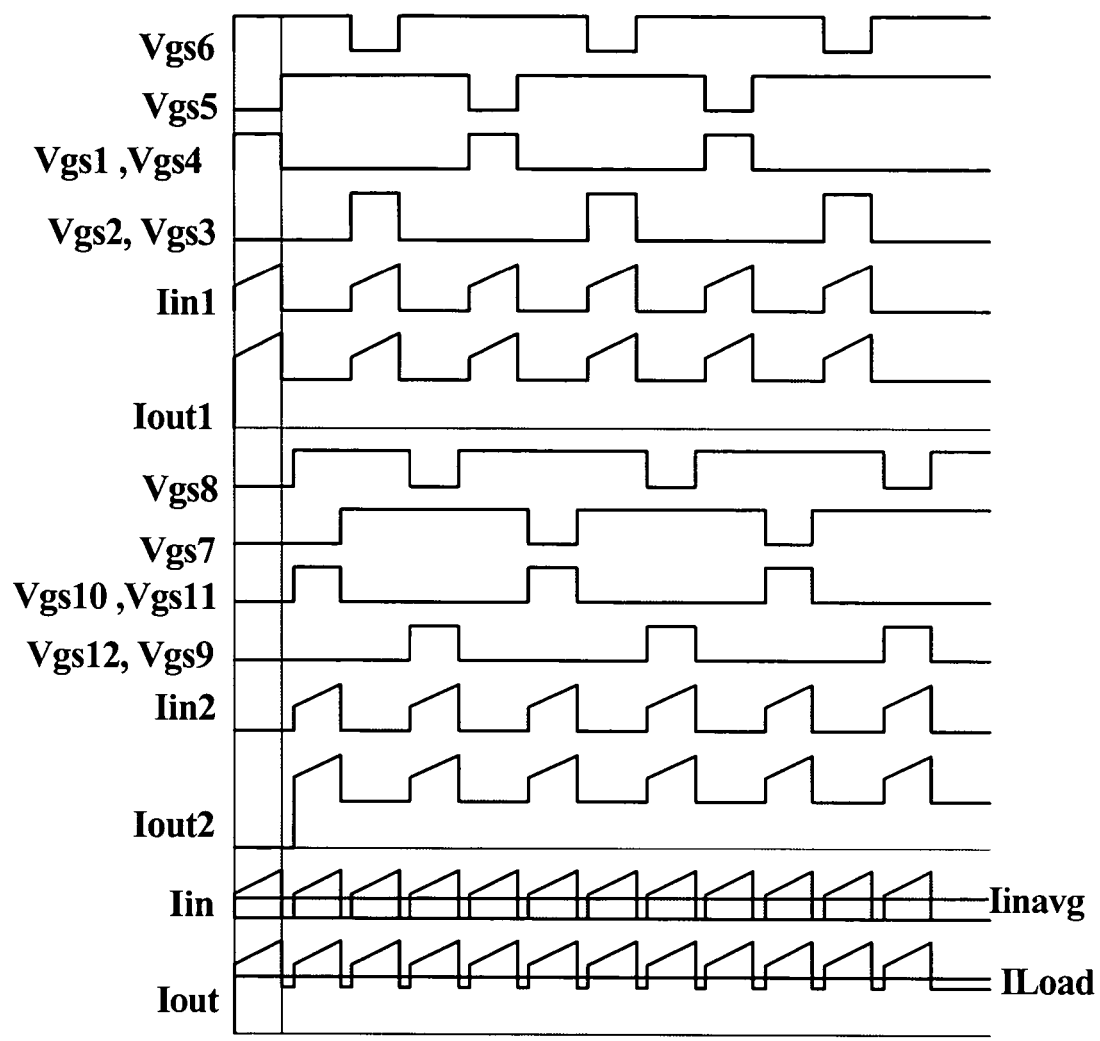
FIG. 27 is a graphic illustration of certain waveforms used with the two-phase interleaved non-isolated full-bridge DC converter embodiment of FIG. 26 with duty cycle of 40%.

Referring to FIG. 27, the main waveforms of the two-phase interleaved non-isolated full-bridge DC converter 2601 are shown. The gate drive signals for Q1, Q2, Q3, Q4, Q5, and Q6 are the same as those in FIG. 19; however, the gate drive signal for Q10 is delayed by a quarter of Ts (0.25*Ts or 90 degrees) with respect to Q1. Similarly, the gate drive signal for Q9 is delayed by a quarter of Ts or 90 degrees with respect to Q2. The gate drive signal for Q12 is delayed by 90 degrees with respect to Q3. The gate drive signal for Q11 is delayed by 90 degrees with respect to Q4. The gate drive signal for Q7 is delayed by 90 degrees with respect to Q5. The gate drive signal for Q8 is delayed by 90 degrees with respect to Q6. It can be observed from FIG. 27 that the ripple current through the input capacitor and output capacitor is significantly reduced. In addition, the ripple current frequency is four times the switching frequency. This fact is very beneficial for reducing the capacitor size and therefore, improving the dynamic response.

Figure 28:
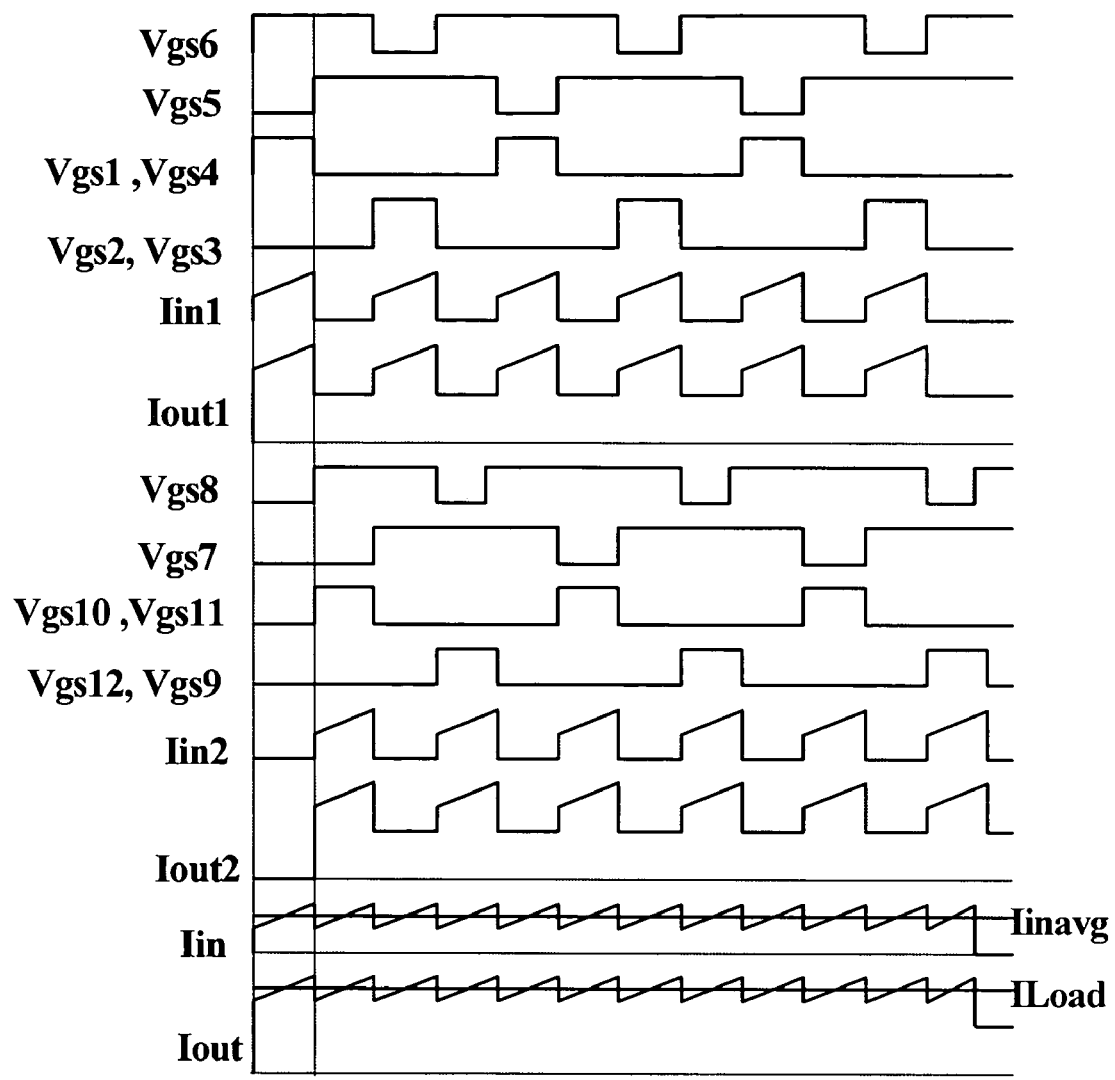
FIG. 28 is a graphic illustration of certain waveforms used with the two-phase interleaved non-isolated full-bridge DC converter embodiment of FIG. 26 with duty cycle of 50%.

In FIG. 27, a duty cycle of 40% is assumed. Referring to FIG. 28, the ripple cancellation effect is even more significant when the duty cycle is 50%. In this case, the input current is continuous with only inductor ripple present. The input current is always higher than zero.

Figure 29:
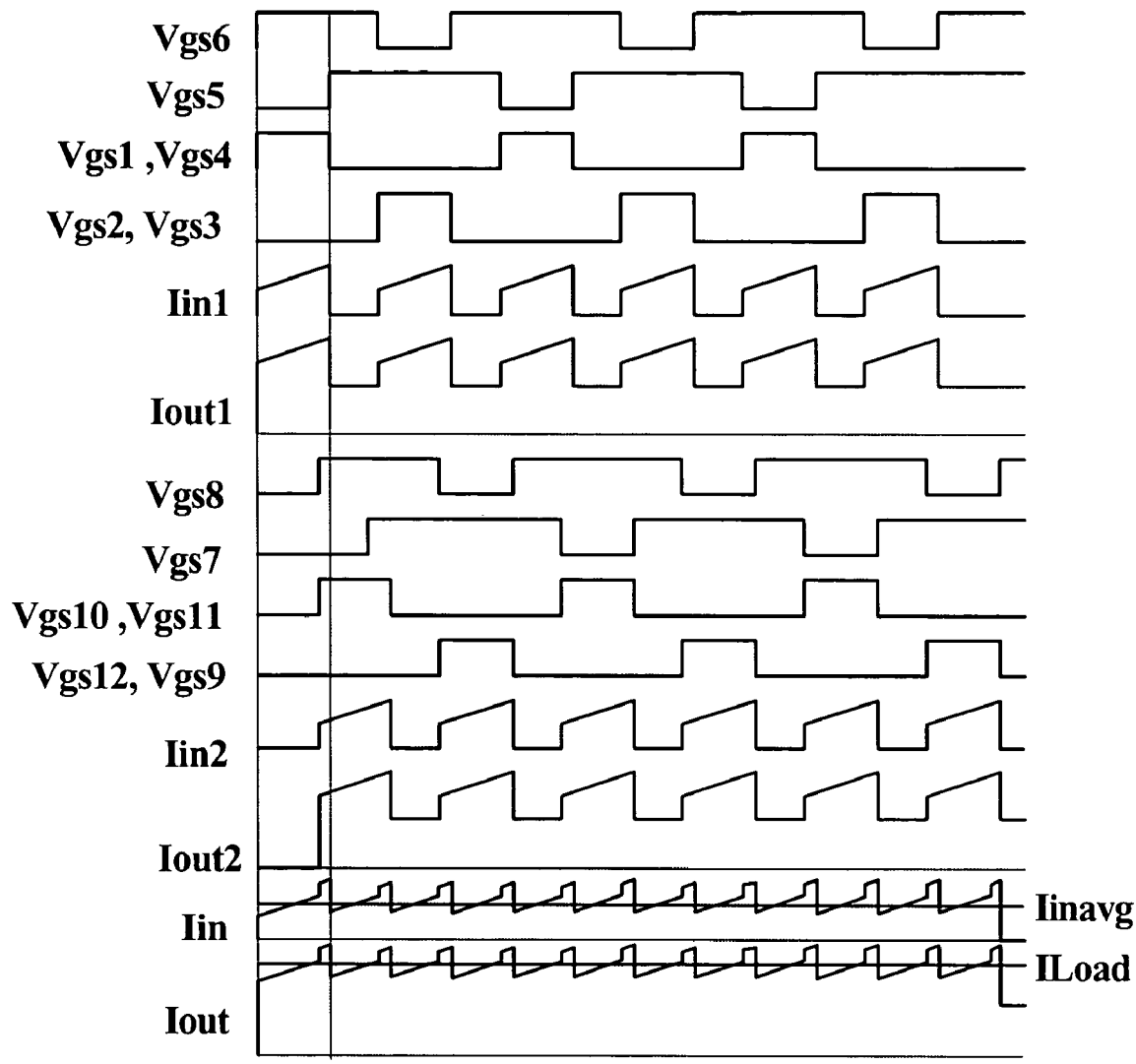
FIG. 29 is a graphic illustration of certain waveforms used with the two-phase interleaved non-isolated full-bridge DC converter embodiment of FIG. 26 with duty cycle of 60%.

Referring to FIG. 29, the waveforms of a two-phase interleaved full-bridge converter 2601 when duty cycle is 60% are shown. Again, significant ripple current reduction is achieved.

From the above analysis, it is demonstrated that by using the interleaved method, the input current ripple and output current ripple of the two-phase interleaved non-isolated full-bridge DC converter 2601 can be reduced significantly. In addition, the current ripple frequency is four times the switching frequency. This makes it possible to select a smaller output inductor and a smaller output capacitor. It is noted that a small output capacitor and a small output inductor can help achieve better dynamic response of the power converter 2601. In addition, the cost of the converter 2601 can be reduced.

Figure 30:
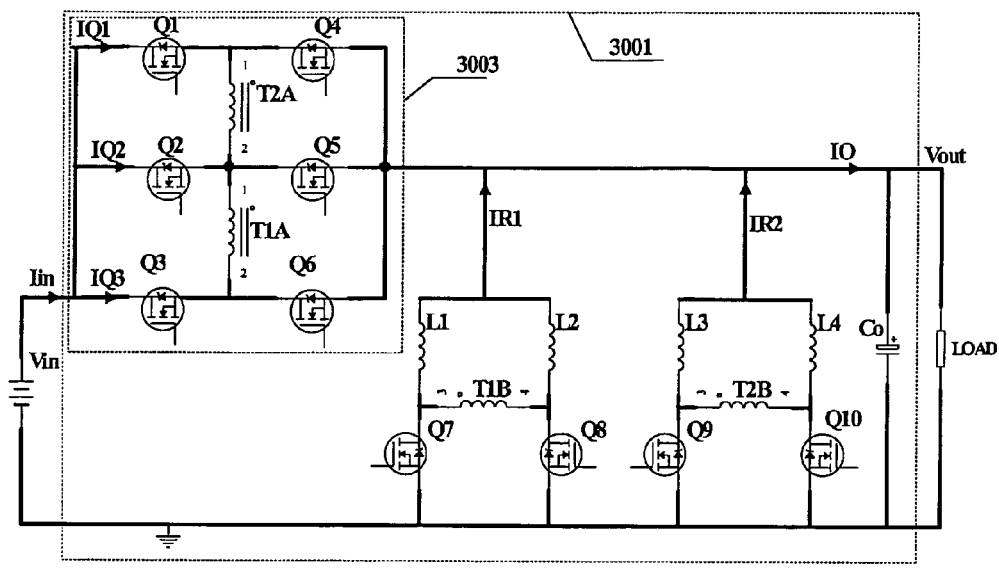
FIG. 30 is a schematic diagram of a two-phase interleaved non-isolated full-bridge DC converter embodiment of the converter of FIG. 3 with a high side circuit shared switch.

Referring to FIG. 30, a two-phase interleaved non-isolated full-bridge DC converter 3001 with shared switch is shown. As compared with the interleaved non-isolated full-bridge DC converter 2601, only six MOSFETs Q1–Q6 are used in the high side circuit 3003, as the number of primary switches is reduced, while the topology in FIG. 30 can realize the same function as the topology in FIG. 26.

Figure 31:
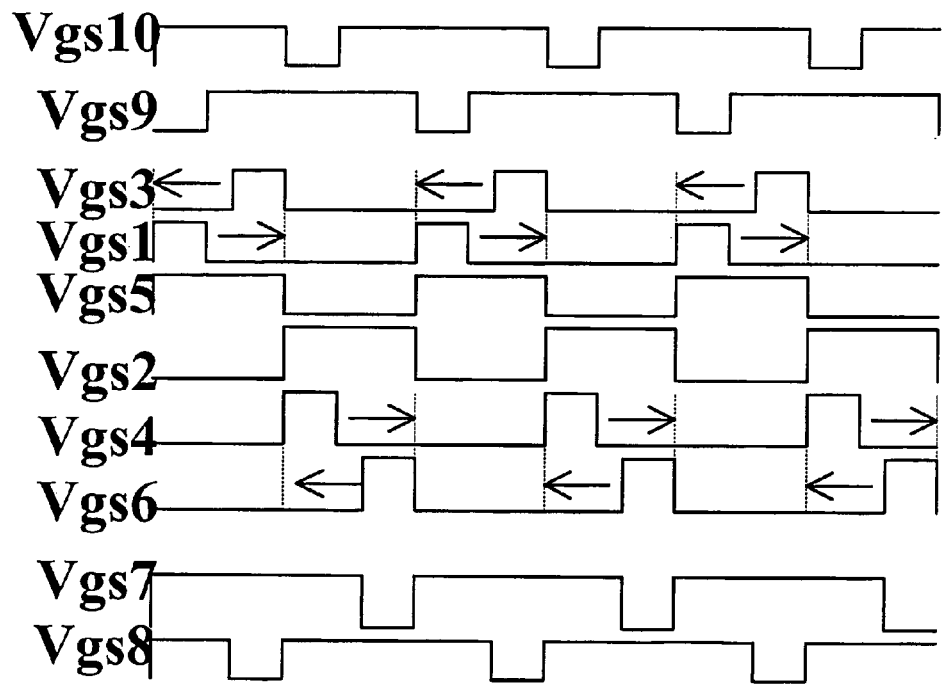
FIG. 31 is a schematic diagram of gate drive signals for the DC converter of FIG. 30.

Referring to FIG. 31, a special gate drive scheme should be used. One embodiment of the gate drive signal arrangement for all the switches in the above circuit is shown. Q2 and Q5 always conduct for half the switching period out of phase, which means Q2 conducts for the first half cycle and Q5 conducts for the second half cycle, as shown in the figure. Q1 and Q3 phase shift from each other. It is noted that in the control logic shown in FIG. 31, the move direction of Q1 and Q3 are different from conventional phase shift control. Q1 is turned on at the same time as Q5 is turned on. Q1 is turned off after on time TQ1on. Q3 should be turned off when Q5 is turned off. The turn on time of Q3 is controlled to achieve the required conduction time, TQ3on. This requirement is illustrated by the arrow in FIG. 31. Q4 and Q6 work in the same way as Q3 and Q5. For synchronous rectifiers, Q7 is driven by the complementary signal of Q6. Q8 is driven by the complementary signal of Q3. Q9 is driven by the complementary signal of Q1. Q10 is driven by the complementary signal of Q4, as shown in FIG. 31.

Figure 32:
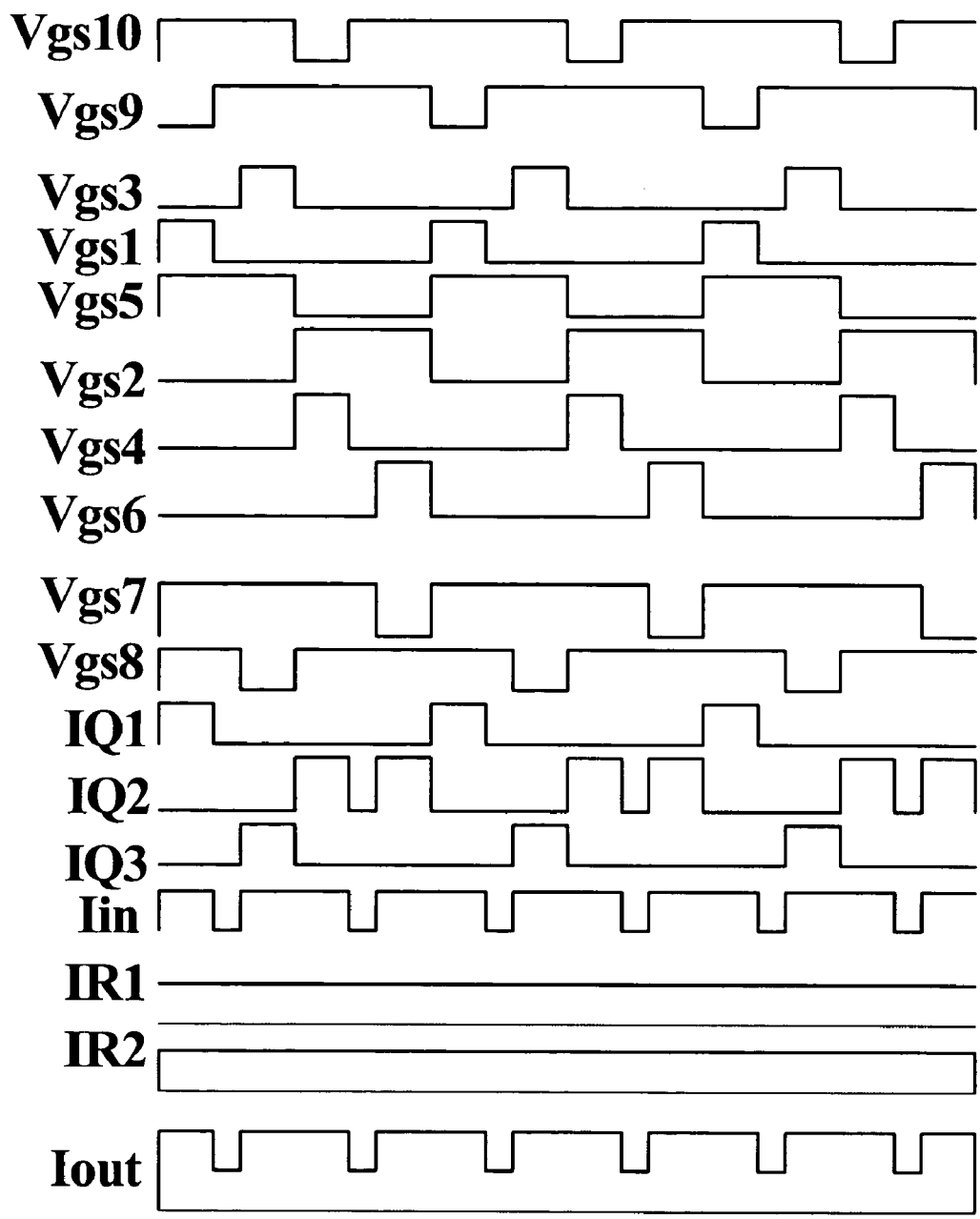
FIG. 32 is a graphic illustration of certain waveforms used with the two-phase interleaved non-isolated full-bridge DC converter embodiment of FIG. 30 with duty cycle of 40%.

Referring to FIG. 32, the input current and output current are shown, as well as the gate drive signals for the two-phase interleaved non-isolated full-bridge DC converter 3001 with high side circuit shared switch when the duty cycle is 40%. In the waveform, the current ripple for the inductor is neglected. It can be observed that the AC component of input current and output current is significantly reduced.

Figure 33:
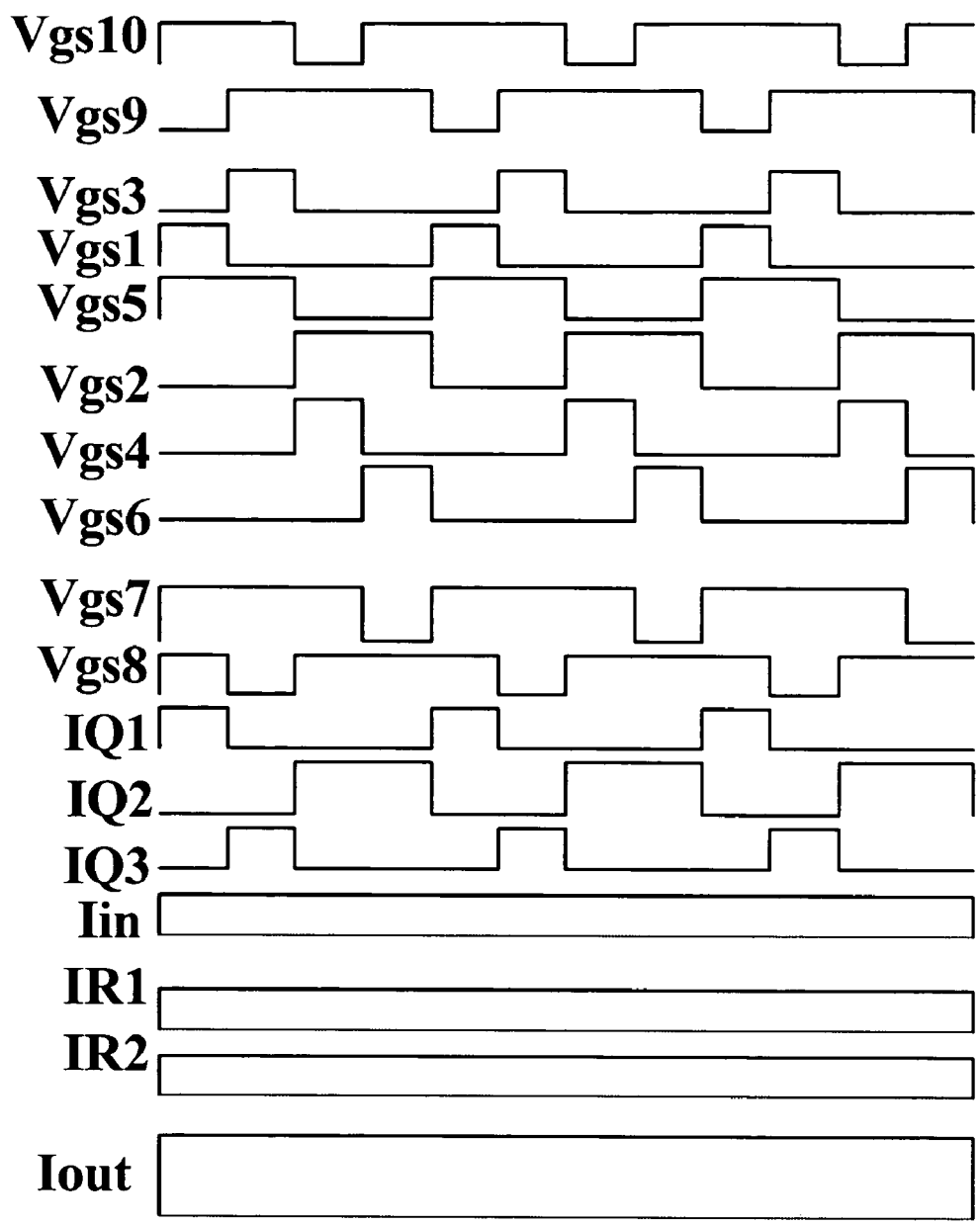
FIG. 33 is a graphic illustration of certain waveforms used with the two-phase interleaved non-isolated full-bridge DC converter embodiment of FIG. 30 with duty cycle of 50%.

Referring to FIG. 33, the impact of the ripple cancellation is even more significant when the duty cycle is 50%. When the duty cycle is 50%, the AC component of the input current and output current is complete cancelled. The input and output current is a pure DC value. In reality, only inductor ripple current appears at the input and output.

Figure 34:
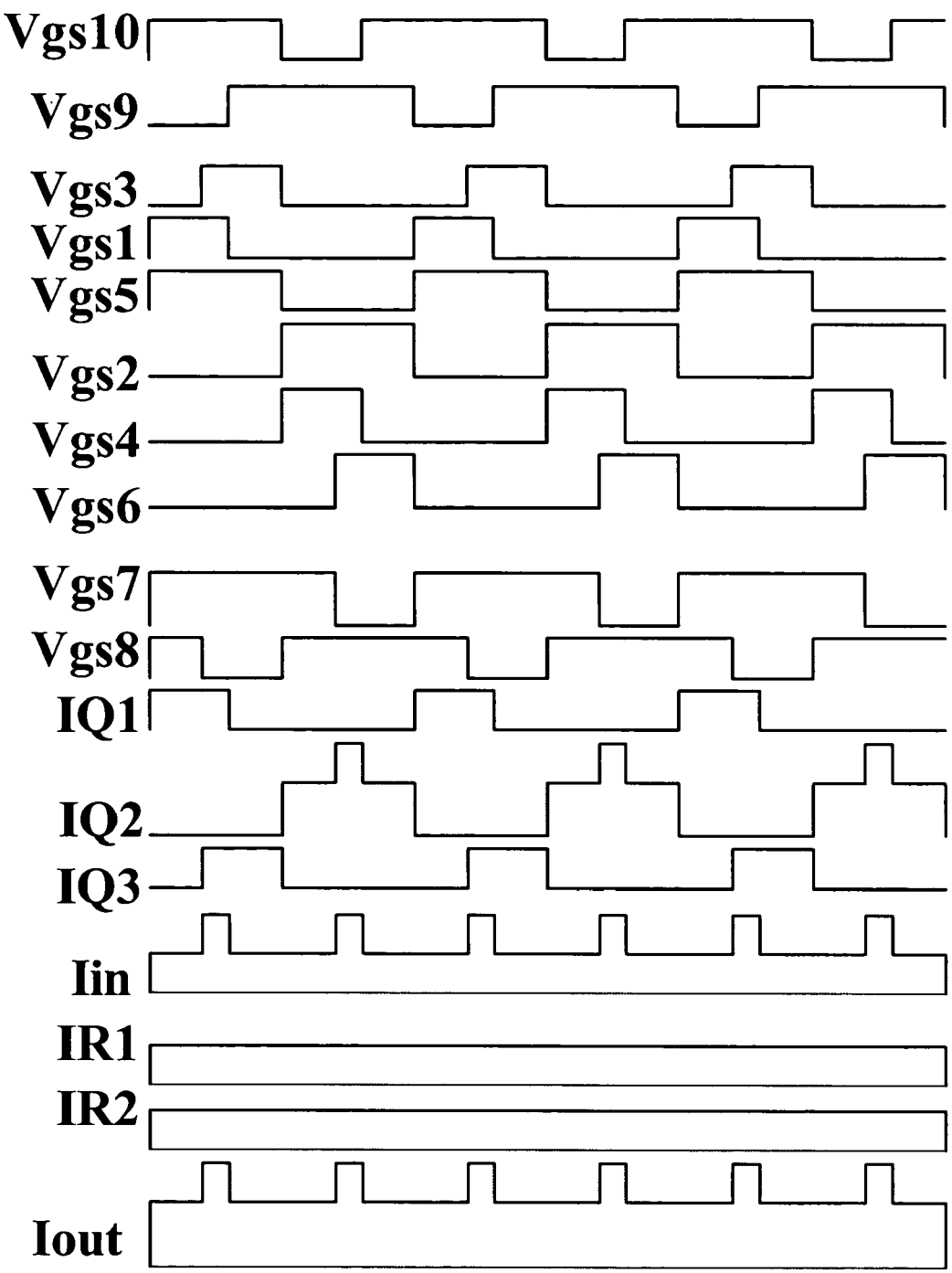
FIG. 34 is a graphic illustration of certain waveforms used with the two-phase interleaved non-isolated full-bridge DC converter embodiment of FIG. 30 with duty cycle of 60%.

Referring to FIG. 34, the input current and output current waveforms when the duty cycle is 60% are shown. Again, significant ripple reduction is achieved.

Figure 35A:
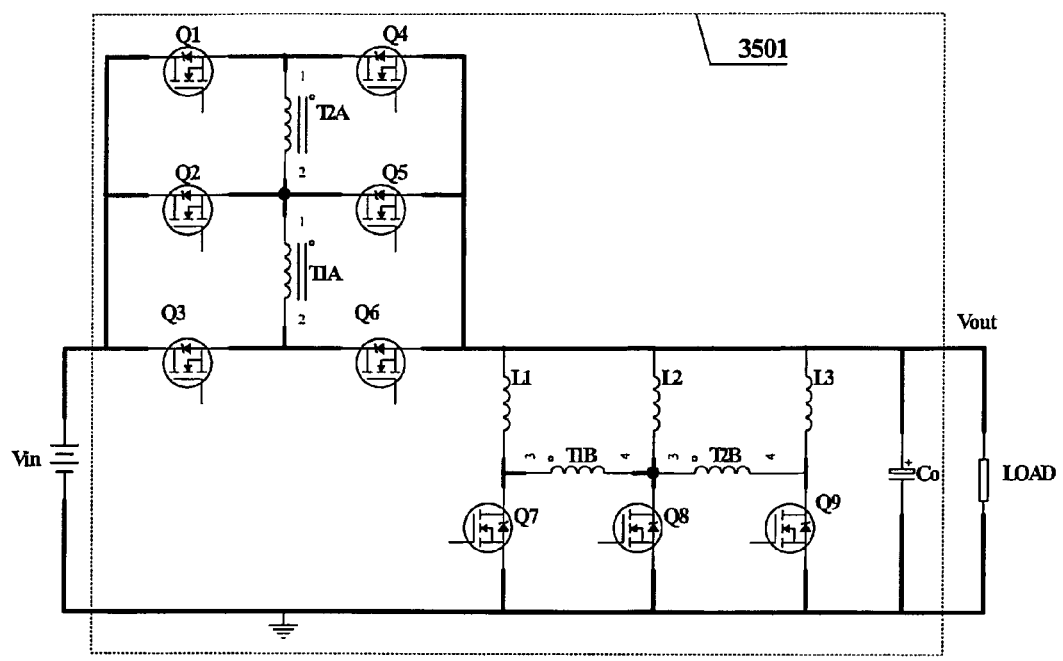
FIG. 35A is a schematic diagram of a two-phase interleaved non-isolated full-bridge DC converter embodiment of the converter of FIG. 3 with high side circuit shared switch and rectifier circuit shared switch.

Referring to FIG. 35A, another two-phase interleaved non-isolated full-bridge DC converter 3501 with high side circuit shared switches and rectifier circuit shared switches is shown. In this converter, the number of rectifier circuit switches is reduced from four to three. The number of inductors is reduced to three also. This simplifies the control logic. At the same time, it can achieve all the functions the topology in FIG. 30 can achieve. It is noted that the rectifier circuit has fewer components; however, this topology will have slightly more conduction loss when compared with converter 3001 in FIG. 30.

Figure 35B:
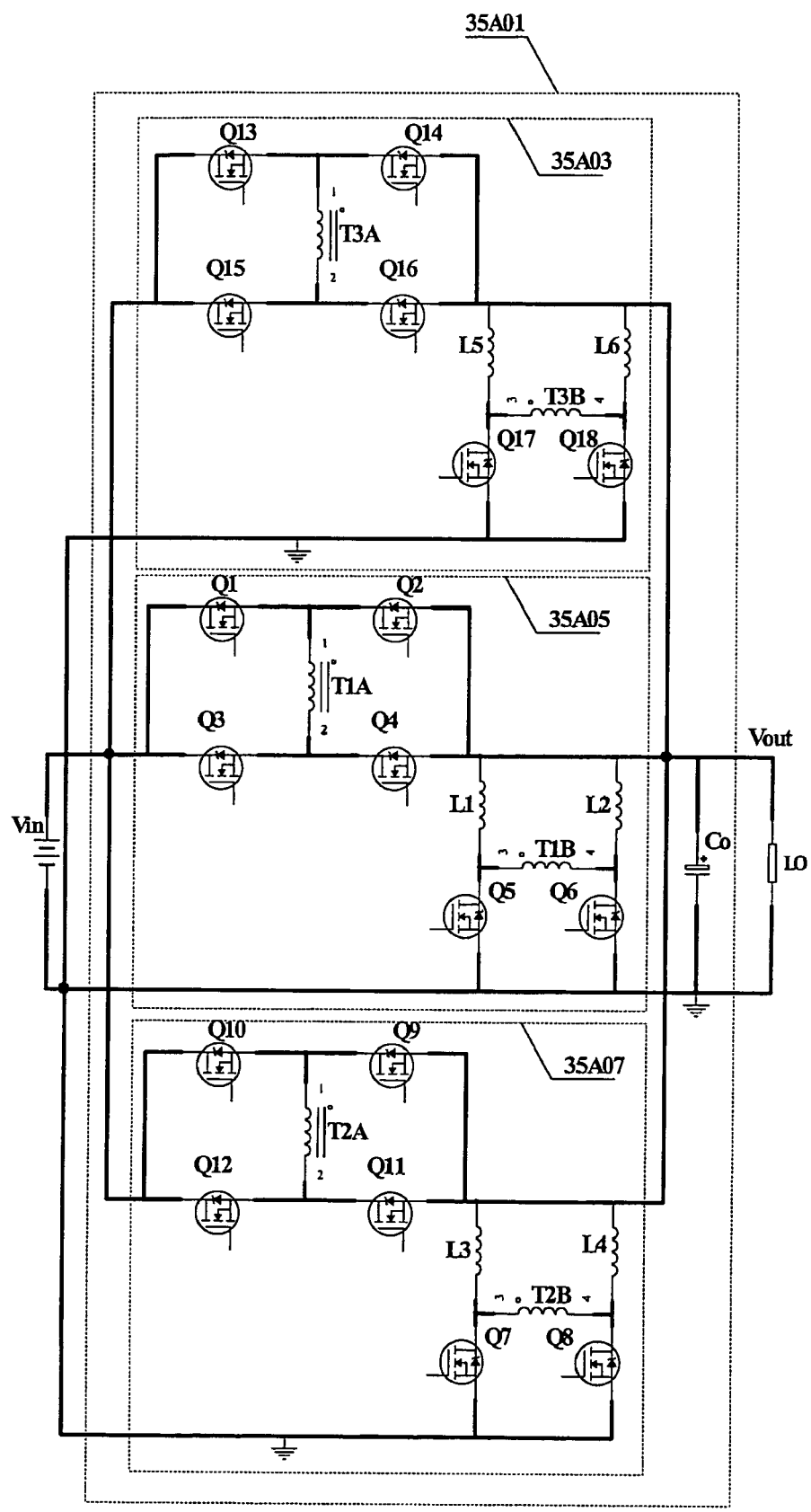
FIG. 35B is a schematic diagram of a basic three-phase interleaved non-isolated full-bridge DC converter embodiment of the converter of FIG. 3

Similar to two-phase interleaving to reduce the input and output current ripple, three-phase interleaving can be achieved by using three non-isolated full-bridge DC converter connected in parallel. FIG. 35B shows the schematic diagram of a three-phase interleaved non-isolated full-bridge converter. In this circuit, 12 high side switches are used.

Figure 36:
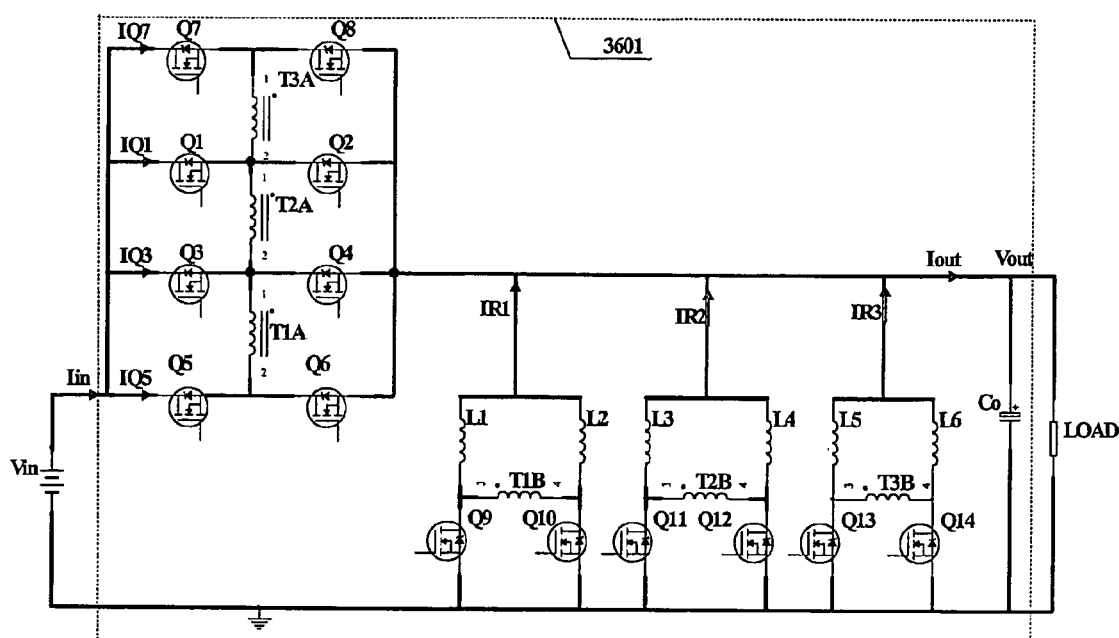
FIG. 36 is a schematic diagram of a three-phase interleaved non-isolated full-bridge DC converter embodiment of the converter of FIG. 3 with primary shared switches.

The technique to share the high side switch can also be used in the case of three-phase interleaved non-isolated full-bridge DC converter. Referring to FIG. 36, again, similar to two-phase interleaving with shared high side switch, a three-phase interleaved non-isolated full-bridge DC converter with shared high side switch is shown. Another pair of switches and one transformer primary winding is added. The circuit shown in FIG. 36 requires only eight high side switches and it can achieve the same performance as a three-phase converter without shared switches, as shown in FIG. 35B. In same way, four- or more-phase interleaved non-isolated DC converters with high side circuit shared switches can be derived. They are not illustrated here.

Figure 37A:
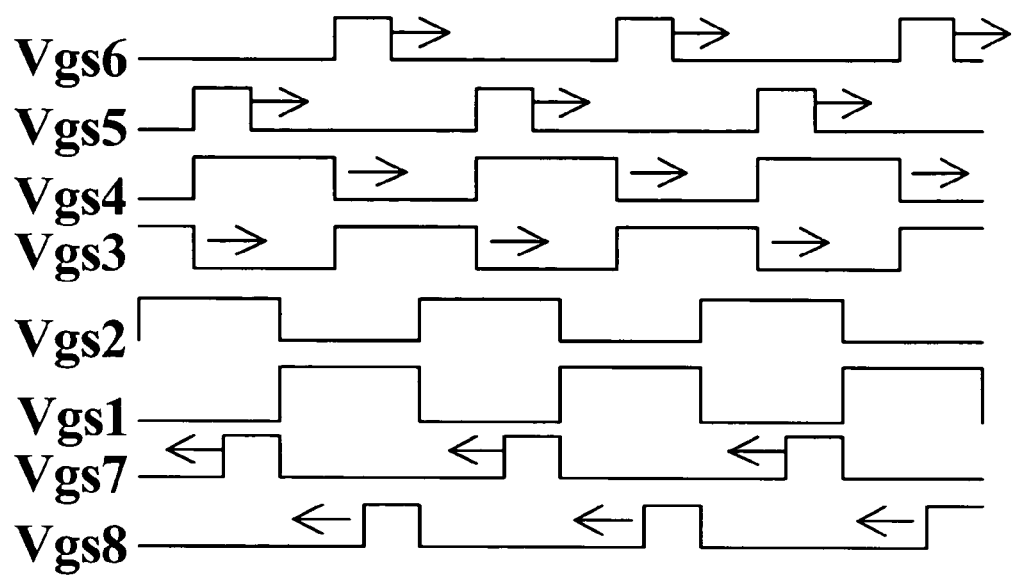
FIG. 37A and FIG. 37B are each a graphic illustration of a gate drive scheme for the converter of FIG. 36 with a duty cycle of 30%.
Figure 37B:
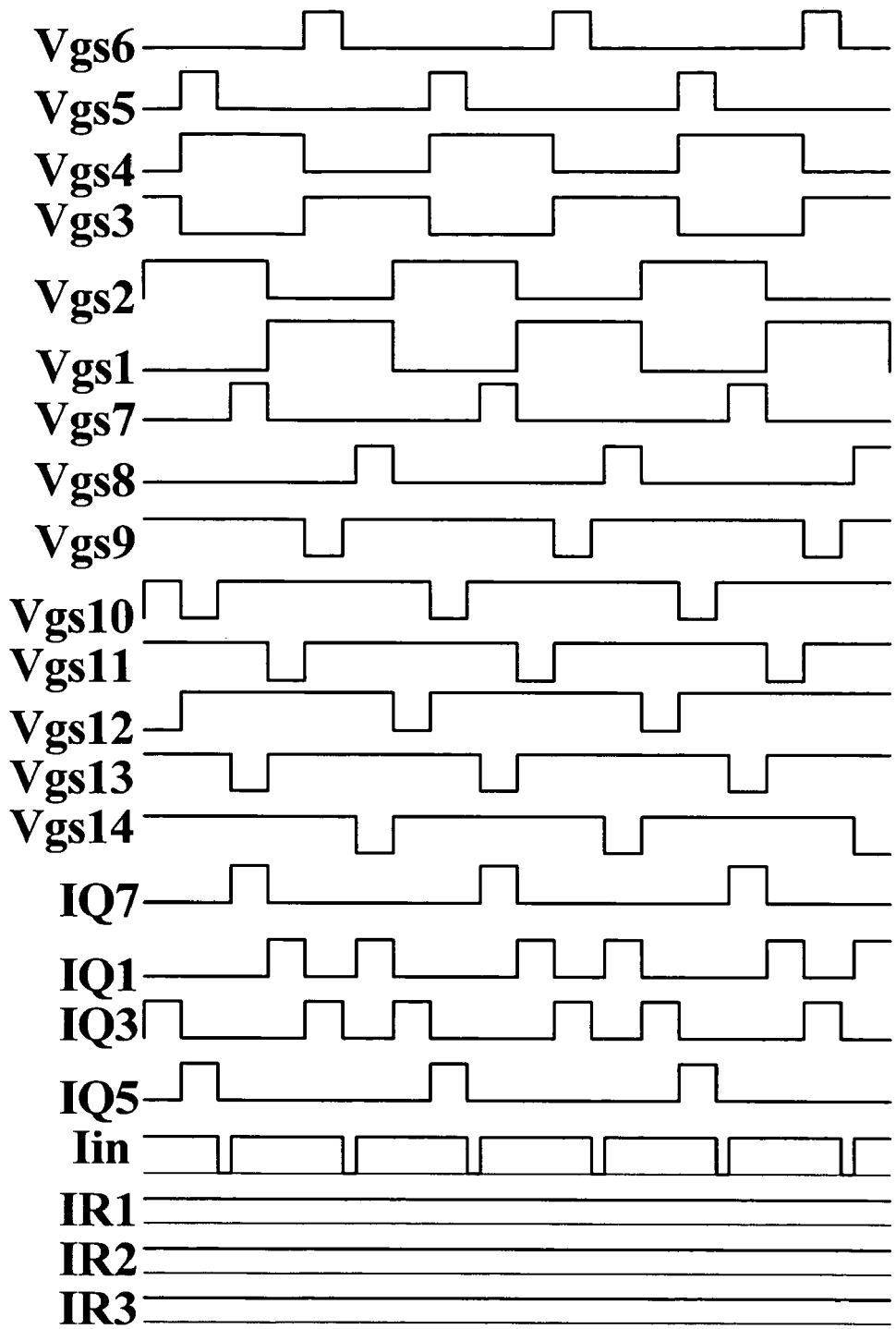

Referring to FIG. 37A and FIG. 37B, a special gate drive scheme is needed. One embodiment of the gate drive scheme is shown for the three-phase full-bridge converter 3601 with 8 primary switches. This topology can realize the same function as the basic three-phase interleaved non-isolated full-bridge converter shown in FIG. 35B. In this circuit, Q1 and Q2 conduct out of phase. Q3 and Q4 conduct out of phase also. Q3 and Q4 phase shift according to Q1 and Q2. Q5 turns on when Q4 turns on, Q6 turns on when Q3 turns on, and Q6 and Q5 only change their turn off time. Q7 turns off when Q2 turns off and Q8 turns off when Q1 turns off. Q7, Q8 only change their turn on time. This topology will have the smallest input and output current ripple when the duty cycle is 33.3%. The waveform is shown in FIG. 37B.

When compared with the two-phase circuit 3001 shown in FIG. 30, this topology adds two more high side circuit switches, another transformer, and two rectifier circuit switches. One can add more switches in the high side and rectifier circuits to form a four-phase shift or even more-phase shift converter, and the rectifier circuit switches can also be shared as shown in FIG. 35A. In this way, the frequency of input and output current can be increased, and the current ripple of the input and output current reduced. Current stress of the switches can also be reduced. This has advantages in high power and high current applications.

Figure 38A:
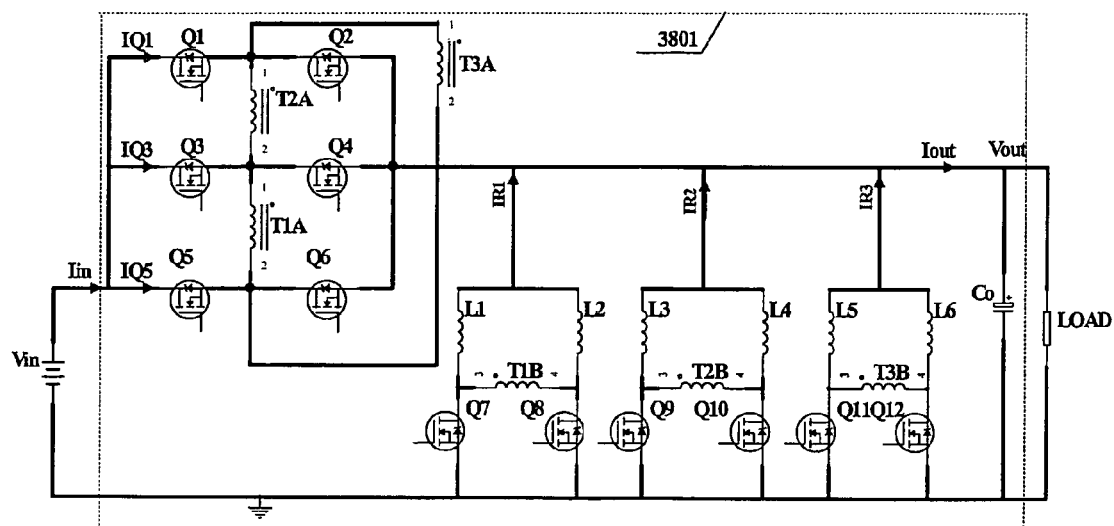
FIG. 38A is a schematic diagram of a simplified three-phase interleaved non-isolated full-bridge DC converter embodiment of the converter of FIG. 3 with primary shared switches.

Referring to FIG. 38A, another three-phase interleaved non-isolated full-bridge converter 3801 is shown. A third primary winding T3A is added to the high side circuit of converter 3001 in addition to other primary windings T1A and T2A. Therefore, only six high side switches are needed.

Figure 38B:
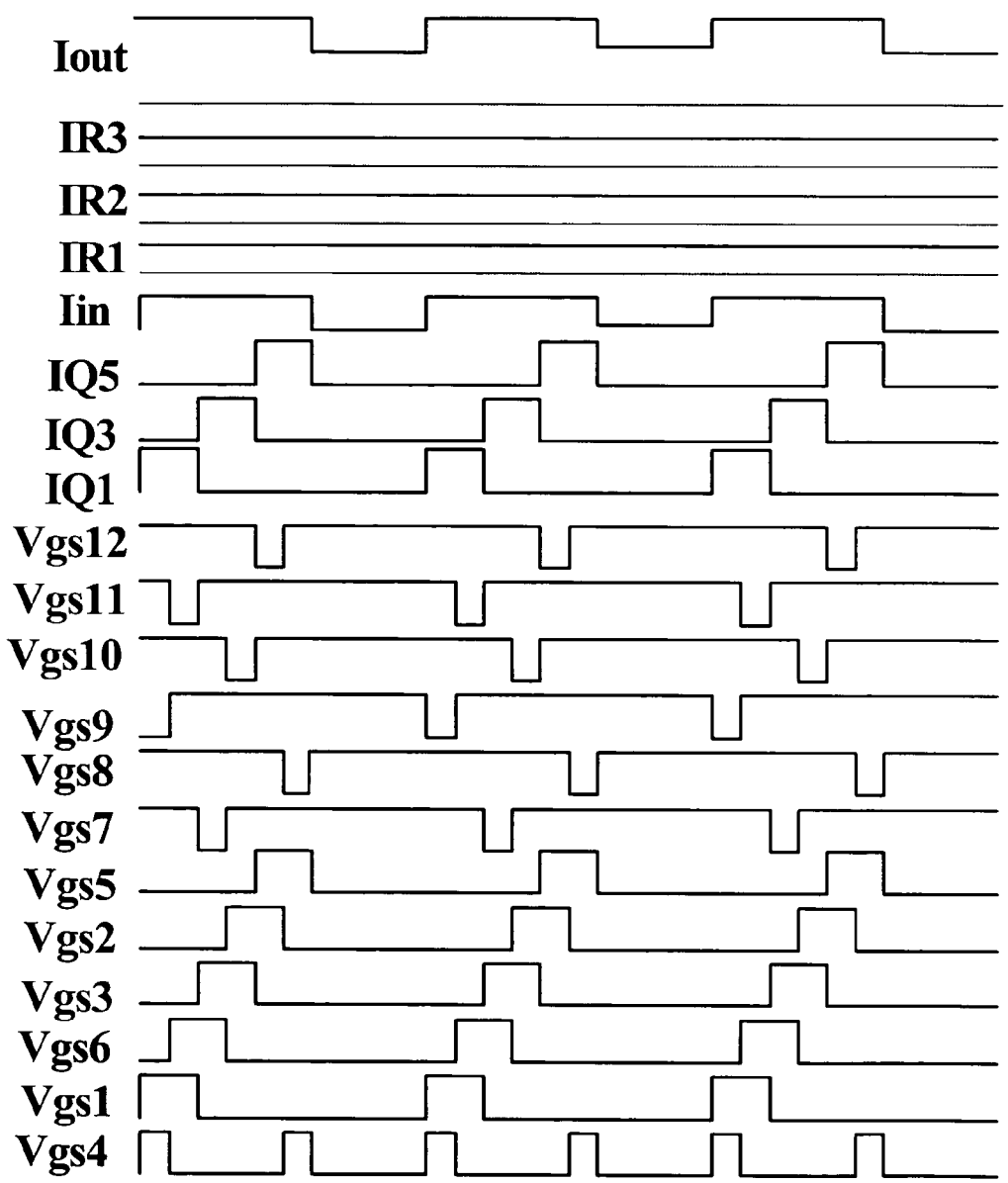
FIG. 38B is a graphic illustration of one gate drive scheme for the converter shown in FIG. 38A.
Figure 39:
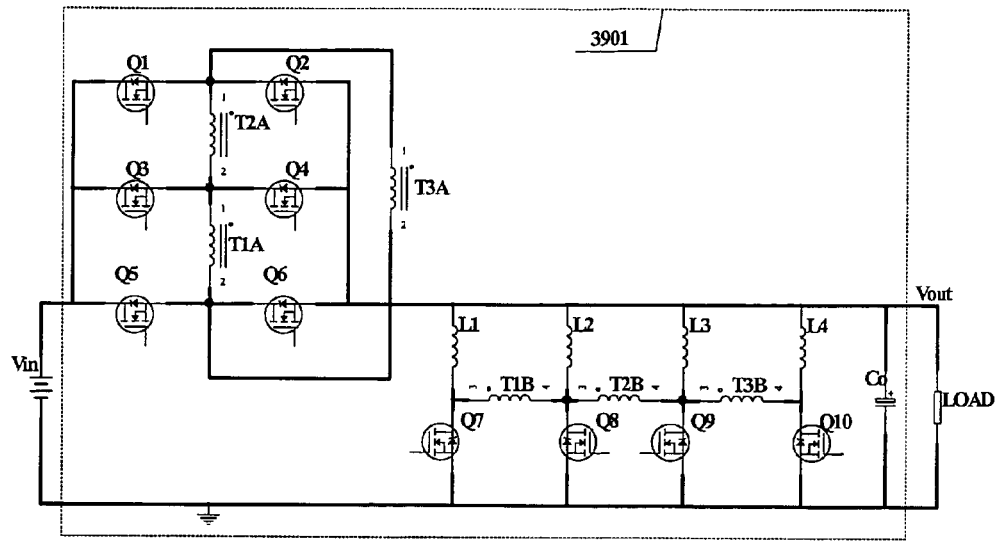
FIG. 39 is a schematic diagram of a simplified three-phase interleaved non-isolated full-bridge DC converter embodiment of the converter of FIG. 3 with primary shared switches and rectifier circuit shared switch.

One gate drive scheme for the converter 3801 is provided in FIG. 38B. Referring to FIG. 39, a circuit topology for three-phase interleaved non-isolated full-bridge DC converter 3901 with rectifier circuit shared switches is shown.

In these topologies, six high side switches form three power stages and phase shift from each other. The output power is shared between the three power stages. The current ripple of the three power stages when added together is three times switching frequency and the current ripple of the three power stages can cancel each other. These topologies have advantages in high current applications.

The topology in FIG. 39 has fewer switches in the rectifier circuit than the topology in FIG. 38A, while it can realize the same function as the topology in FIG. 38A. This makes the control logic simpler. This topology will have more conduction losses when compared to the topology in FIG. 38A.

The above section describes several non-isolated DC converters when the circuit 401 shown in FIG. 4 is used as the high side circuit 305. Detailed analysis has been given for a basic non-isolated full-bridge DC converter 1501 as shown in FIG. 15. As will be evident to those skilled in the art using the principles described herein, the analysis of other converters described herein can be done in a similar way.

It should be noted that the above analysis has not explored all the combinations of the new circuits. A person skilled in the art can derive other types of circuit configuration using the same methodology presented in this disclosure. The following section describes the operation of the non-isolated DC converters when the high side circuit (as shown in FIG. 3) is derived using two MOSFETs as switches, one transformer primary winding and two capacitors as a voltage divider. Several improved embodiments based on this arrangement are described below.

Figure 40:
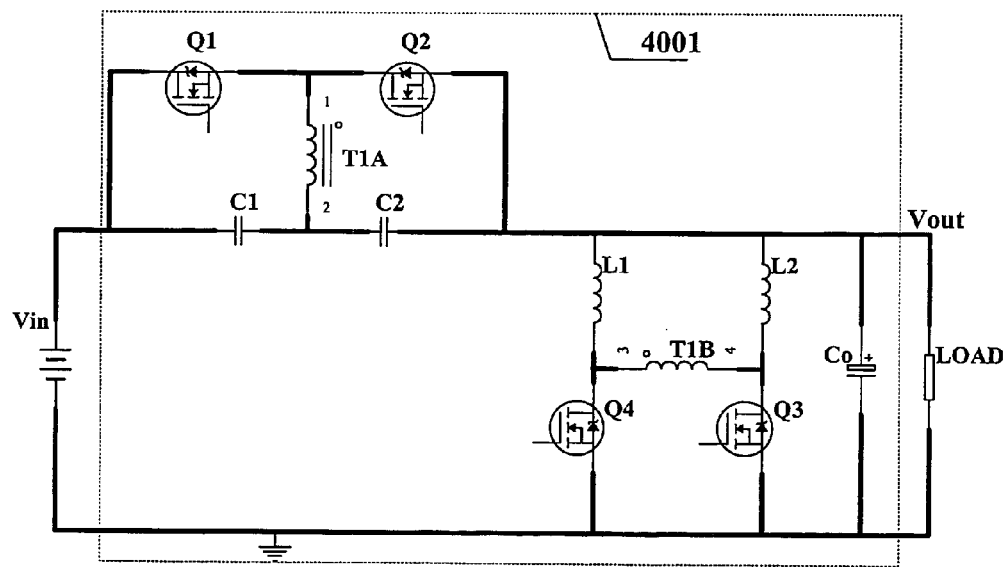
FIG. 40 is a schematic diagram of a non-isolated half-bridge DC converter embodiment of the converter of FIG. 3.

Referring to FIG. 40, a non-isolated half-bridge DC converter 4001 is shown. It has similar characteristics to basic non-isolated full-bridge DC converter 1501 as shown in FIG. 15. As the input current goes directly to the load, the current stress of the synchronous rectifiers is reduced.

By selecting the turns ratio N properly, the duty cycle D of the converter can be around 50%, which is beneficial for the performance of the converter 4001.

The operation of the basic non-isolated half-bridge DC converter 4001 shown in FIG. 40 will now be described.

Figure 44:
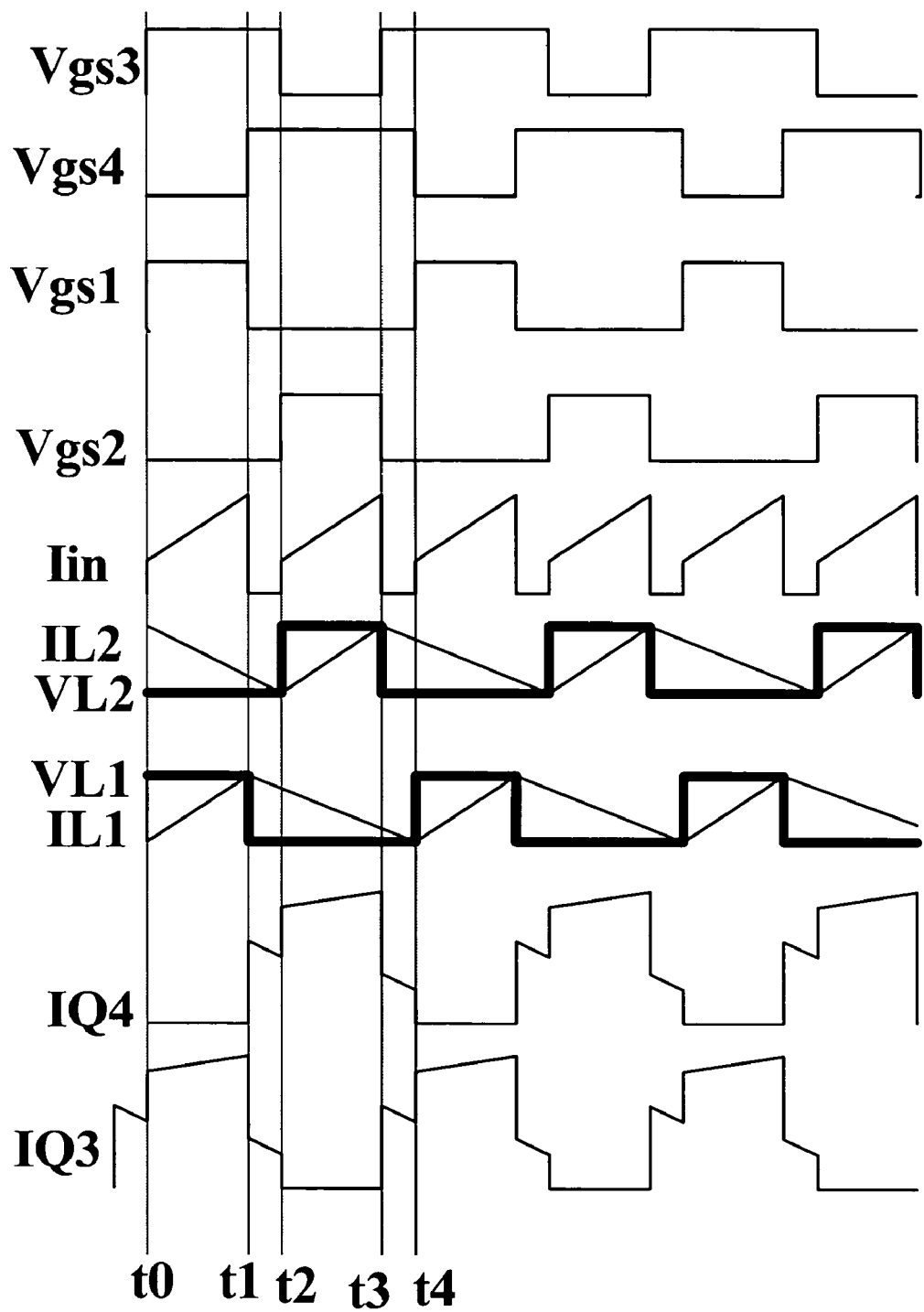
FIG. 44 is a graphic illustration of certain waveforms for the half-bridge converter of FIG. 40.

Referring to FIG. 44, the main waveforms for the non-isolated half-bridge DC converter 4001 are shown, where:
1. Vgs1 to Vgs4 are the gate signals of the four switches: two high side switches Q1, Q2 and two rectifier switches Q3, Q4.
2. Iin is the input current, and IL1 and IL2 are the current in L1 and L2.
3. IQ3 and IQ4 are the current in switches Q3 and Q4, VL1 and VL2 are the voltage across L1 and L2.

Figure 41:
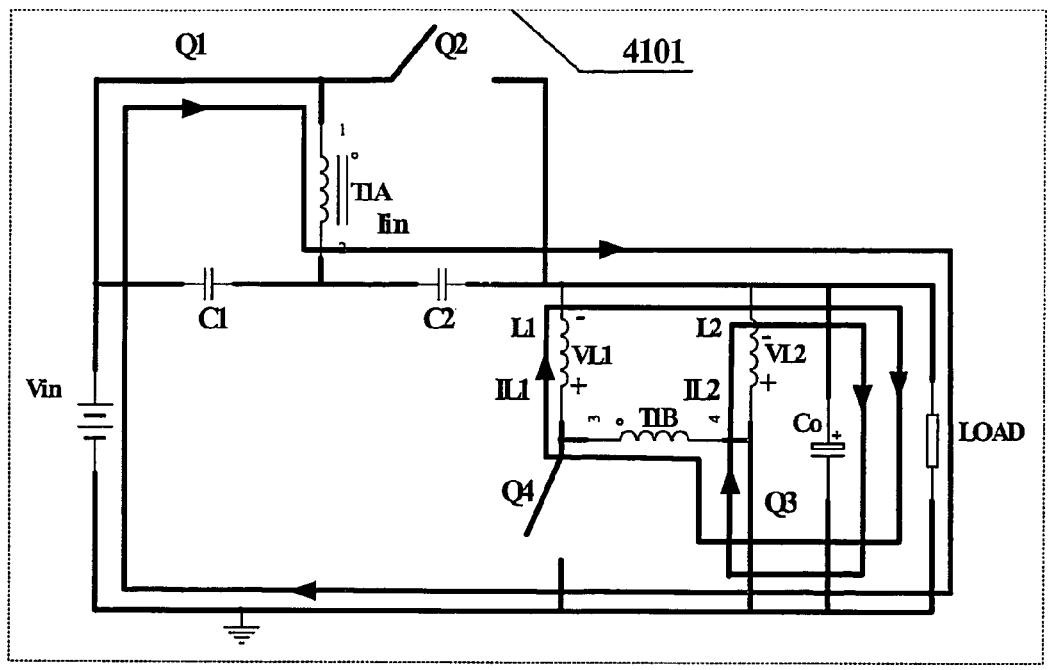

In Interval 1: from t0 to t1, Q1, Q3 are on. The input current flows through Q1 and the transformer primary winding to the load. The inductor current also flows into the load side. The current in inductor L1 rises and the current in L2 is falling. The equivalent circuit 4101 is shown in FIG. 41.

Figure 42:
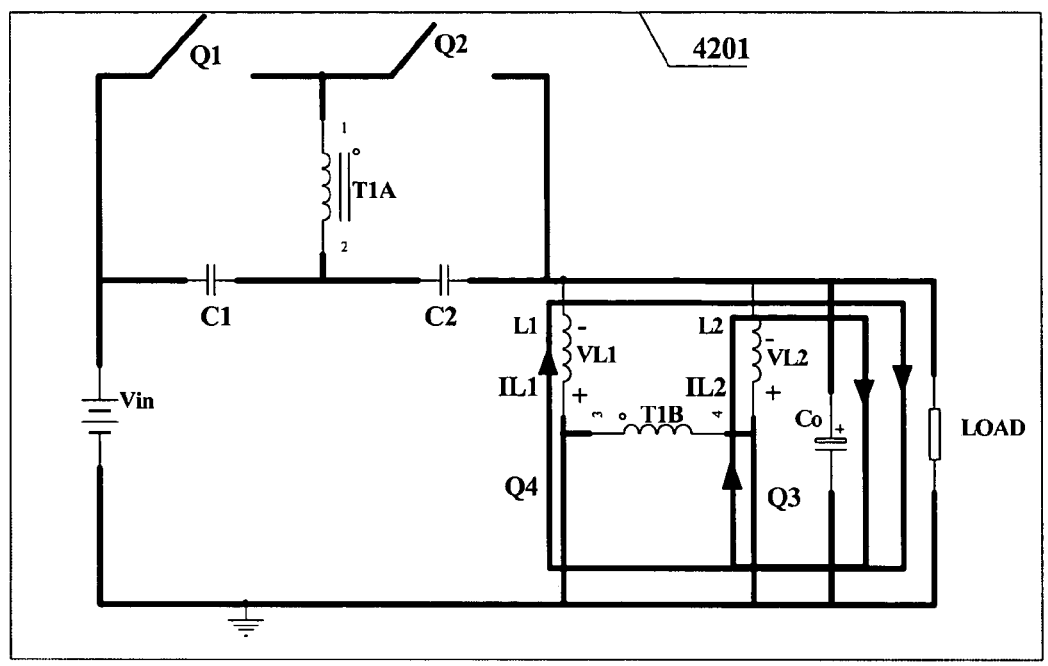

At Interval 2: from t1 to t2, Q1 is turned off and Q4 is turned on. Therefore, Q1, Q2 are off and Q3 and Q4 are on. During this interval, the input current is zero. The inductor current and output capacitor provide the load current. The current in L1 and L2 are falling. The energy stored in L1 and L2 is released to the load. The transformer secondary winding is shorted. The equivalent circuit 4201 is shown in FIG. 42.

Figure 43:
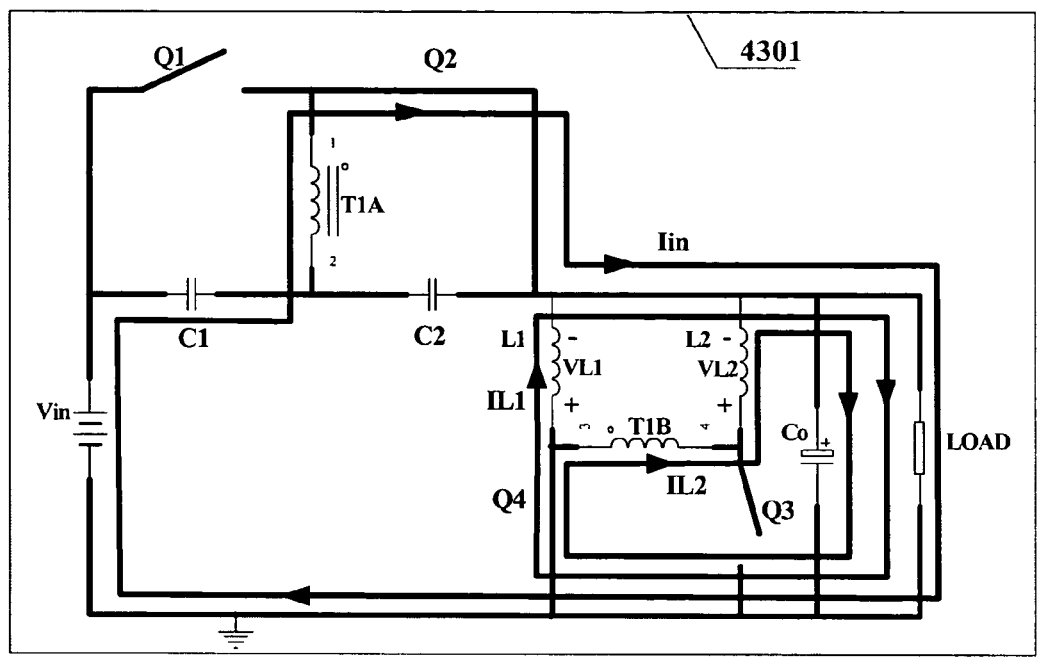

At Interval 3: from t2 to t3, Q2 is turned on and Q3 is turned off. The on devices for this interval are Q2 and Q4. The input current flows through Q2 and the transformer primary winding to the load. The inductor current also provides current to the load. The inductor current in L2 is rising and the current in L1 is falling. The equivalent circuit 4301 is shown in FIG. 43.

At Interval 4: from t3 to t4, Q2 is turned off and Q3 is turned on again. Q1, Q2, are off and Q3, Q4 are on. This stage is same as interval 2. During this interval, the inductor current and output capacitor provide the load current. The input current is zero. The current in L1 and L2 is falling. The transformer secondary winding is shorted. The equivalent circuit 4201 is in FIG. 42

From the above analysis, the input and output voltage relation can be derived as:

$$V_{out} = N*D*V_{in}/(4+2*D*N)$$

Where D is the duty cycle, defined as $T_{onQ1}/(0.5 * T_s)$, N=Ns/Np and Vin is the input voltage.

The previous section discusses in detail a basic non-isolated half-bridge DC converter 4001. When different rectifier circuits are used, other types of non-isolated half-bridge DC converter can be derived. In this section, two alternative embodiments of the non-isolated half-bridge DC converter are shown. Their operation is similar to the original embodiment as shown in FIG. 40. Other embodiments can also be derived using same method.

Figure 45:
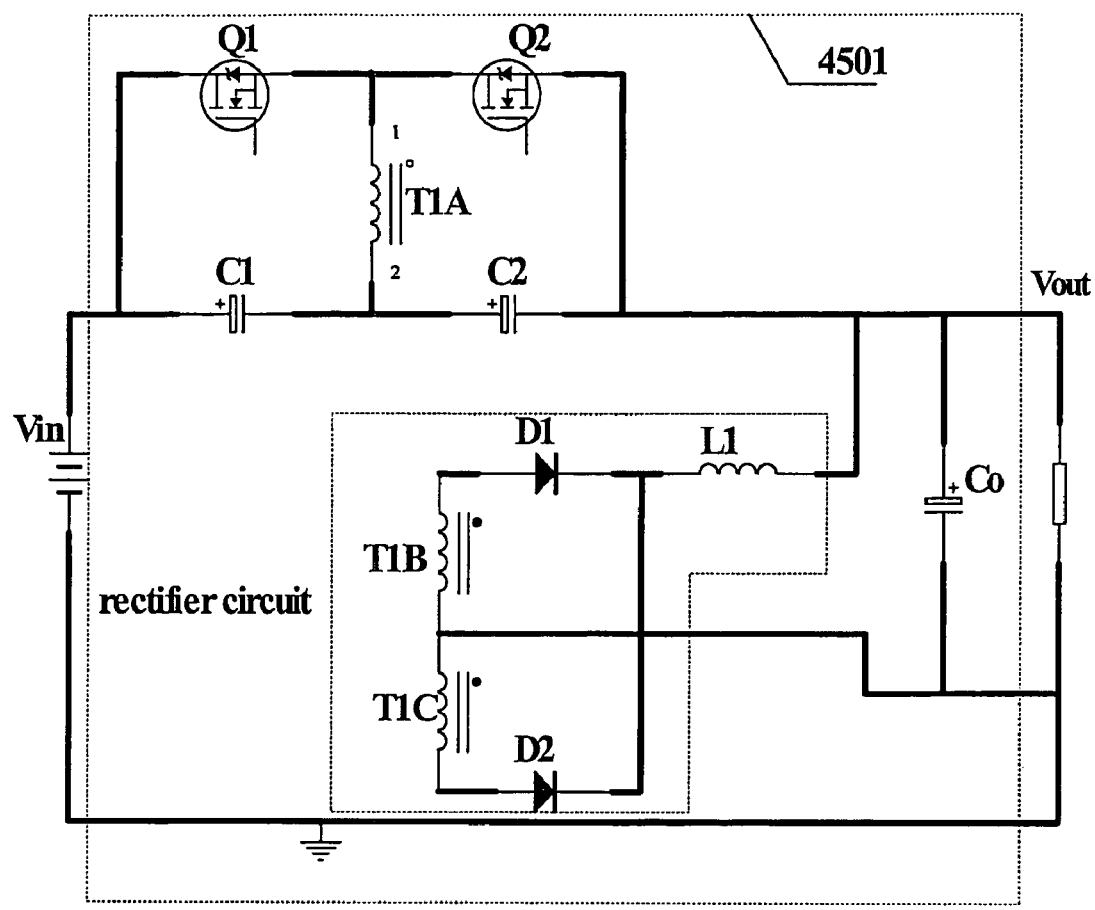
FIG. 45 is a schematic diagram of another embodiment of a non-isolated half-bridge DC converter embodiment of the converter of FIG. 3.

Referring to FIG. 45, in converter 4501 a high side circuit consists of two MOSFETs Q1, Q2 and two capacitors C1, C2. Otherwise, the converter 4501 is the same as the converter 2101 of FIG. 21, as the rectifier circuit is same.

Figure 46:
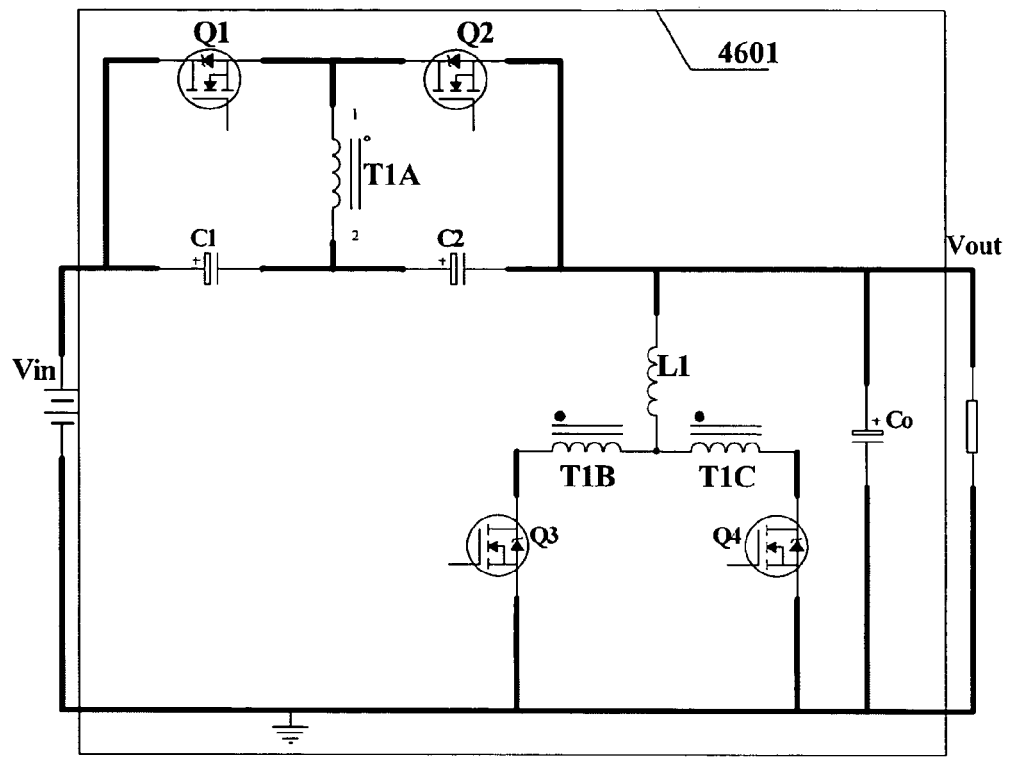
FIG. 46 is a schematic diagram illustrating the use of a synchronous rectifiers instead of diodes in the converter of FIG. 45.

Referring to FIG. 46, synchronous rectifiers Q3, Q4 in converter 4601 replace the diodes D1, D2 in the converter 4501 shown in FIG. 45 in order to reduce the power loss in low output voltage applications. The position of Q3, Q4 is interchanged with the secondary windings in order to simplify the requirement for the gate drive of Q3 and Q4.

In order to increase the current carrying capability or to reduce power loss in rectifier circuits, two or more rectifier sections (each rectifier section including its own rectifying circuit) can be connected in parallel.

Figure 47:
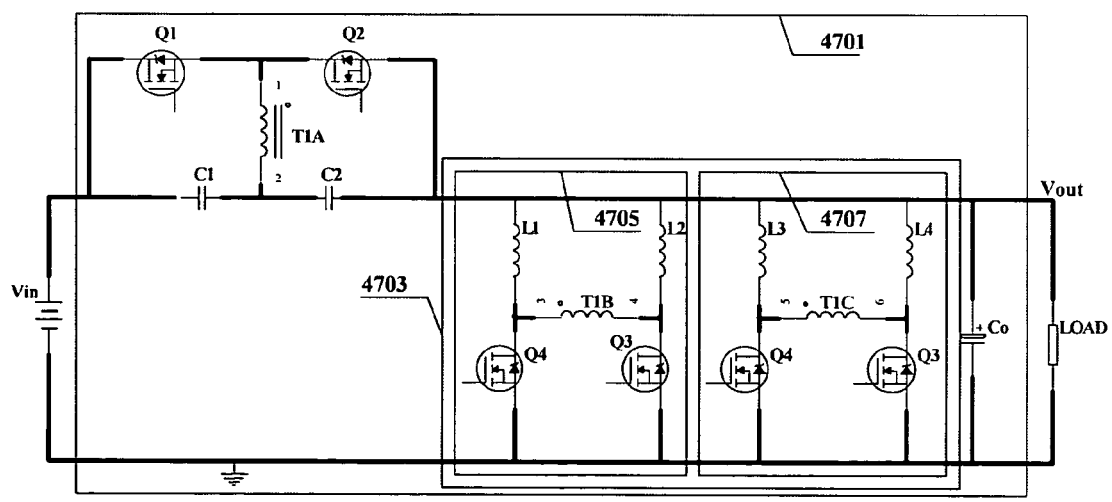
FIG. 47 is a schematic diagram of a non-isolated half-bridge DC converter embodiment of the converter of FIG. 3 with two rectifier sections.

Referring to FIG. 47, a non-isolated half-bridge DC converter 4601 with a rectifier circuit 4703 having two rectifier sections 4705, 4707 is shown. Converter 4701 has two secondary windings T1B, T1C coupled with the primary winding T1A. The load current is shared in the two secondary windings T1B, T1C. As the conduction losses is $I^2R$, if the resistance is the same, and the current is halved, the overall conduction losses are reduced by two times, this is more effective than parallel switches to reduce conduction losses when the impact of the parasitic components are considered. Referring again to FIG. 47, there are two secondary windings T1B, T1C in parallel. Three or four or even more secondary windings can be paralleled to share the load current. Every time one secondary winding is added, two inductors also need to be added.

Two or more other types of rectifier circuits, such as those shown in FIG. 13 and FIG. 14, can also be connected in parallel to increase the output current carrying capability and/or reduce the conduction loss at the rectifier circuits.

Detailed circuit diagrams are not shown in this description, but would be evident to one skilled in the art employing the principles described herein.

Multi-phase interleaving technology can also be used in non-isolated half-bridge converters to reduce input and output current ripple and to improve dynamic response.

Figure 48:
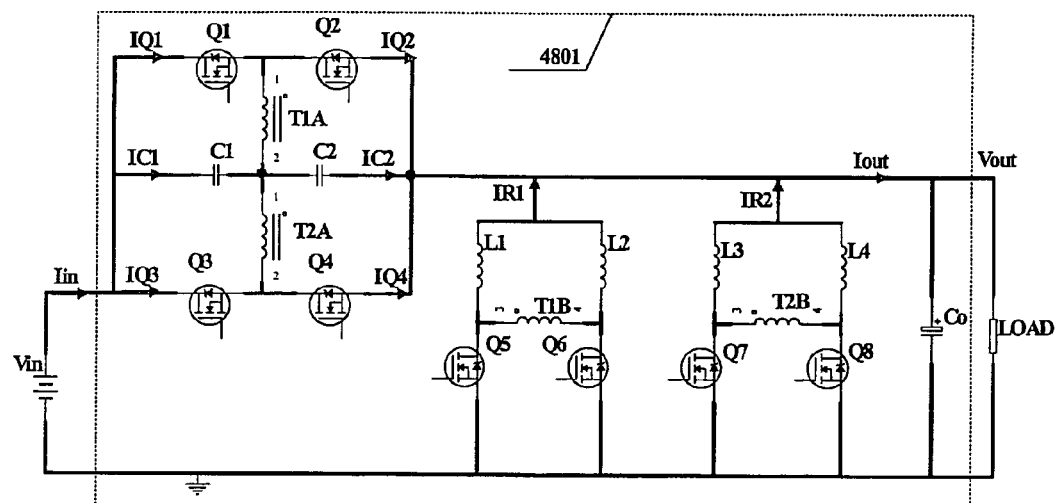
FIG. 48 is a schematic diagram of a two-phase interleaved non-isolated half-bridge DC converter embodiment of the converter of FIG. 3.

Referring to FIG. 48, a two-phase interleaved half-bridge converter 4801 is shown. The output power is shared between the two power phases of the topologies. One phase consists of Q1 and Q2 as high side switches, Q5 and Q6 as synchronous rectifier switches, T1A as the primary winding, T1B as the secondary winding, and L1 and L2 as the output inductors. Another phase consists of Q3 and Q4 as high side switches, Q7, and Q8 as synchronous rectifier switches, T2A as the primary winding, T2B as the secondary winding, and L3 and L4 as the output inductors. The capacitors C1 and C2 are shared by the two phases.

Figure 49:
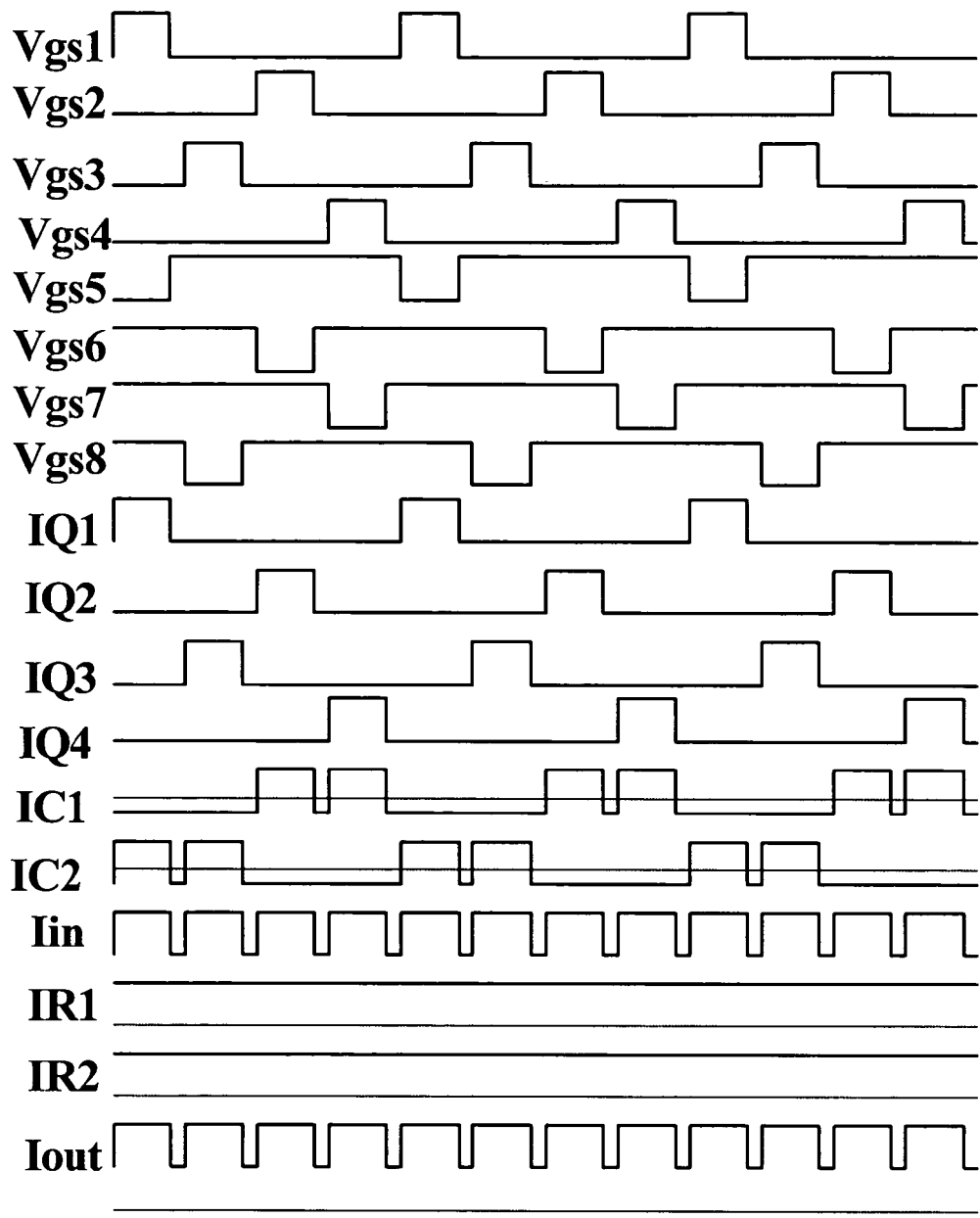
FIG. 49 is a graphic illustration of gate drive signals other waveforms for the two-phase interleaved non-isolated half-bridge DC converter embodiment of FIG. 48 with a duty cycle of 40%.

Referring to FIG. 49, gate drive signals Vgs1–Vgs8 and input and output current Iin, Iout waveforms are shown. Q1 and Q3 are phase shifted by 90 degrees from each other. This means that Q3 is always turned on a quarter switching period (0.25*Ts) after Q1 is turned on. Similarly, Q4 is always turned on a quarter switching period after Q2 is turned on. The gate drive for Q5 is similar to the basic non-isolated half-bridge DC converter as shown in FIG. 40. Output current ripple of these two phases can be reduced significantly. The frequency of the ripple current is two times the switching frequency. The input and output ripple current of the two phases also can cancel each other. This makes the selection of a smaller output inductor and a smaller output capacitor possible. It is noted that a small output capacitor and a smaller output inductor can help improve the dynamic response of the power converter.

Q1, Q2 and Q3, Q4 form two power phases that are phase shifted 90 degrees from each other. A duty cycle of 40% is shown. It is noted that when the duty cycle is 50%, the input and output current ripple is the smallest.

Figure 50:
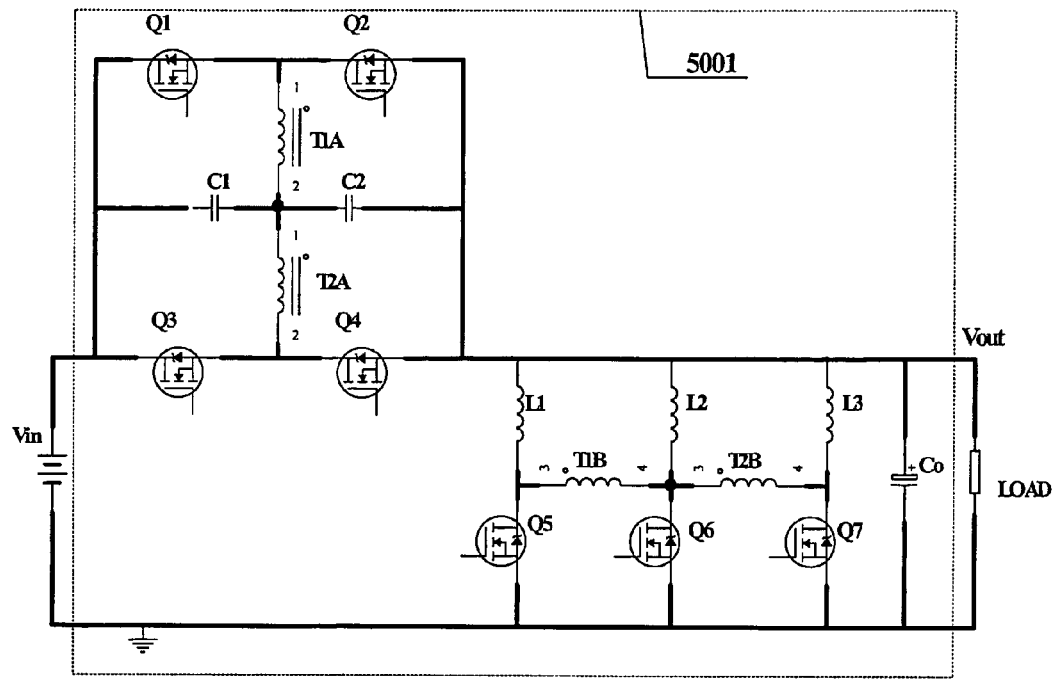
FIG. 50 is a schematic diagram of a two-phase interleaved half-bridge DC converter embodiment of the converter of FIG. 3 with secondary shared switches.

FIG. 50 shows a two-phase interleaved non-isolated half-bridge DC converter 5001 with shared rectifier switch. This converter 5001 has fewer switches and inductors than the converter 4801 in FIG. 48. It can achieve the same function as the converter 4801 in FIG. 48. This makes the control logic simpler and lower cost. This converter 5001 has a slightly higher conduction loss than the converter 4801 in FIG. 48.

The above section describes several non-isolated DC converters when the circuit 601 shown in FIG. 6 is used as the high side circuit 305. Detailed analysis has been given for basic non-isolated half-bridge DC converter 4001 as shown in FIG. 40. The analysis of other converters using the principles described herein can be done in a similar way.

The above analysis has not explored all the possible combinations of circuits using the principles described herein to produce novel converters. A person skilled in the art can derive other circuit configurations using the principles presented in this description.

Figure 51:
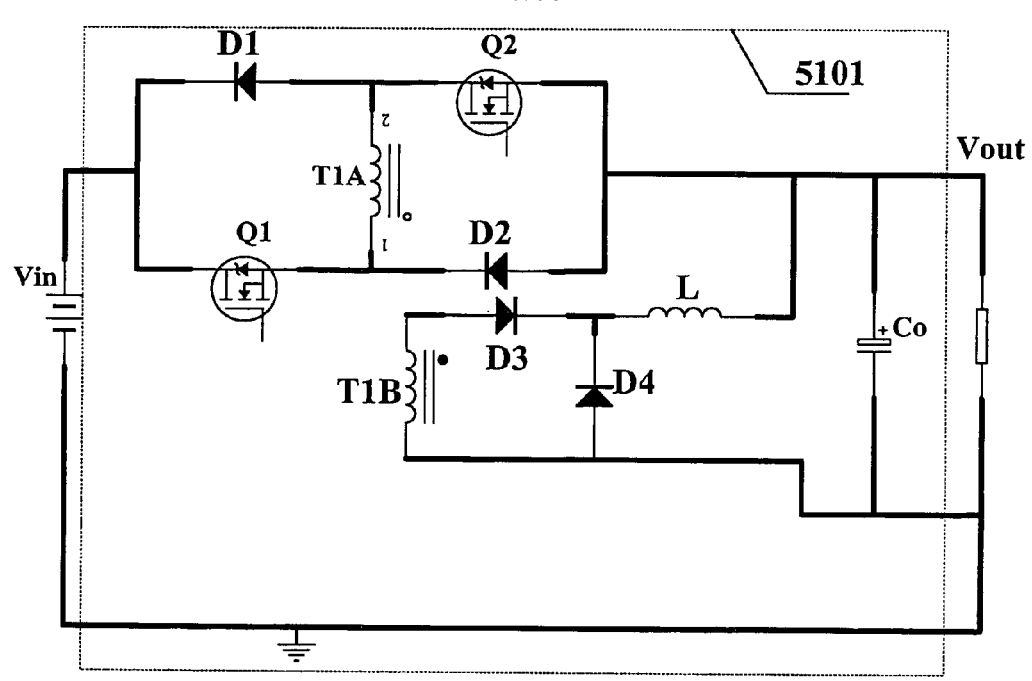
FIG. 51 is a schematic diagram of a non-isolated forward DC converter embodiment of the converter of FIG. 3.

Referring to FIG. 51, when the circuit 801 shown in FIG. 8 is used as the high side circuit 305 and when the circuit 1101 shown in FIG. 11 is used as the rectifier circuit 307, a non-isolated forward DC converter 5101 is derived. In the converter 5101, transformer T1 has one primary winding T1A and one secondary winding T1B.

By selecting the turns ratio N properly, the duty cycle D of the converter 5101 can be around 50%, which is beneficial for the performance of the converter 5101.

When Q1 and Q2 are on, the input current Iin goes directly to the output Vout through transformer primary winding T1A and Q1, Q2. In addition, some of the energy is transferred to the transformer secondary winding T1B and is rectified into DC voltage by diodes D3 and D4, and filtered by inductor L.

Figure 52:
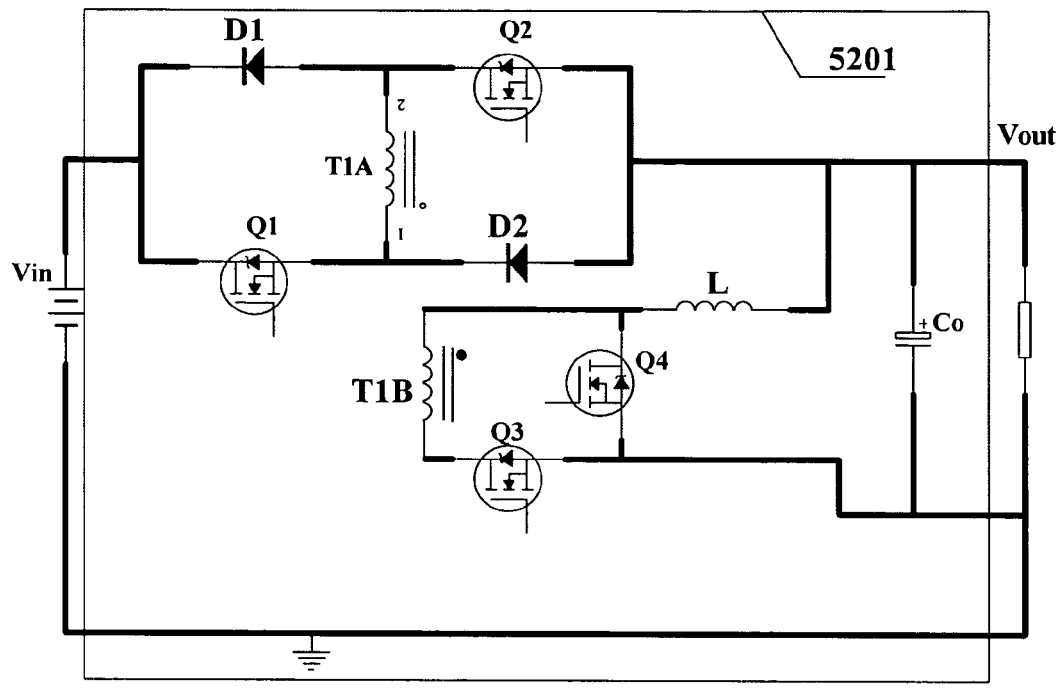
FIG. 52 is a schematic diagram of the non-isolated forward DC converter embodiment shown in FIG. 51 when synchronous rectifiers are used.

Referring to FIG. 52, when the circuit 801 shown in FIG. 8 is used as high side circuit 305 and the circuit 1101 shown in FIG. 11 is used as the rectifier circuit 307, another non-isolated forward DC converter 5201 is derived. In converter 5201, synchronous rectifiers are used to reduce the power loss for low output voltage applications (such as VRM applications).

Figure 53:
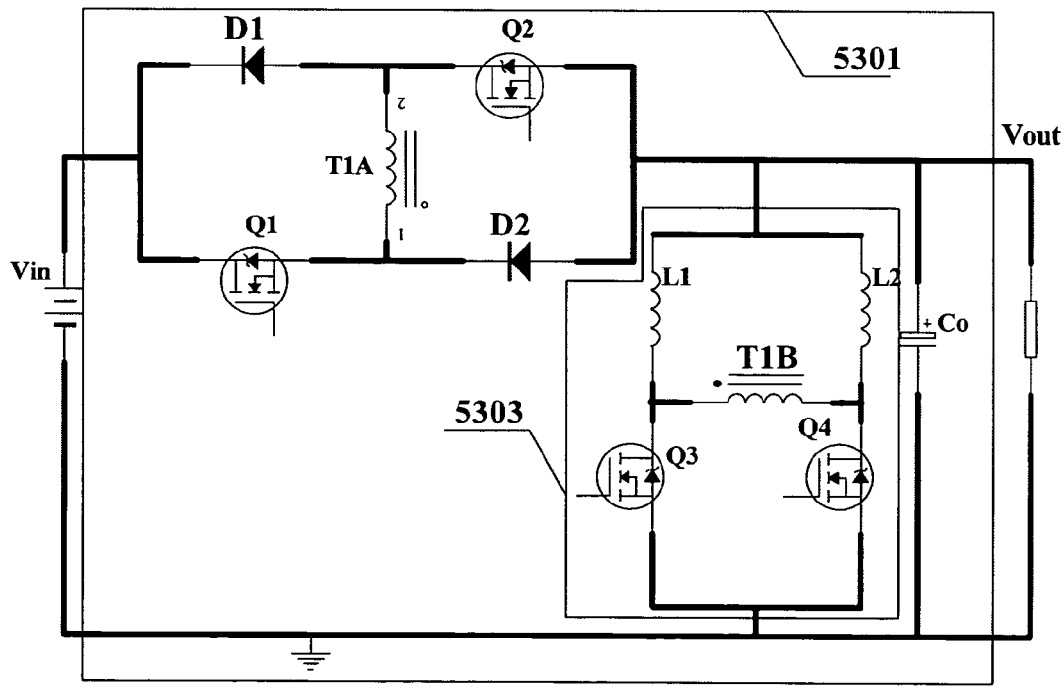
FIG. 53 is a schematic diagram of a non-isolated forward DC converter embodiment of FIG. 3 when the rectifier circuit shown in FIG. 10 is used.

Referring to FIG. 53, when the circuit 801 shown in FIG. 8 is used as high side circuit 305 and the circuit 1001 shown in FIG. 10 is used as the rectifier circuit 307, another non-isolated forward DC converter 5301 is derived. In converter 5301, two synchronous rectifiers and two inductors are used.

Figure 54:
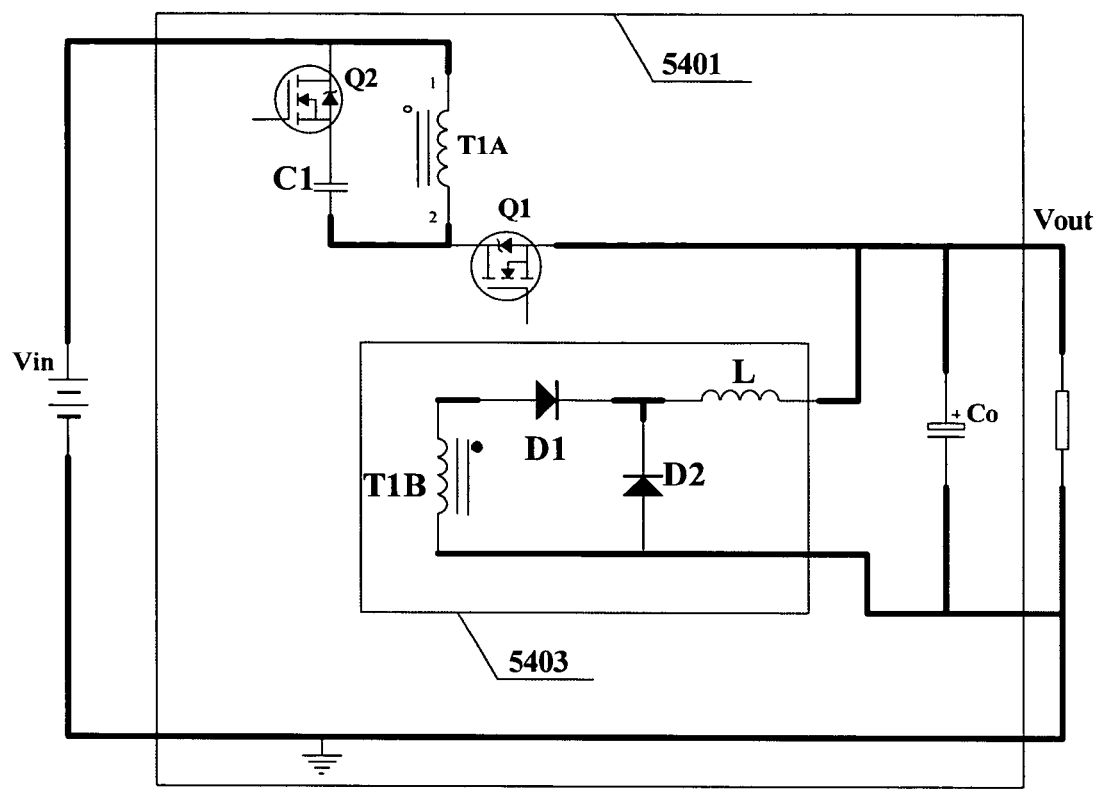
FIG. 54 is a schematic diagram of another non-isolated forward DC converter embodiment of the converter of FIG. 3.

Referring to FIG. 54, when the circuit 901 shown in FIG. 9 is used as the high side circuit 305 and when the circuit 1201 shown in FIG. 12 is used as the rectifier circuit 307, another non-isolated forward DC converter 5401 is derived. In the circuit 5401, transformer T1 has one primary winding T1B and one secondary winding T1B. When Q1 is on, the input current goes to output directly through transformer primary winding T1A and Q1. In addition, some of the energy is transferred to the transformer secondary winding T1B and is rectified into DC voltage by diodes D1, D2 and filtered by inductor L.

Figure 55:
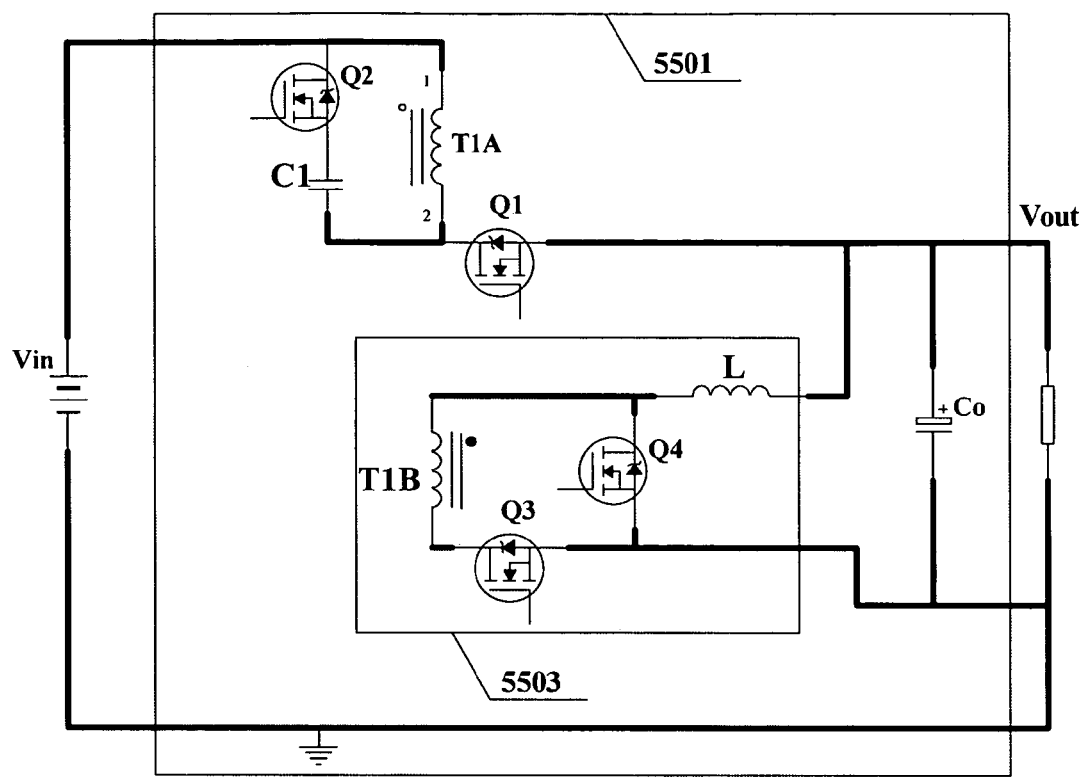
FIG. 55 is a schematic diagram of the non-isolated forward DC converter embodiment shown in FIG. 54 when synchronous rectifiers are used.

Referring to FIG. 55, when the circuit 901 shown in FIG. 9 is used as high side circuit 305 and the circuit 1101 shown in FIG. 11 is used as the rectifier circuit 307, another non-isolated forward DC converter 5501 is derived.

This converter 5501 has the advantage of lower conduction loss because only one power MOSFET Q1 is used in the high side. Q1 and Q3 are turned on at same time. Q2 and Q4 are turned on at same time. When Q1 is on, the input power is transferred to output via two paths. One path is from the transformer primary winding T1A and Q1 to the output load. The other path is from the secondary winding T1B, Q3 and inductor L to the output load. When Q1 is off, Q2 is on. The transformer core is reset by the voltage across C1. The energy stored in inductor L is also transferred to the output load during this period.

Figure 56:
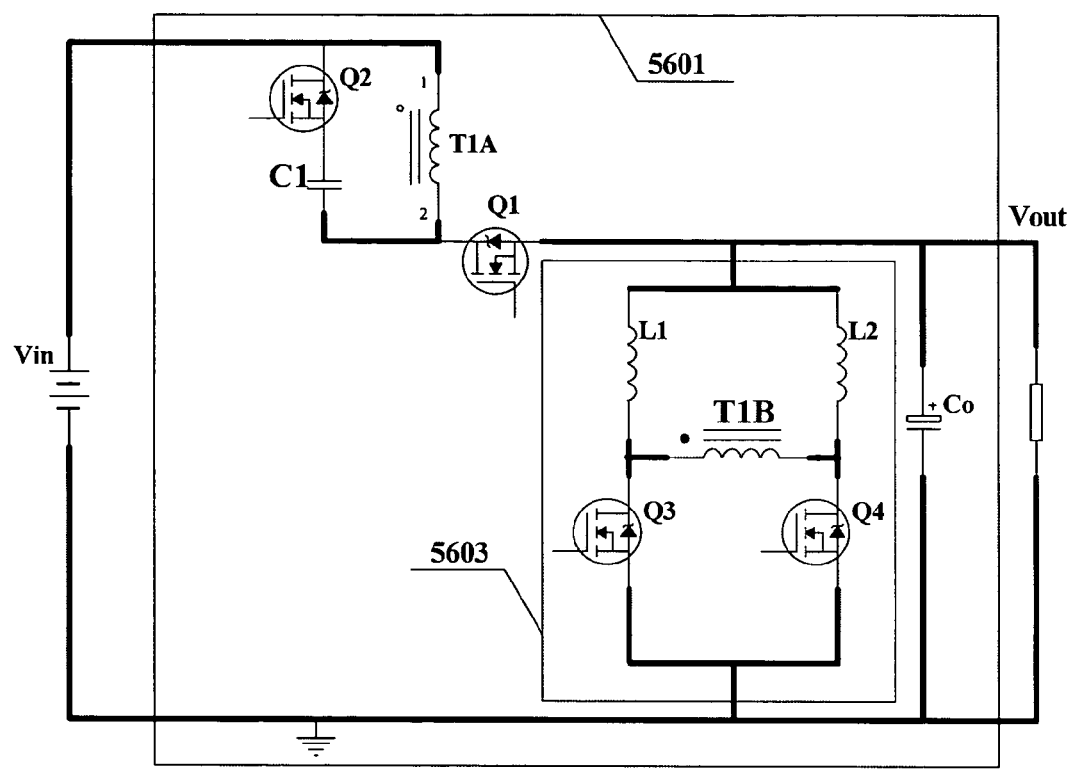
FIG. 56 is a schematic diagram of the non-isolated forward DC converter embodiment of FIG. 54 when the rectifier circuit shown in FIG. 10 is used.

Referring to FIG. 56, when the circuit 901 shown in FIG. 9 is used as high side circuit 305 and the circuit 1001 shown in FIG. 10 is used as the rectifier circuit 307, another non-isolated forward DC converter 5601 is derived. In this converter 5601, two inductors are used.

Figure 57:
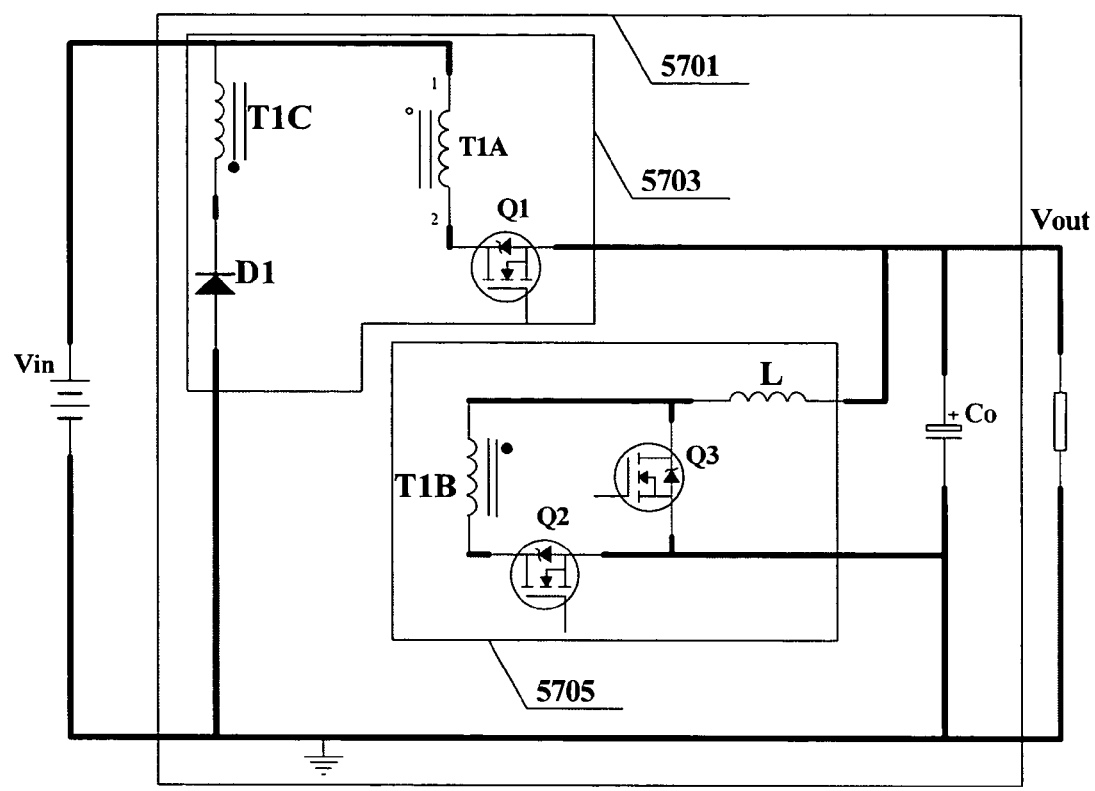
FIG. 57 is a schematic diagram of another non-isolated forward DC converter embodiment of the converter of FIG. 3 when a third winding is used to reset the transformer core.

FIG. 57 shows another non-isolated forward DC converter, converter 5701. In converter 5701, high side circuit 5703 consists of one transformer primary winding T1A, one switch Q1, one reset winding T1C and one diode D1. The rectifier circuit 5703 consists of one transformer secondary winding T1B, two synchronous rectifiers Q2 and Q3 and inductor L. Reset winding T1C and diode D1 are used to reset the core of the transformer. Q1 and Q2 are turned on at same time. When Q1 is on, the energy is transferred from input to output through two paths. One is from T1A and Q1 to the output. The other is from T1B, Q2, and inductor L to the output. When Q1 is off, Q3 is on. The energy stored in L and Co is released to the output load. The diode D1 is turned on and the input voltage is applied to reset winding T1C. In this way, the transformer core is reset by Vin.

Similarly, when multiple rectifier circuits are connected in parallel, more load current can be provided. Or equivalently, conduction loss can be reduced. The circuit details can be derived using the principles described herein, and are not further described herein.

Similarly, multi-phase interleaved technology can also be used in all the above non-isolated forward converters shown from FIG. 51 to FIG. 57 to reduce the input and output current ripple. The improvement introduced by interleaving can be very significant because these DC converters are operated at a duty cycle of around 50%.

Figure 58:
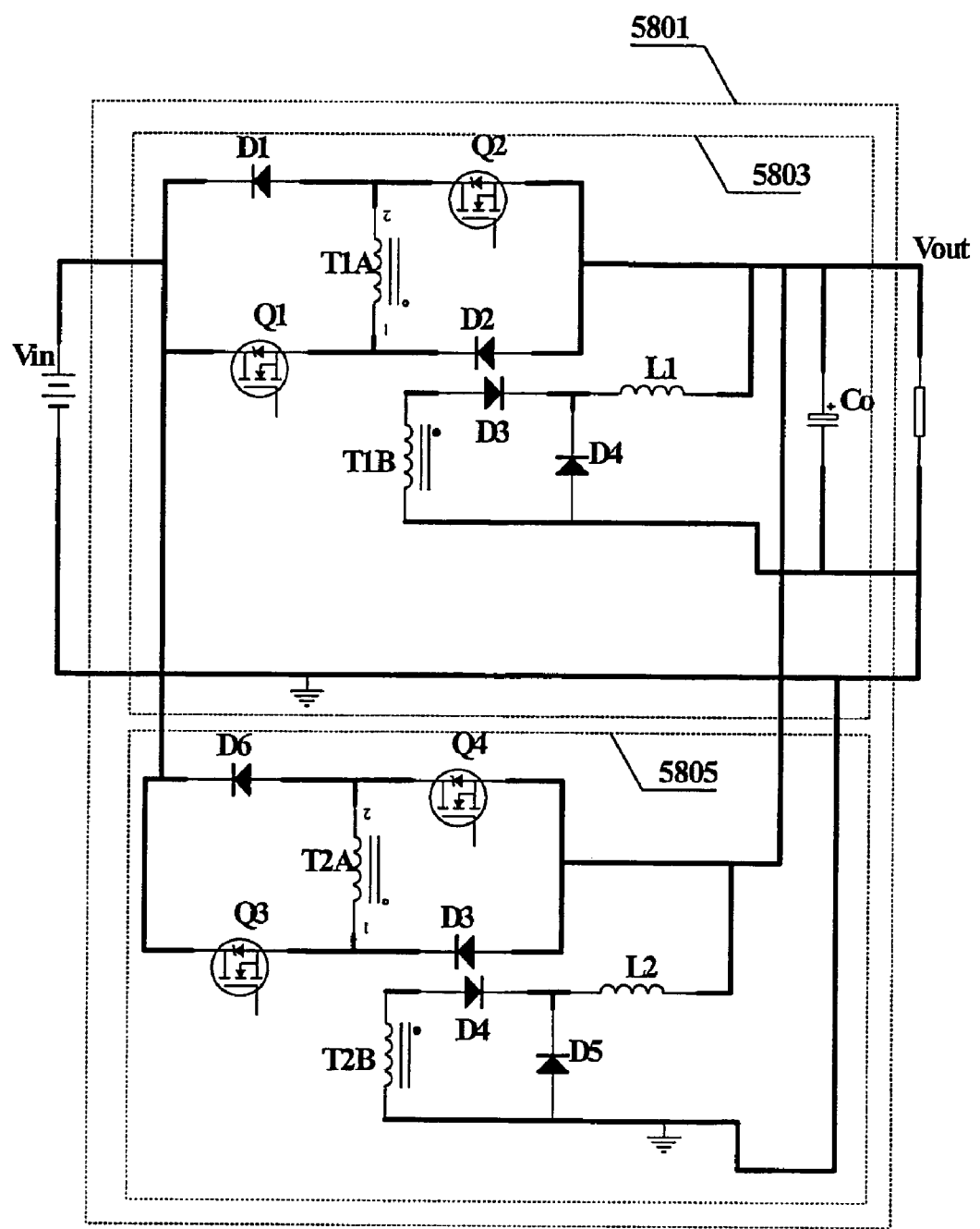
FIG. 58 is a schematic diagram of a two-phase interleaved non-isolated forward DC converter embodiment of the circuit shown in FIG. 51.

Referring to FIG. 58, when two converters 5101, as shown in FIG. 51, are connected in parallel, one two-phase interleaved forward DC converter 5801 is derived. The gate drive signals to converter 5803 and converter 5805 are interleaved to reduce the input and output current ripple.

Figure 59:
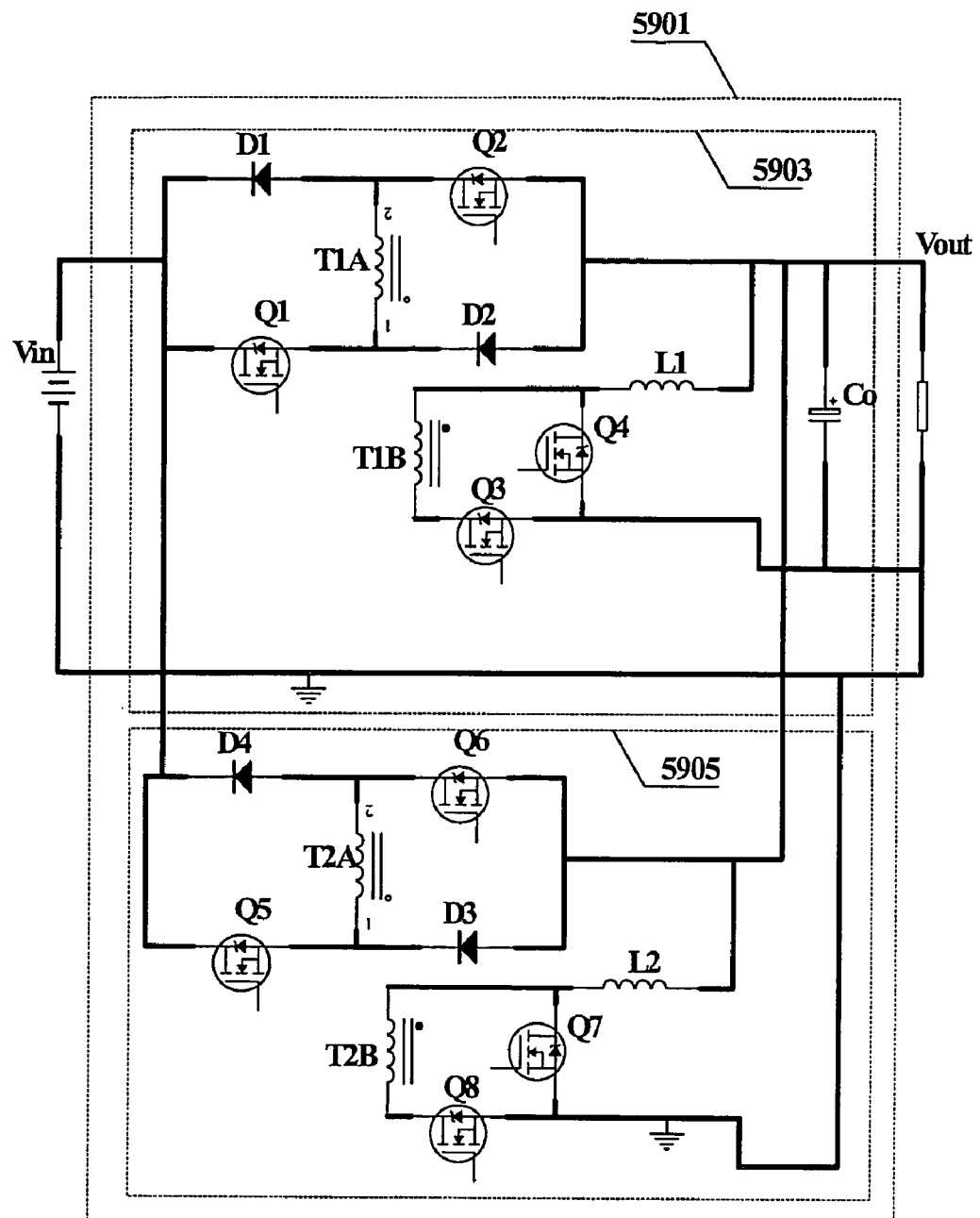
FIG. 59 is a schematic diagram of a two-phase interleaved non-isolated forward DC converter embodiment of the circuit shown in FIG. 52.

Referring to FIG. 59, when two converters 5201, as shown in FIG. 52, are connected in parallel, another two-phase interleaved forward DC converter 5901 is derived. The gate drive signals to converter 5903 and converter 5905 are interleaved to reduce the input and output current ripple.

Figure 60:
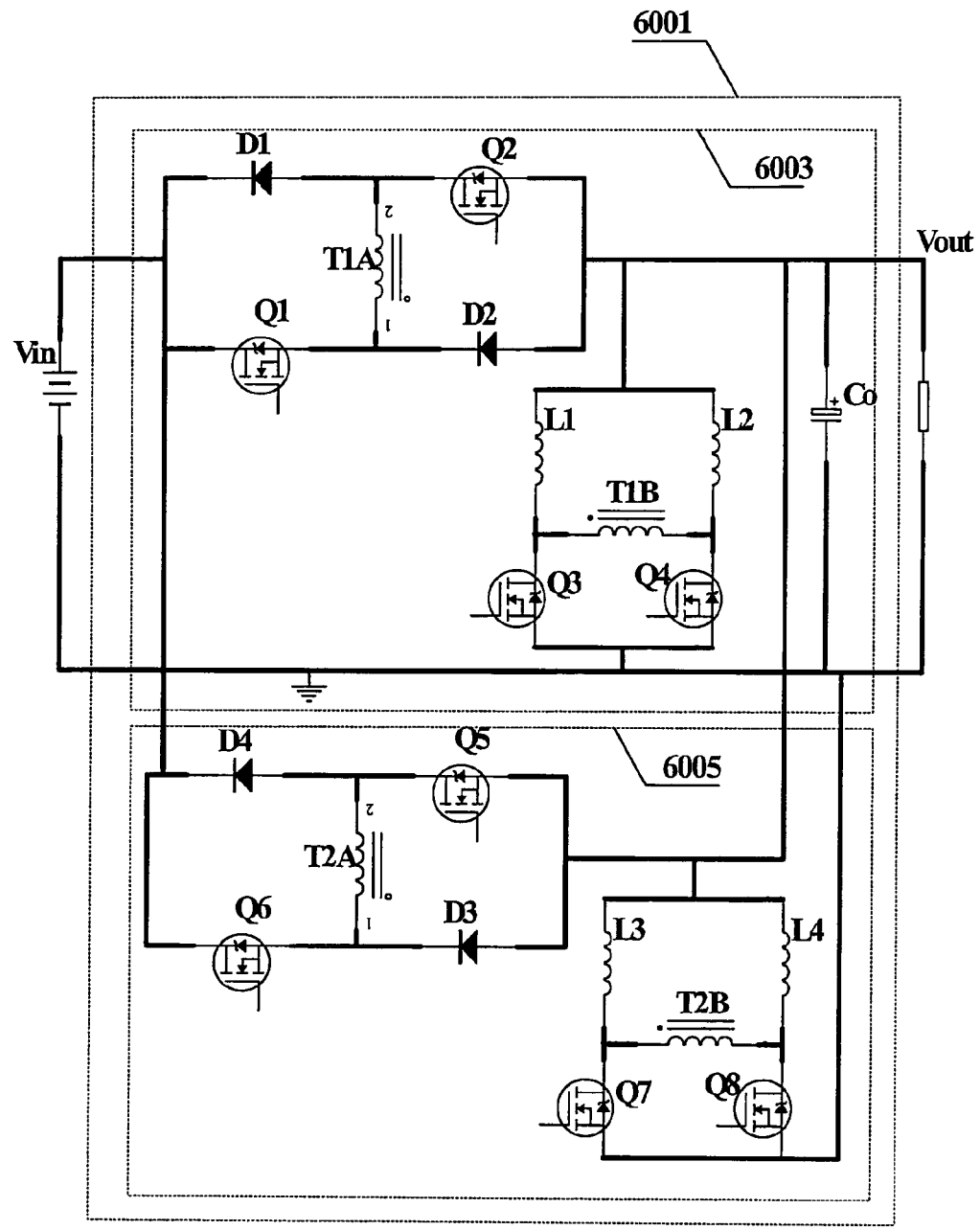
FIG. 60 is a schematic diagram of a two-phase interleaved non-isolated forward DC converter embodiment of the circuit shown in FIG. 53.

Referring to FIG. 60, when two converters 5301, as shown in FIG. 53, are connected in parallel, another two-phase interleaved forward DC converter 6001 is derived. The gate drive signals to converter 6003 and converter 6005 are interleaved to reduce the input and output current ripple.

Figure 61:
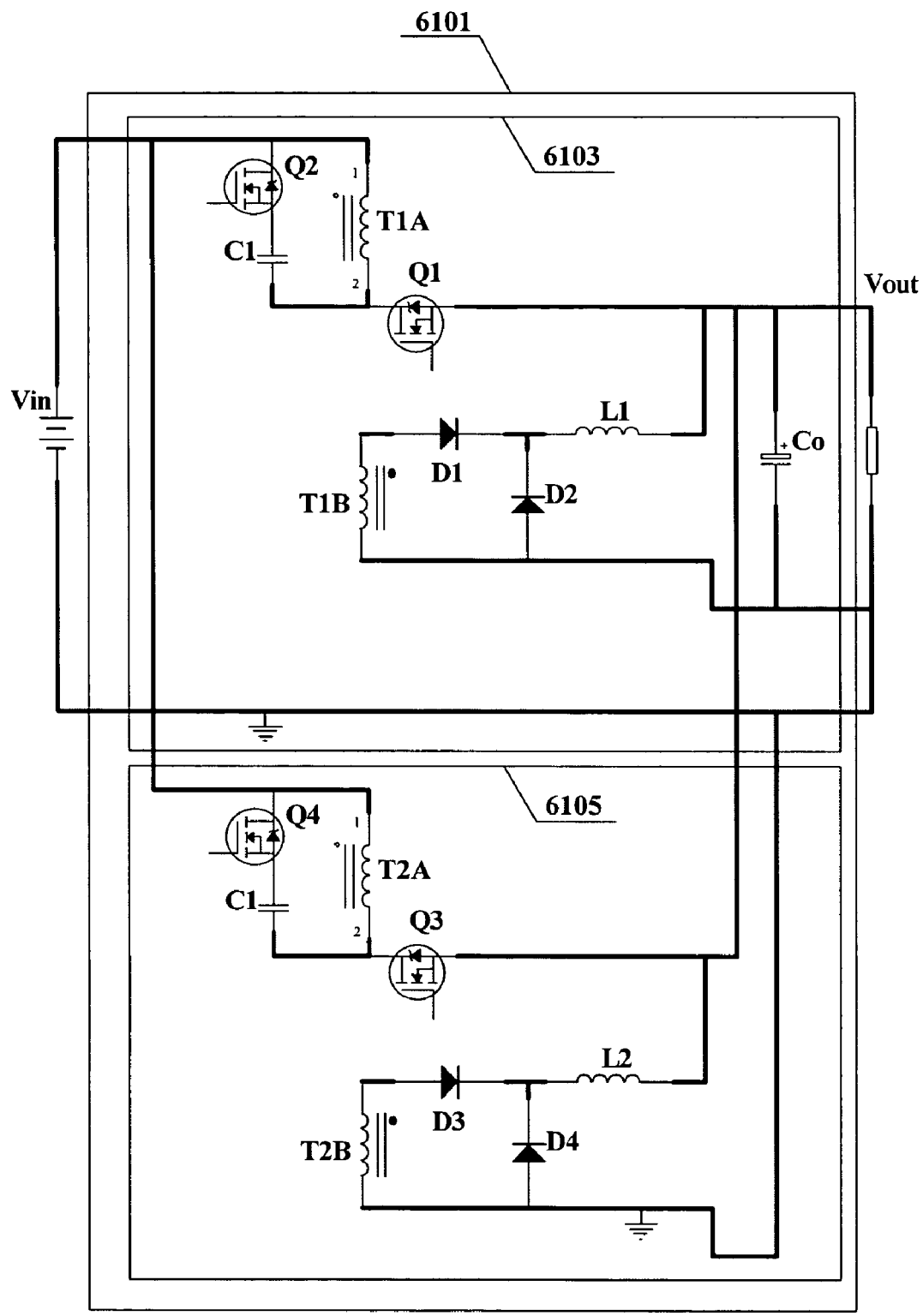
FIG. 61 is a schematic diagram of a two-phase interleaved non-isolated forward DC converter embodiment of the circuit shown in FIG. 54

Referring to FIG. 61, when two converters 5401, as shown in FIG. 54, are connected in parallel, another two-phase interleaved forward DC converter 6101 is derived. The gate drive signals to converter 6103 and converter 6105 interleaved to reduce the input and output current ripple.

Figure 62:
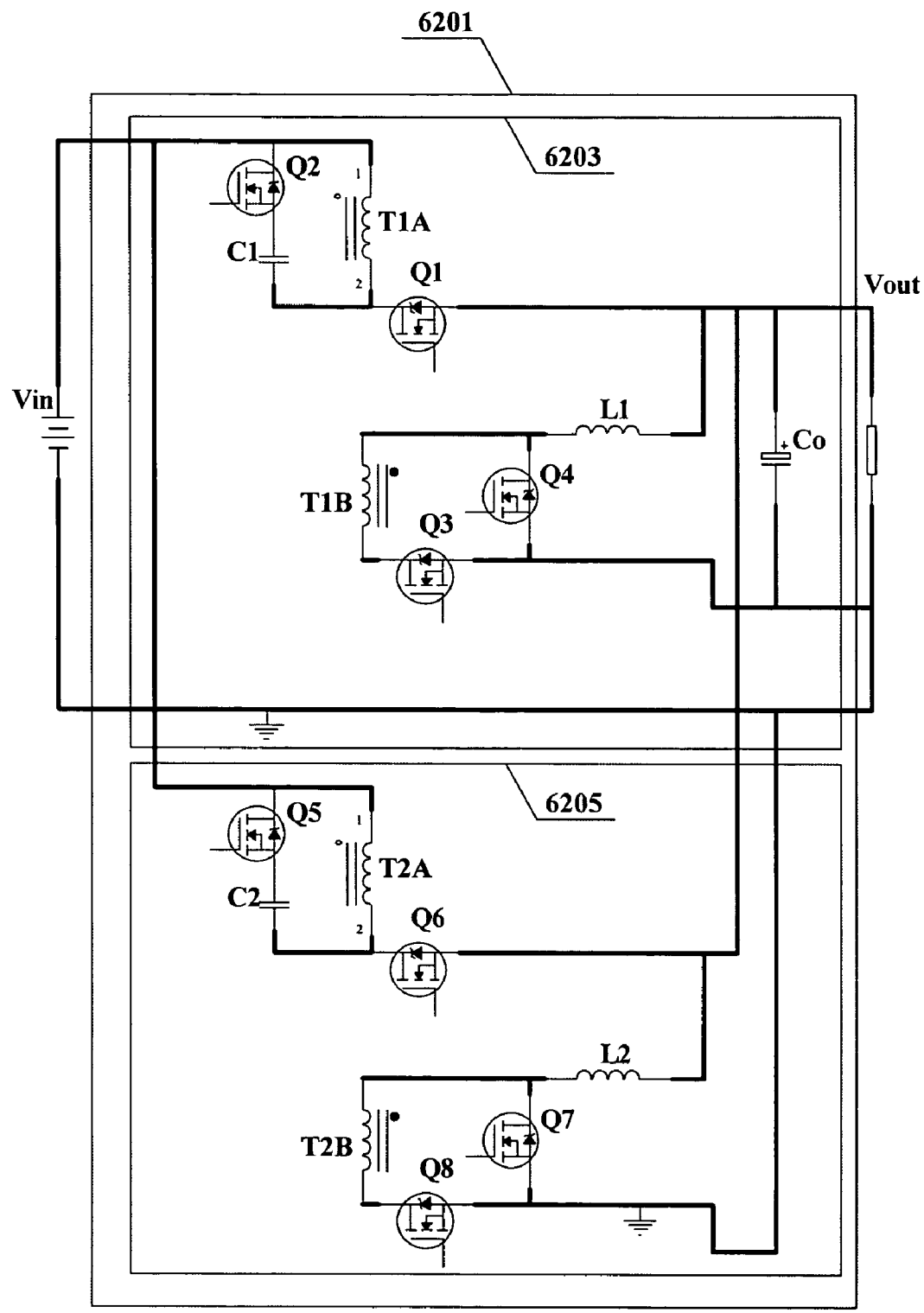
FIG. 62 is a schematic diagram of a two-phase interleaved non-isolated forward DC converter embodiment of the circuit shown in FIG. 55.

Referring to FIG. 62, when two converters 5501, as shown in FIG. 55, are connected in parallel, another two-phase interleaved forward DC converter 6201 is derived. The gate drive signals to converter 6203 and converter 6205 are interleaved to reduce the input and output current ripple.

Figure 63:
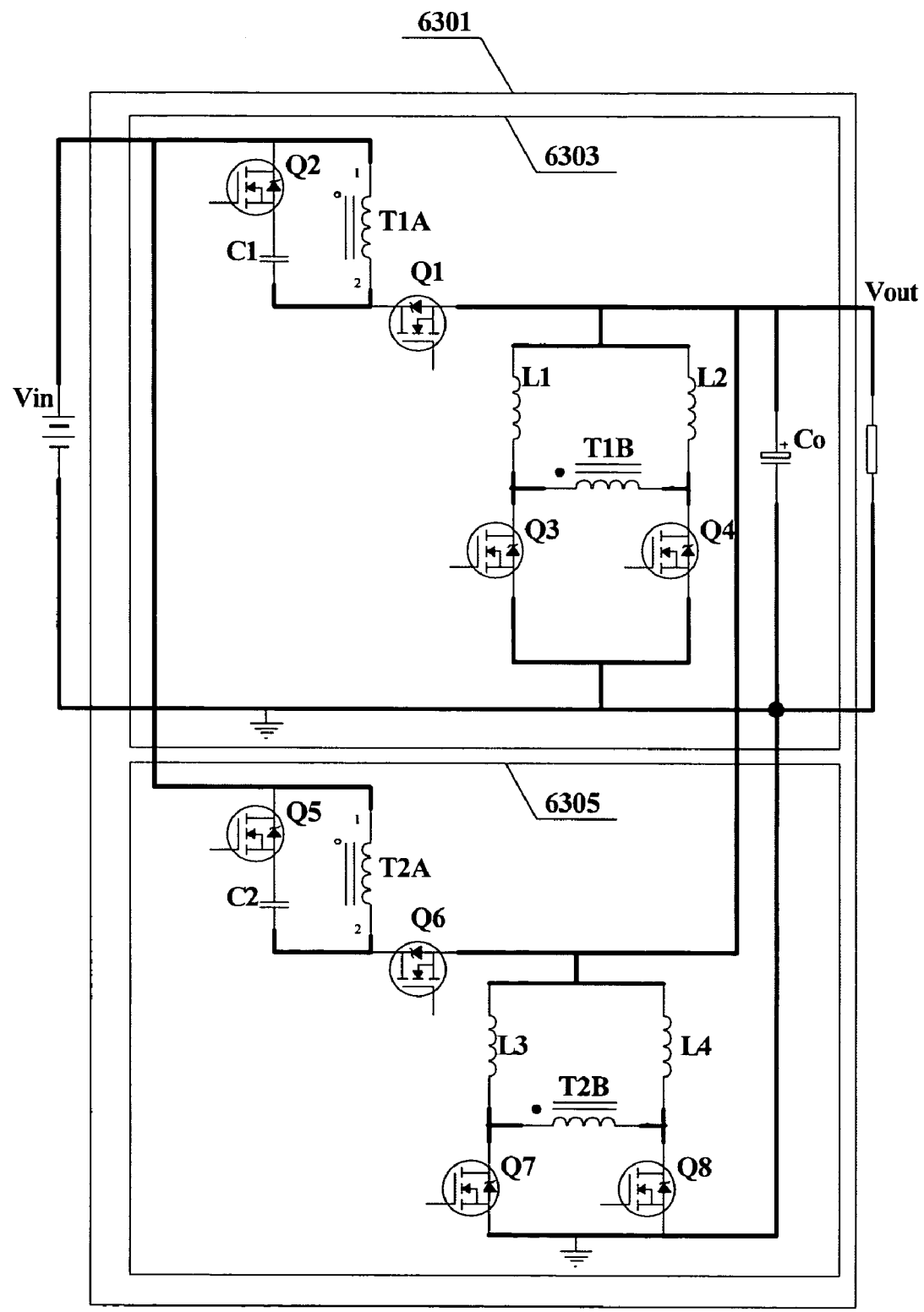
FIG. 63 is a schematic diagram of a two-phase interleaved non-isolated forward DC converter embodiment of the circuit shown in FIG. 56.

Referring to FIG. 63, when two converters 5601, as shown in FIG. 56, are connected in parallel, another two-phase interleaved forward DC converter 6301 is derived. The gate drive signals to converter 6303 and converter 6305 are interleaved to reduce the input and output current ripple.

Other non-isolated circuits can be derived using the principles described herein and are not further described herein.

The principles for creating a new family of non-isolated DC converters wherein the input current of the high side circuit is connected directly to the load have been described. Several embodiments of high side circuits have been illustrated. Several embodiments of rectifier circuits are also illustrated.

Using different combinations of high side circuits and rectifier circuits, new non-isolated DC converters can be derived. Some such embodiments are shown in this description. It should be noted that other non-isolated DC converters can be derived using the principles described herein.

In addition, multiple rectifier circuits can be used to reduce the conduction loss for the rectifier circuits in high load current applications.

Interleaving technology can also be used to significantly improve the performance of the non-isolated DC converter proposed in this description. The main reason for this improvement is that all the DC converters derived using the proposed method will operate at duty cycles of around 50%, which is beneficial in reducing significantly the input current and output current ripple, as well as in improving the efficiency and dynamic response. Waveforms have been used to illustrate the benefit of interleaving.

It is noted that for two-phase interleaved converters described in this specification, current sharing between the two converters should be implemented. By current sharing, each converter will provide half the load current. One implementation of current sharing between circuits 25A01, as shown in FIG. 25B, is illustrated in FIG. 64.

Figure 64:
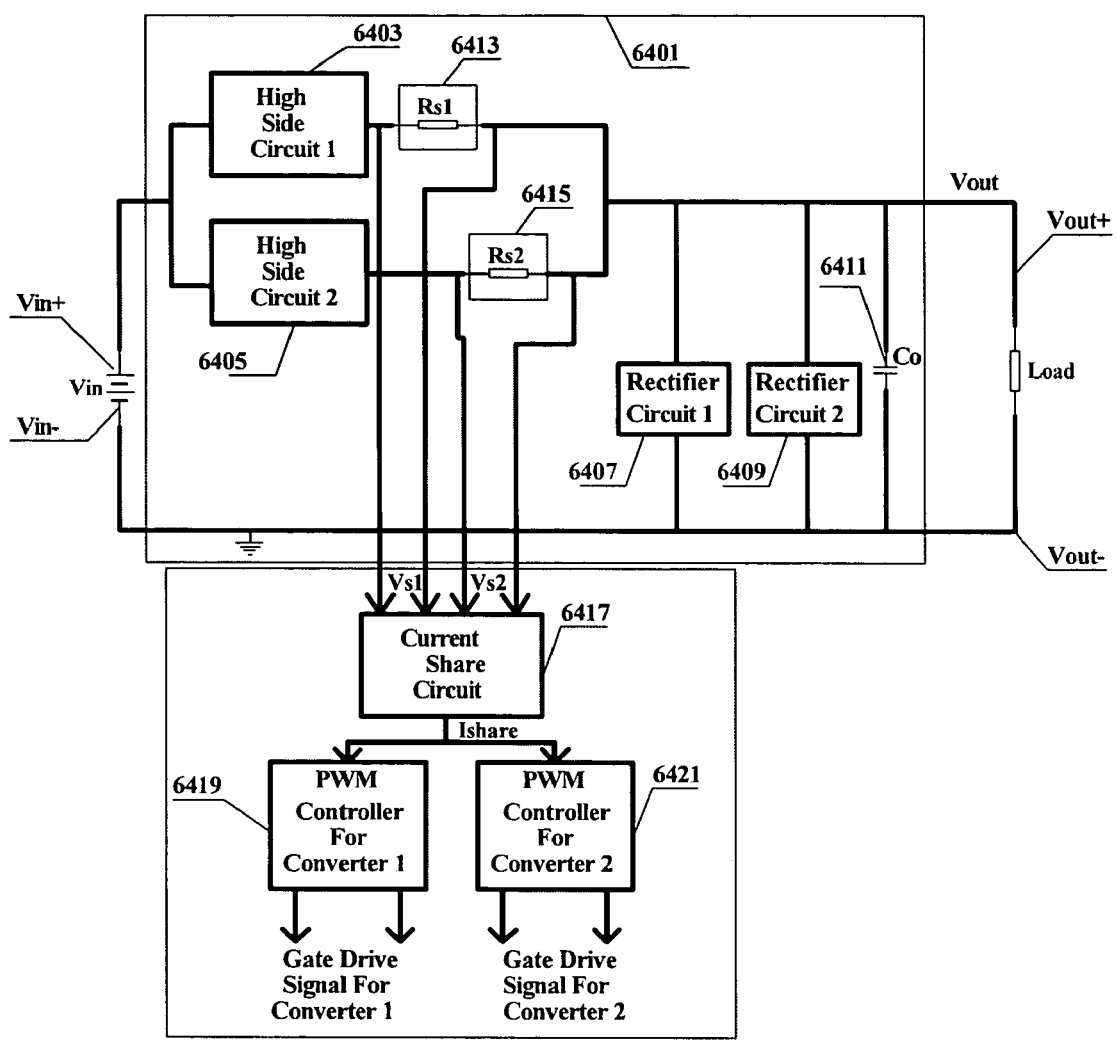
FIG. 64 is a general schematic diagram of two-phase interleaved non-isolated DC converter for current sensing and current sharing.

In FIG. 64, current sensing circuits 6413 and 6415 are connected in series with the high side circuits to sense the current through each high side circuit. It is noted that the current through the high side circuit is same as the input current to each high side circuit. In circuit 6401, resistors Rs1, Rs2 are used as the current sensing circuit 6413 and 6415. In actual implementation, other types of current sensing circuits, such as a current sensing transformer, can also be used, as will be evident to those skilled in the art using the principles described herein.

The advantage of placing the current sensing circuit in series with high side circuit is to reduce the power loss. The current through the high side circuit is smaller than the load current, and therefore, the power loss in the current sensing circuit is smaller.

Vs1 is the voltage across the current sensing resistor Rs1 and Vs2 is the voltage across current sensing resistor Rs2. Vs1 and Vs2 are fed into the current sharing circuit 6417. The output of the current sharing circuit 6417 is a current sharing signal, Ishare. The current sharing signal Ishare is fed into PWM controller for converter 1 and PWM controller for converter 2. It should be noted that converter 1 consists of high side circuit 1 and rectifier circuit 1. Converter 2 consists of high side circuit 2 and rectifier circuit 2.

It is noted that same method can be used for multiple phase current sensing scheme as will be evident to those skilled in the art using the principles described herein.

Figure 65:
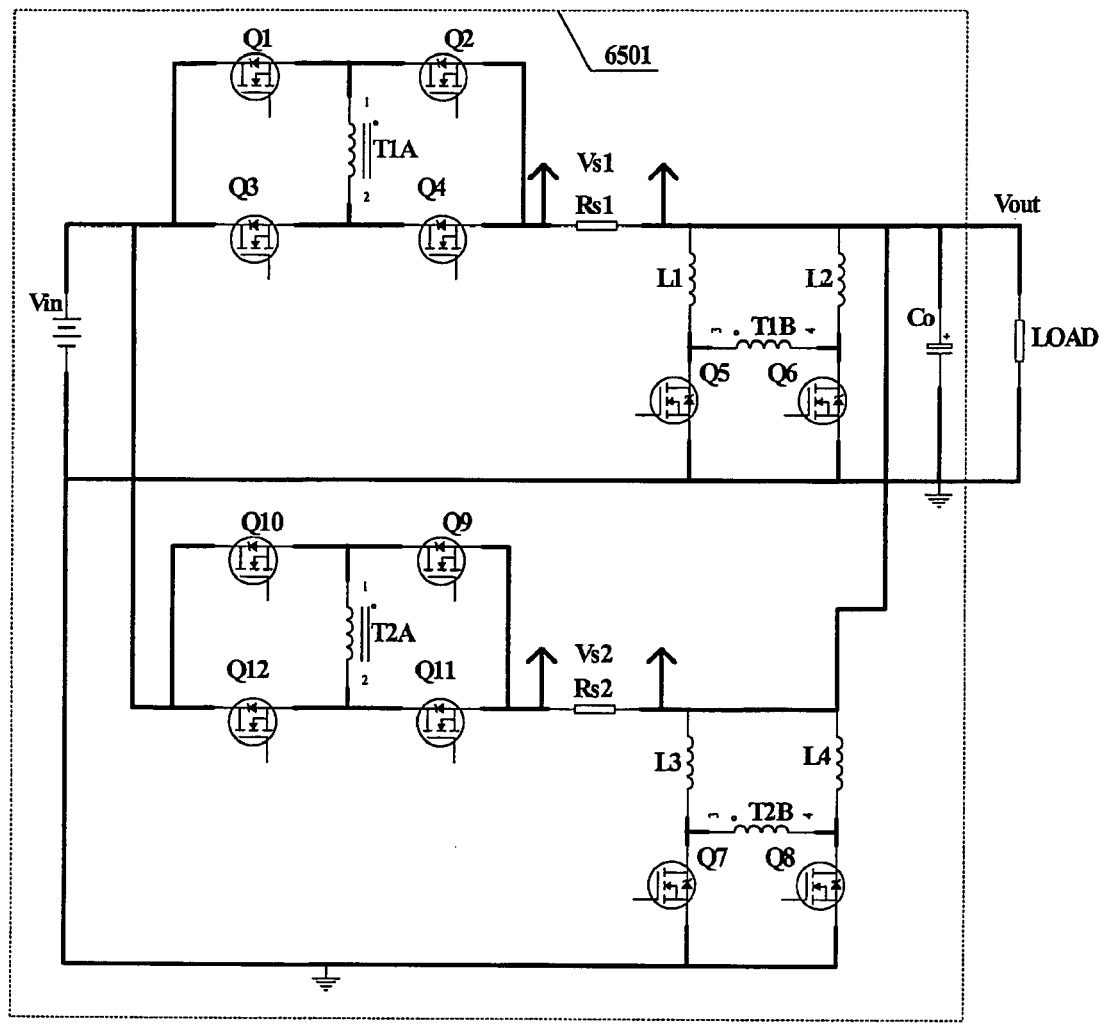
FIG. 65 is a schematic diagram showing one implementation of current sensing circuit for two-phase interleaved full-bridge DC converter.

FIG. 65 shows one implementation of a current sensing circuit for a two-phase interleaved full-bridge DC converter. Referring to FIG. 65, current sensing resistor Rs1 is connected between the source of Q2, Q4 and the positive point of the output voltage. Current sensing resistor Rs2 is connected between the source of Q9, Q11 and the positive point of output voltage. Vs1 is the voltage across Rs1 and Vs2 is the voltage across Rs2. Vs1 and Vs2 are fed into a current sharing circuit, which is not shown in the figure.

Figure 66:
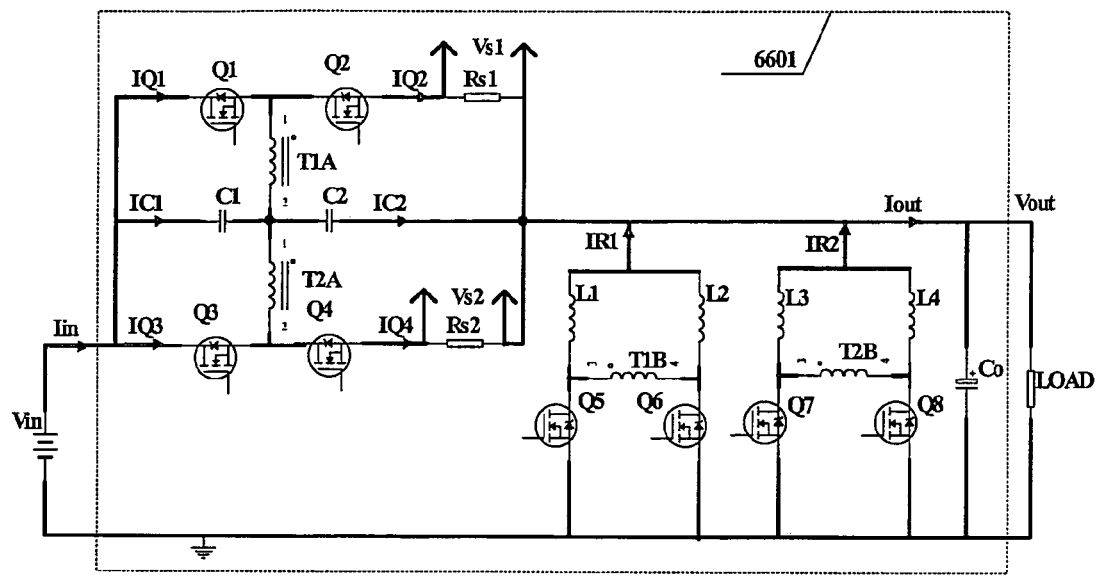
FIG. 66 is a schematic diagram showing one implementation of current sensing circuit for two-phase interleaved half-bridge DC converter.

FIG. 66 shows one implementation of a current sensing circuit for a two-phase interleaved half-bridge DC converter. Referring to FIG. 66, current sensing resistor Rs1 is connected between the source of Q2 and the positive point of the output voltage. Current sensing resistor Rs2 is connected between the source of Q4 and the positive point of output voltage. Vs1 is the voltage across Rs1 and Vs2 is the voltage across Rs2. Vs1 and Vs2 are fed into a current sharing circuit, which is not shown in the figure.

Figure 67:
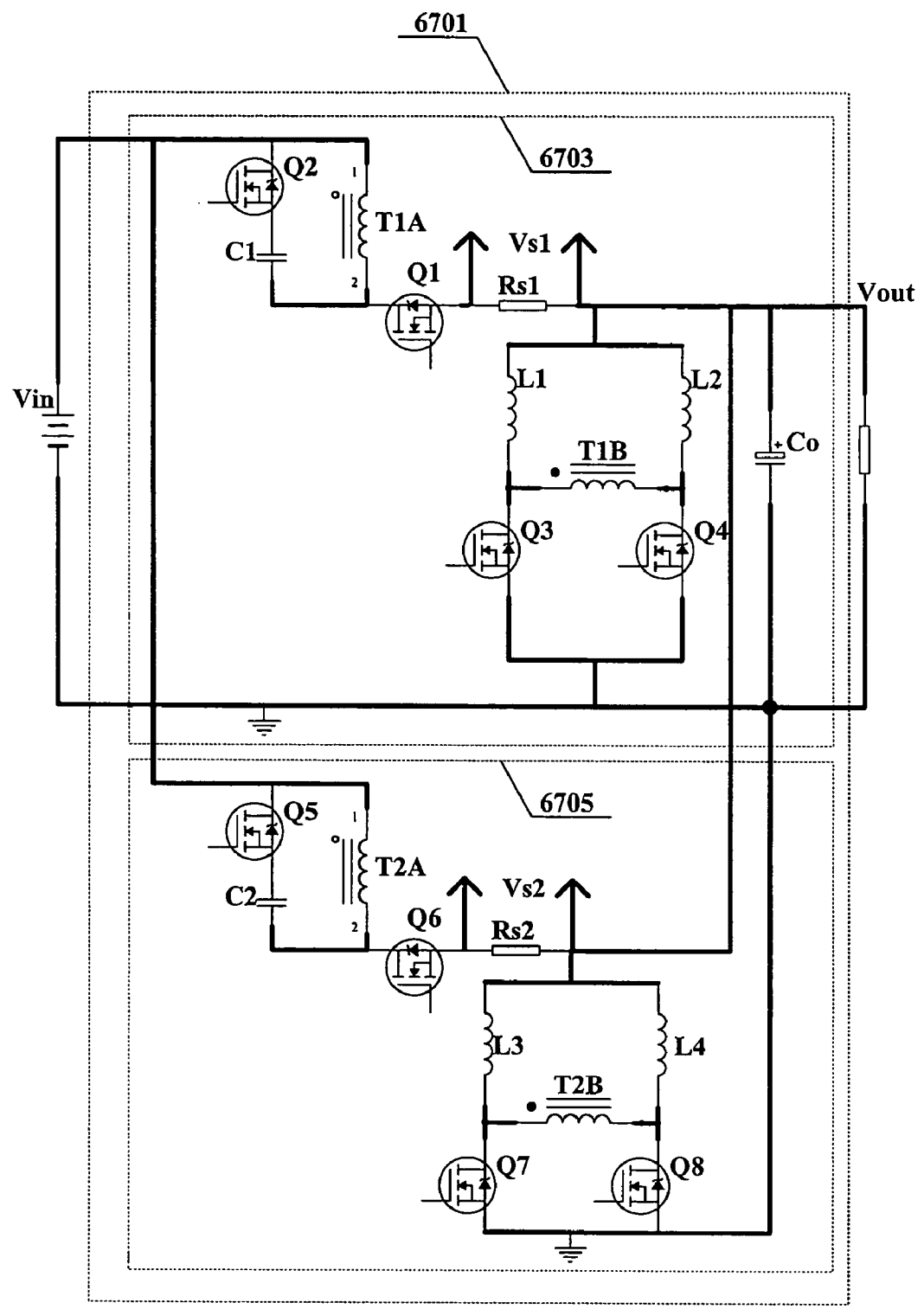
FIG. 67 is a schematic diagram showing one implementation of current sensing circuit for two-phase interleaved forward DC converter.

FIG. 67 shows one implementation of a current sensing circuit for a two-phase interleaved forward DC converter. Referring to FIG. 67, current sensing resistor Rs1 is connected between the source of Q1 and the positive point of the output voltage. Current sensing resistor Rs2 is connected between the source of Q6 and the positive point of output voltage. Vs1 is the voltage across Rs1 and Vs2 is the voltage across Rs2. Vs1 and Vs2 are fed into a current sharing circuit, which is not shown in the figure.

The above circuits, FIG. 65 to FIG. 67, illustrate examples of how to implement a current sensing circuit in the converter circuits derived in this specification. The figures show the implementation for two-phase interleaved full-bridge, half-bridge and forward DC converters, using a resistor as a current sensing component. It will be evident to those skilled in the art using the principles described herein how to implement current sensing circuits in other topologies proposed in this specification.

Figure 68A:
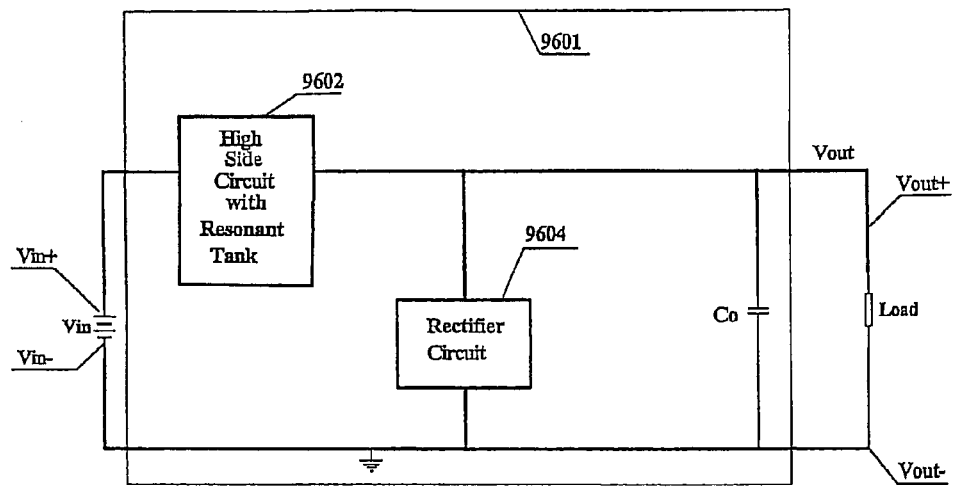
FIG. 68A is a block diagram of a non-isolated DC converter in accordance with an alternate preferred embodiment of the present invention.

Referring to FIG. 68A, a new family of non-isolated resonant DC converter 9601 is shown. Similar to the converter 301, converter 9601 has a high side circuit 9602, a rectifier circuit 9604 and an output capacitor Co. The high side circuit 9602 is similar to high side circuit 305; however, in addition the converter 9601 has a resonant tank operating in the high side circuit 9602. The resonant tank filters out very high frequency components of energy waveforms in the high side circuit 9602, thus smoothing the waveforms in the high side circuit 9602 to transform the waveforms from an almost square wave to a quasi-sinusoidal waveform. This reduces switching losses in the auxiliary section of the thigh side circuit 9602. The timing and operation of the converter 9601 is similar to that of the converters previously described herein.

Figure 68B:
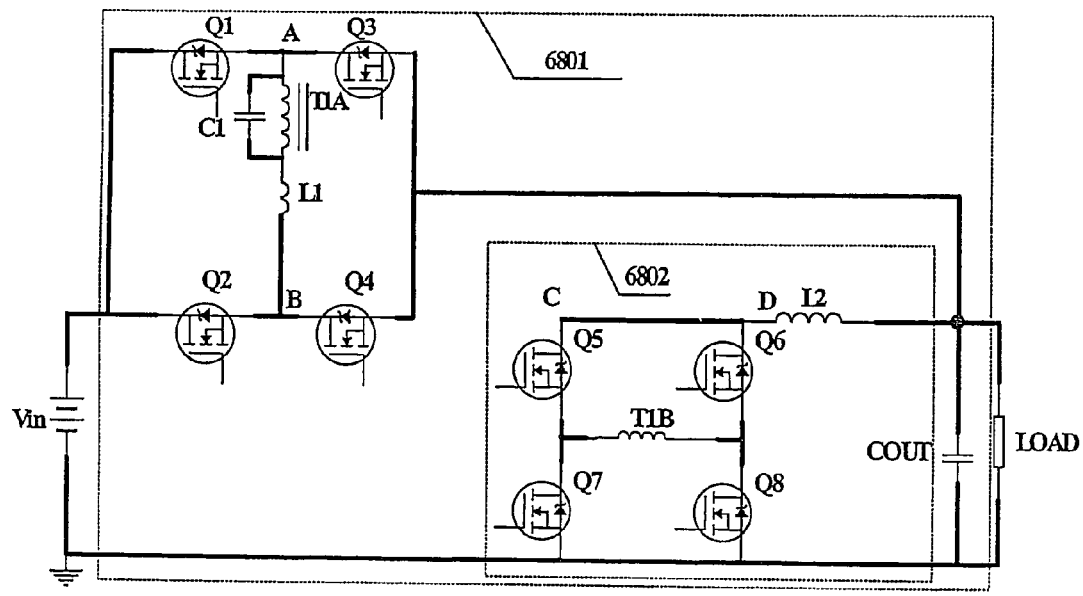
FIG. 68B is a schematic diagram of a non-isolated parallel resonant full-bridge DC—DC converter embodiment of the converter of FIG. 68A with full-bridge rectifier.

A number of non-isolated full-bridge parallel resonant converter embodiments of the converter 9601 will now be described. Referring to FIG. 68B, a non-isolated full-bridge parallel resonant converter 6801 has 8 MOSFETs (Q1 to Q8), one transformer (T1), with one primary winding and one secondary winding. A resonant tank consists of one inductor (L1) and one capacitor (C1), the capacitor C1 is paralleled with the primary winding of T1 then placed in series with inductor L1. One output inductor (L2) and one output capacitor (Cout) are used.

As with previously described converters, the converter 6801 has two circuits: a high side circuit having a transformer T1 primary winding, an auxiliary section (Q1 to Q4) and a resonant tank (L1, C1), and a rectifier circuit 6802 with Q5 to Q8, a transformer T1 secondary winding, and L2, forming a full-bridge rectifier circuit 6802.

Q1 to Q4 are primary switches. They can be implemented by, for example, IRF7467 from International Rectifier. Q5 to Q8 are synchronous rectifier switches, they can be implemented by, for example, IRLR8103 from International Rectifier or be replaced by diodes. Other switches such as IGBT or GTO can also be used for Q1 to Q8.

Those skilled in the art will appreciate that switching frequency control can be used for all switches in the converters 9601 to regulate the output voltage across the load. Similarly, phase shift control can be used for high side switches in any full-bridge high side circuit (for example, the high side circuits in FIGS. 68B through 81 as will be described) in the converter 9601. Switching frequency control and phase shift control may be used alone or in combination. The implementation of switching frequency control and phase shift control in high side circuits is known in the art, see for example [1] R. L. Steigerwald, "High frequency resonant transistor DC—DC converters", IEEE Transactions on Industrial Electronics, Vol. 31, pp. 181–181, May 1984; [2] F. S. Tsai, P. Matera, and F. C. Lee, "Constant-frequency, clamped-mode resonant converters", IEEE Transactions on Power Electronics, Vol. 3, No. 4, pp. 460–473, October 1988; and [3] Y. F. Liu and P. C. Sen, "Souce reactance lossless switch (SRLS) for soft-switching converters with constant switching frequency", IEEE Transactions on Circuit and Systems—I, Fundamental Theory and Applications, Vol. 43, No.4, pp. 301–312, April 1996.

Figure 69:
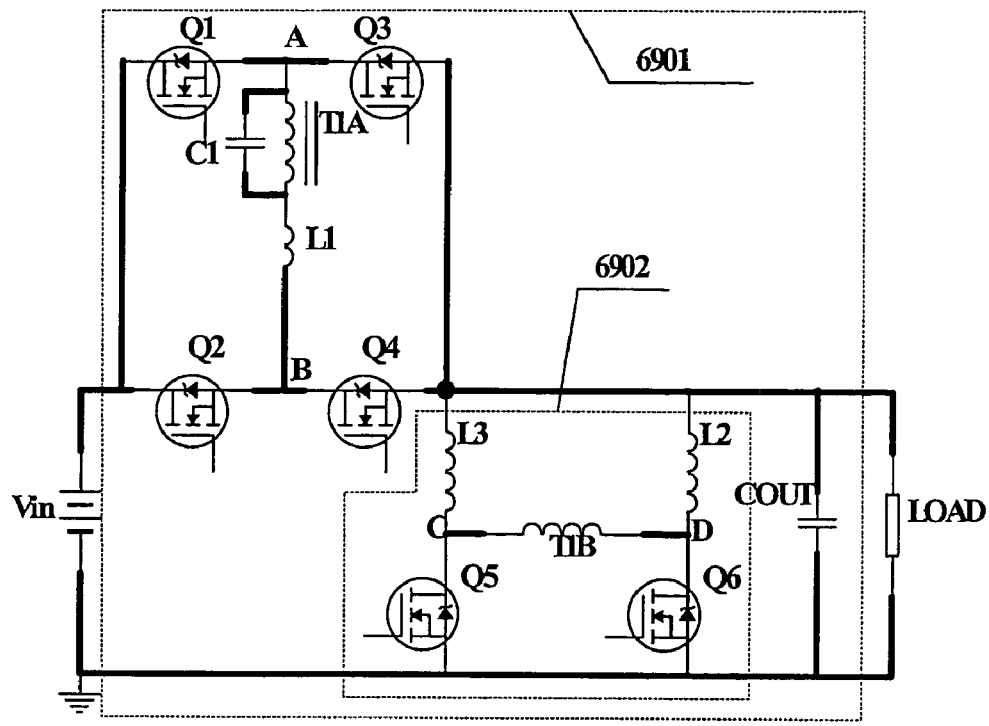
FIG. 69 is a schematic diagram of a non-isolated parallel resonant full-bridge DC—DC converter embodiment of the converter of FIG. 68A with current doubler rectifier.

Referring to FIG. 69, an alternate full-bridge parallel resonant converter 6901 is shown. Its high side circuit is the same as the topology shown in FIG. 68B, but the rectifier circuit is changed from a full-bridge rectifier in FIG. 68B to a current doubler 6902. The current doubler 6902 has two MOSFETs (Q5,Q6), two output inductors (L2,L3), and one secondary winding of the transformer T1.

Q5 and Q6 are synchronous rectifier switches. They can be implemented by, for example, IRLR8103 from International Rectifier or be replaced by diodes. Other switches such as IGBT or GTO can also be used for Q1 to Q6.

Figure 70:
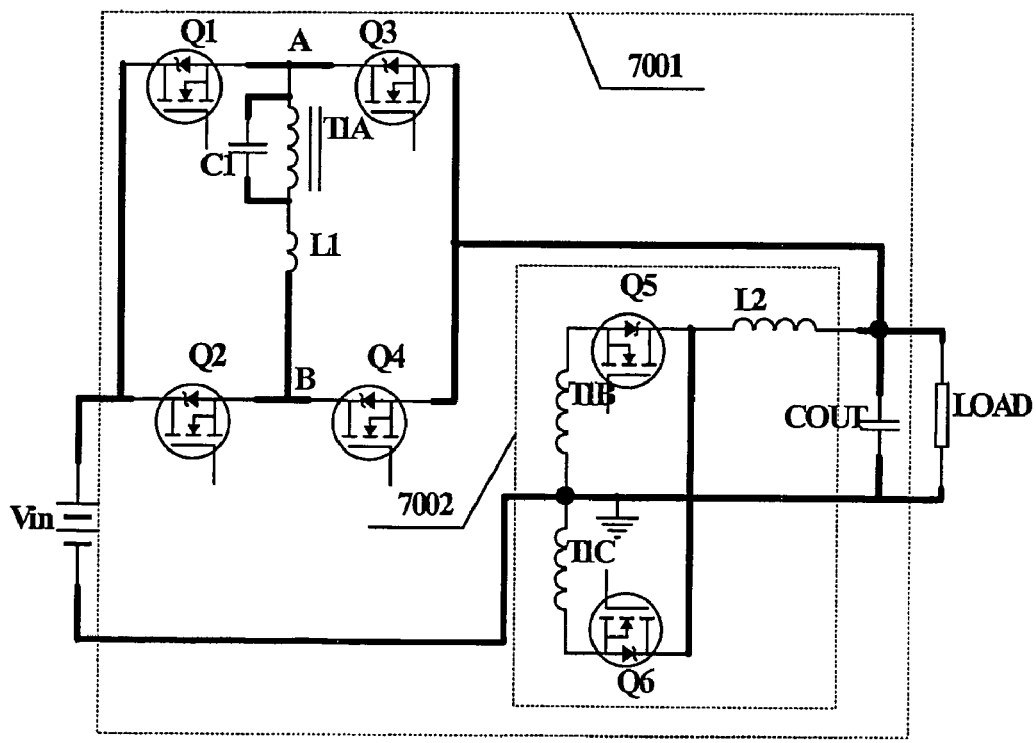
FIG. 70 is a schematic diagram of a non-isolated parallel resonant full-bridge DC—DC converter embodiment of the converter of FIG. 68A with center tapped transformer rectifier.

Referring to FIG. 70, a further alternate full-bridge parallel resonant converter 7001 is shown. Its high side is the same as the topology shown in FIG. 68B, but the rectifier circuit is changed from a full-bridge rectifier in FIG. 68B to a center tapped transformer rectifier 7002. The center tapped transformer rectifier 7002 has two MOSFETs (Q5,Q6), one output inductor (L2), and two secondary windings of the transformer T1.

Q5 and Q6 are synchronous rectifier switches. They can be implemented by, for example, IRLR8103 from International Rectifier or be replaced by diodes. Other switches such as IGBT or GTO can also be used for Q1 to Q6.

Figure 71:
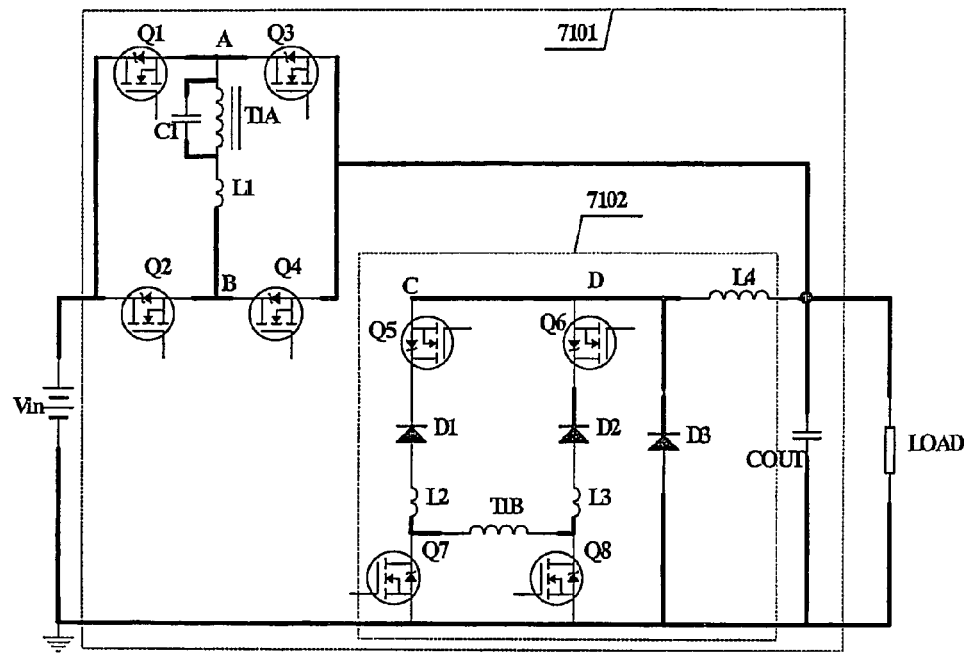
FIG. 71 is a schematic diagram of a non-isolated parallel resonant full-bridge DC—DC converter embodiment of the converter of FIG. 68A with phase control rectifier.

Referring to FIG. 71, a further alternate full-bridge parallel resonant converter 7101 is shown. Its high side circuit is the same as the topology shown in FIG. 68B, but the rectifier circuit is changed from a full-bridge rectifier in FIG. 68B to a phase control rectifier 7102. The phase control rectifier 7102 consists of four MOSFETs (Q5 to Q8), three diodes (D1 to D3), three inductors (L2, L3 and L4), and one secondary winding of the transformer T1.

D1 to D3 can also be replaced by MOSFETs to reduce conduction loss. Q5 and Q8 are synchronous rectifier switches. They can be implemented by, for example, IRLR8103 from International Rectifier. Other switches such as IGBT or GTO can also be used for Q1 to Q8.

Those skilled in the art will appreciate that all full-bridge rectifier circuits in converters 9601 may use phase control to regulate the output voltage provided that bi-directional voltage switches are used in at least the top side (for example Q5, Q6 of FIG. 71) or bottom side (for example Q7, Q8 of FIG. 72) of the rectifier circuit. In the converters of FIGS. 71, 75, 79, 85, 89 and 93 bidirectional voltage switches are provided by MOSFETs in series with blocking diodes (for example Q5, Q6 and D1, D2 of FIG. 71) to block reverse voltage. If IGBT switches are used then the blocking diodes could also be used. GTO switches are themselves bidirectional and blocking diodes would not be necessary. Phase control may be used alone or in combination with switching frequency control and/or phase shift control (where applicable).

It is noted that inductors L2, L3 are used to reduce the switching loss of Q5, Q6 by filtering the waveform on the rectifier circuit 7102 to a quasi-sinusoidal waveform. If the inductors L2, L3 are not used then the circuit 7102 will operate; however, the switching losses for Q5, Q6 will be increased.

Figure 72:
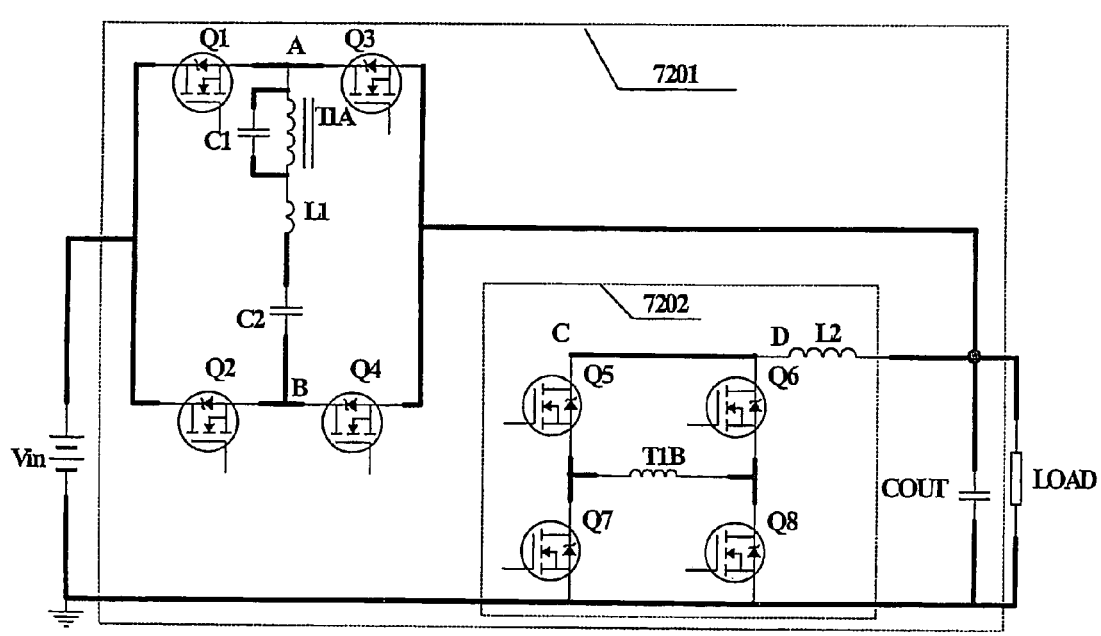
FIG. 72 is a schematic diagram of a non-isolated parallel resonant full-bridge DC—DC converter embodiment of the converter of FIG. 68A with LCC resonant tank and full-bridge rectifier.

Referring to FIG. 72, a further alternate full-bridge parallel resonant converter 7201 is shown. It is different from the topology in FIG. 68B in that the resonant tank is changed from one inductor and one capacitor to two capacitors (C1 and C2) and one inductor (L1). C1 is in parallel with the primary winding of the transformer T1 and in series with L1 and C2.

Other properties of this converter 7201 are similar to the converter 6801 shown in FIG. 68B.

Figure 73:
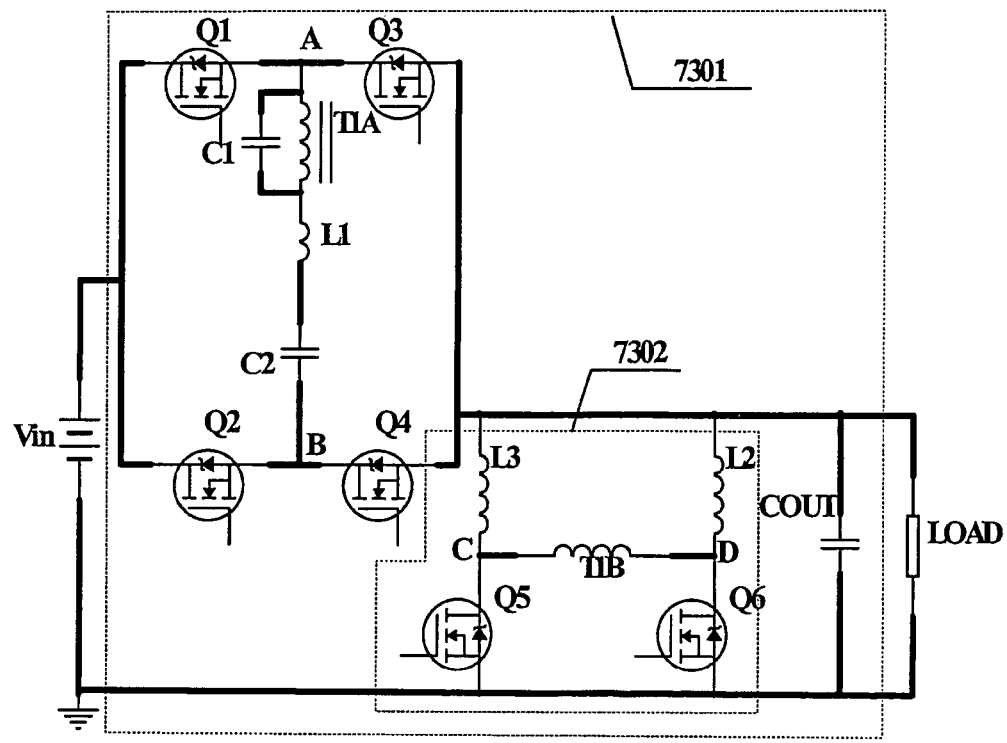
FIG. 73 is a schematic diagram of a non-isolated parallel resonant full-bridge DC—DC converter embodiment of the converter of FIG. 68A with LCC resonant tank and current doubler rectifier.

Referring to FIG. 73, a further alternate full-bridge parallel resonant converter 7301 is shown. It is different from the topology shown in FIG. 69 in that the resonant tank is changed from one inductor and one capacitor to two capacitors (C1 and C2) and one inductor (L1). C1 is in parallel with the primary winding of the transformer T1 and in series with L1 and C2.

Other properties of this converter 7301 are similar to the converter 6901 shown in FIG. 69.

Figure 74:
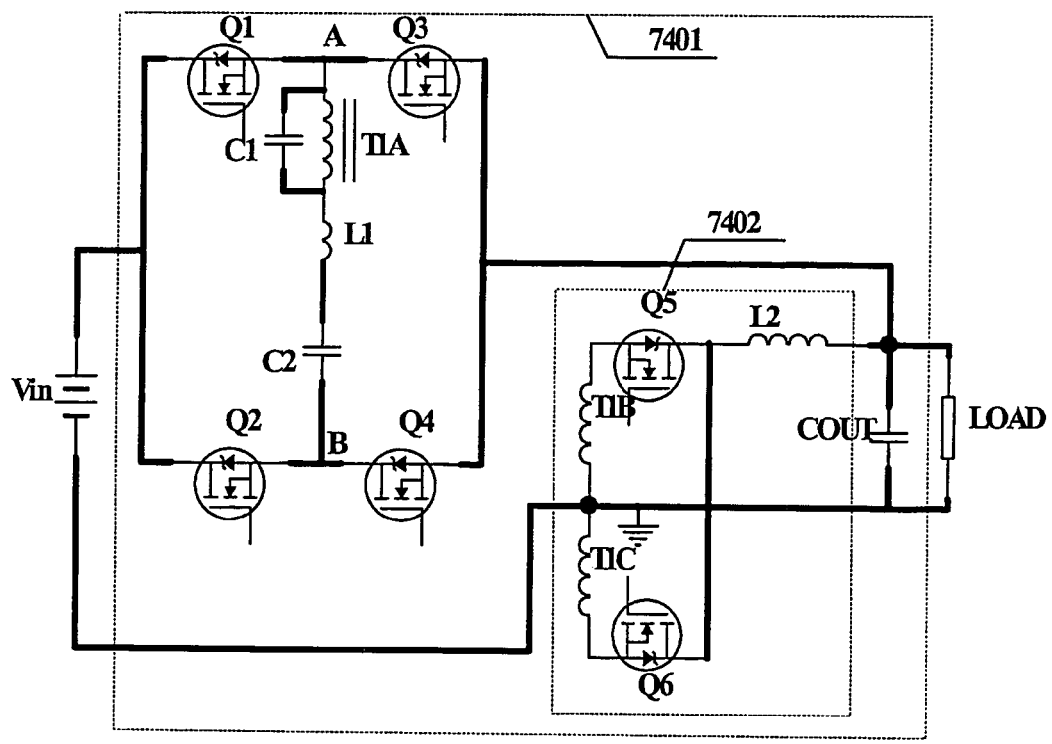
FIG. 74 is a schematic diagram of a non-isolated parallel resonant full-bridge DC—DC converter embodiment of the converter of FIG. 68A with LCC resonant tank and center tapped transformer rectifier.

Referring to FIG. 74, a further alternate full-bridge parallel resonant converter 7401 is shown. It is different from the topology shown in FIG. 70 in that the resonant tank is changed from one inductor and one capacitor to two capacitors (C1 and C2) and one inductor (L1). C1 is in parallel with the primary winding of the transformer T1 and in series with L1 and C2.

Other properties of this converter 7401 are similar to the converter 7001 shown in FIG. 70.

Figure 75:
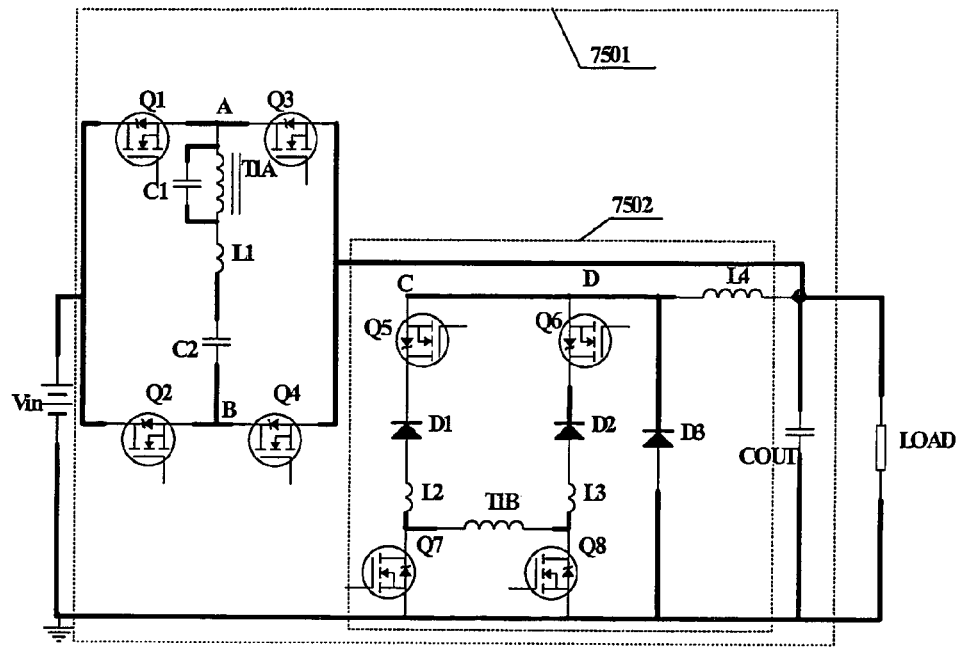
FIG. 75 is a schematic diagram of a non-isolated parallel resonant full-bridge DC—DC converter embodiment of the converter of FIG. 68A with LCC resonant tank and phase control rectifier.

Referring to FIG. 75, a further alternate full-bridge parallel resonant converter 7501 is shown. It is different from the topology shown in FIG. 71 in that the resonant tank is changed from one inductor and one capacitor to two capacitors (C1 and C2) and one inductor (L1). C1 is in parallel with the primary winding of the transformer T1 and in series with L1 and C2.

Other properties of this converter 7501 are similar to the converter 7101 shown in FIG. 71.

Figure 76:
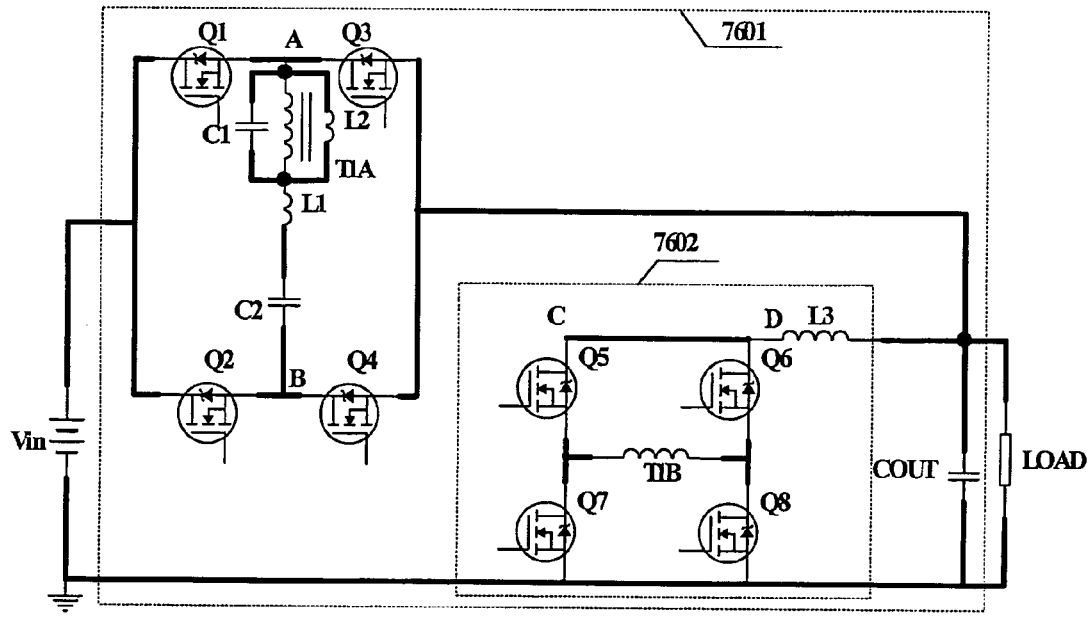
FIG. 76 is a schematic diagram of a non-isolated parallel resonant full-bridge DC—DC converter embodiment of the converter of FIG. 68A with LCLC resonant tank and full-bridge rectifier.

Referring to FIG. 76, a further alternate full-bridge parallel resonant converter 7601 is shown. It is different from the topology in FIG. 68B in that the resonant tank is changed from one inductor and one capacitor to two capacitors (C1 and C2) and two inductors (L1 and L2). C1 and L2 are in parallel with the primary winding of the transformer T1 and in series with L1 and C2.

Other properties of this converter 7601 are similar to the converter 6801 shown in FIG. 68B.

Figure 77:
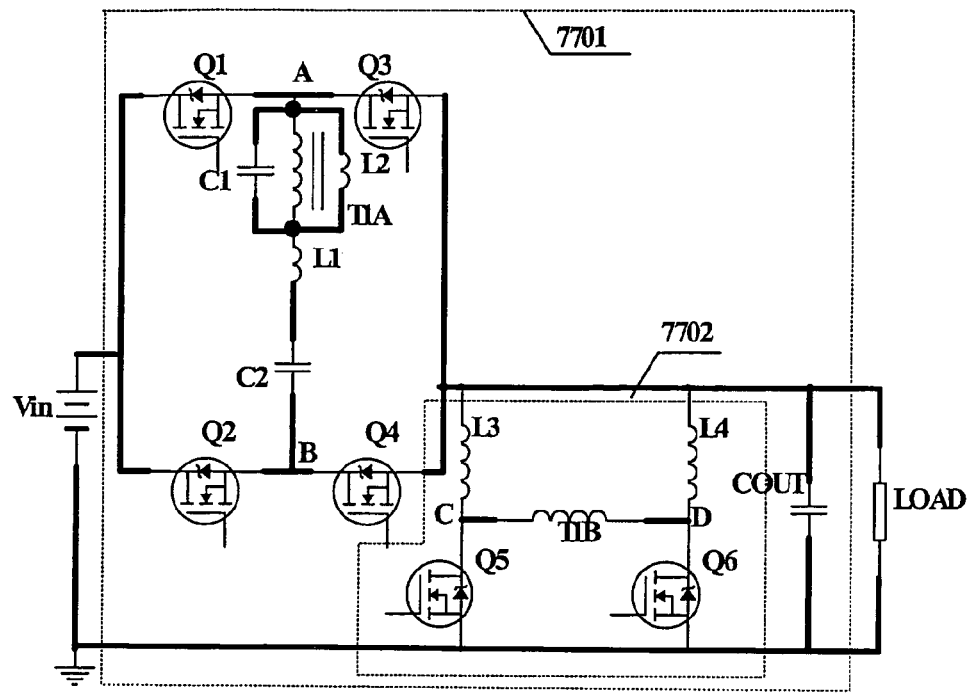
FIG. 77 is a schematic diagram of a non-isolated parallel resonant full-bridge DC—DC converter embodiment of the converter of FIG. 68A with LCLC resonant tank and current doubler rectifier.

Referring to FIG. 77, a further alternate full-bridge parallel resonant converter 7701 is shown. It is different from the topology shown in FIG. 69 in that the resonant tank is changed from one inductor and one capacitor to two capacitors (C1 and C2) and two inductors (L1 and L2). C1 and L2 are in parallel with the primary winding of the transformer T1 and in series with L1 and C2.

Other properties of this converter 7701 are similar to the converter 6901 shown in FIG. 69.

Figure 78:
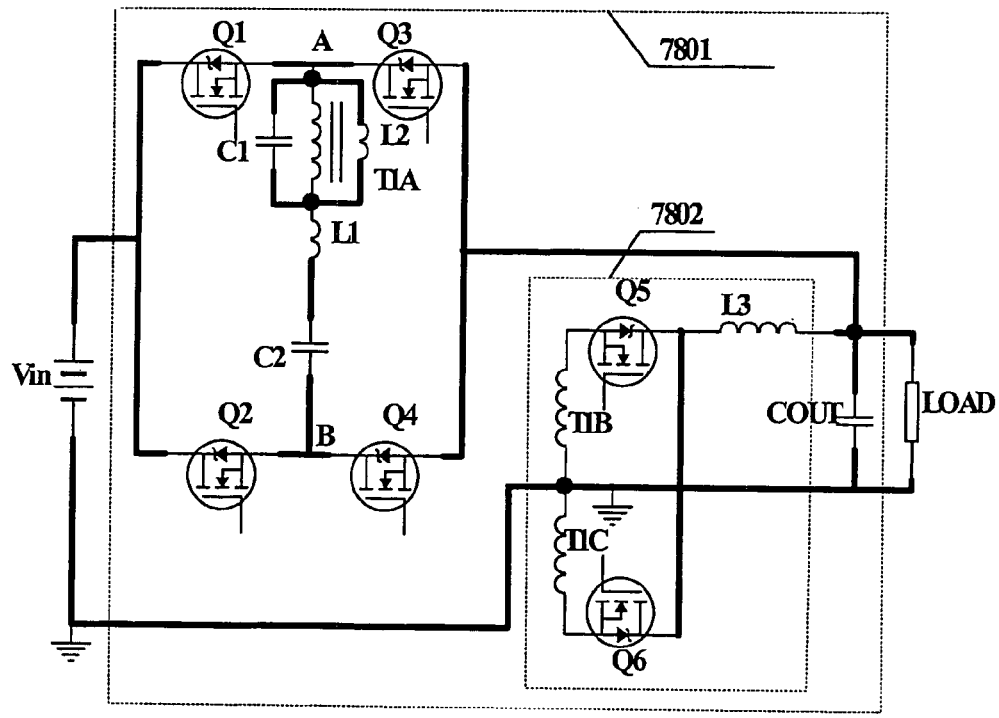
FIG. 78 is a schematic diagram of a non-isolated parallel resonant full-bridge DC—DC converter embodiment of the converter of FIG. 68A with LCLC resonant tank and center tapped transformer rectifier.

Referring to FIG. 78, a further alternate full-bridge parallel resonant converter 7801 is shown. It is different from the topology shown in FIG. 70 in that the resonant tank is changed from one inductor and one capacitor to two capacitors (C1 and C2) and two inductors (L1 and L2). C1 and L2 are in parallel with the primary winding of the transformer T1 and in series with L1 and C2.

Other properties of this converter 7801 are similar to the converter 7001 shown in FIG. 70.

Figure 79:
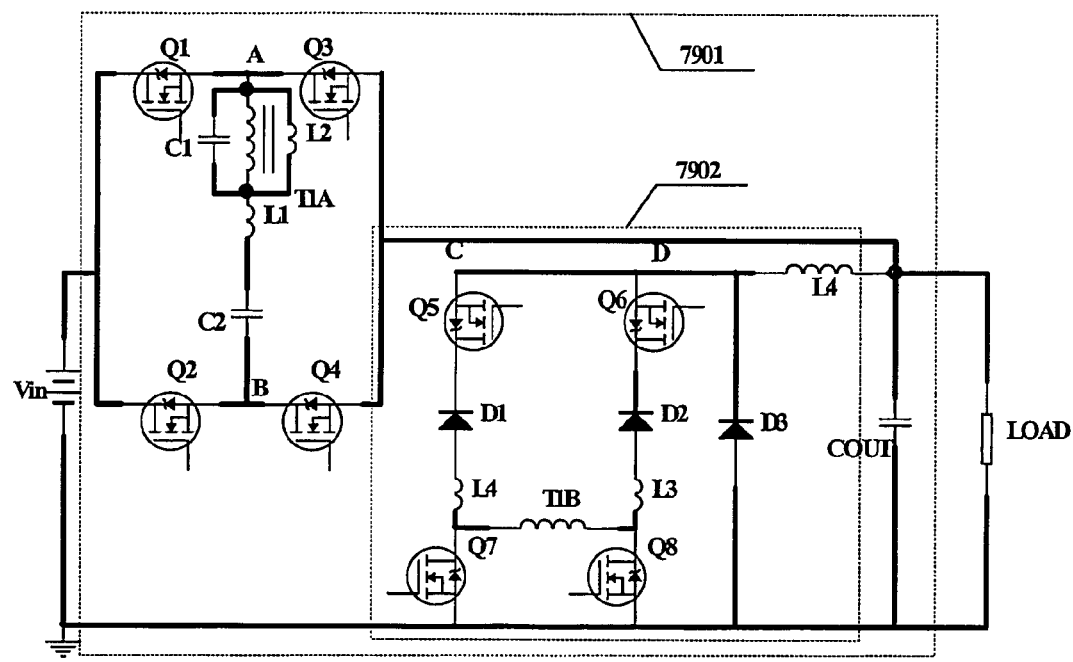
FIG. 79 is a schematic diagram of a non-isolated parallel resonant full-bridge DC—DC converter embodiment of the converter of FIG. 68A with LCLC resonant tank and phase control rectifier.

Referring to FIG. 79, a further alternate full-bridge parallel resonant converter 7901 is shown. It is different from the topology shown in FIG. 71 in that the resonant tank is changed from one inductor and one capacitor to two capacitors (C1 and C2) and two inductors (L1 and L2). C1 and L2 are in parallel with the primary winding of the transformer T1 and in series with L1 and C2.

Other properties of this converter 7901 are similar to the converter 7101 shown in FIG. 71.

Figure 80:
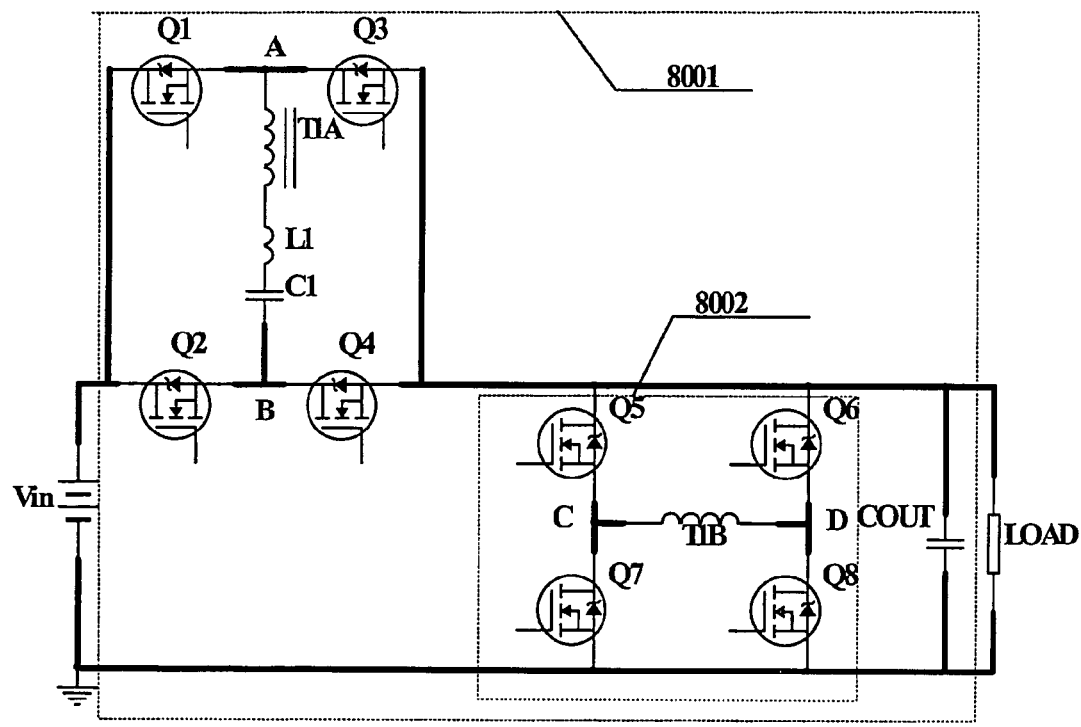
FIG. 80 is a schematic diagram of a non-isolated series resonant full-bridge DC—DC converter embodiment of the converter of FIG. 68A with full-bridge rectifier.

A number of non-isolated full-bridge series resonant converter embodiments of the converter 9601 will now be described. A non-isolated full-bridge series resonant converter 8001 is shown in FIG. 80. The converter 8001 has eight MOSFETs (Q1 to Q8), one transformer (T1), with one primary winding and one secondary winding, and an output capacitor (Cout). A resonant tank has one inductor (L1) and one capacitor (C1), the capacitor C1 is in series with the primary winding of T1 and inductor L1.

The converter 8001 has two circuits, a primary high side circuit and a secondary rectifier circuit. The high side circuit has a primary winding of transformer T1, an auxiliary section (Q1 to Q4) and a resonant tank (L1, C1); while Q5 to Q8, and the transformer T1 secondary winding form a full-bridge rectifier circuit 8002.

Figure 81:
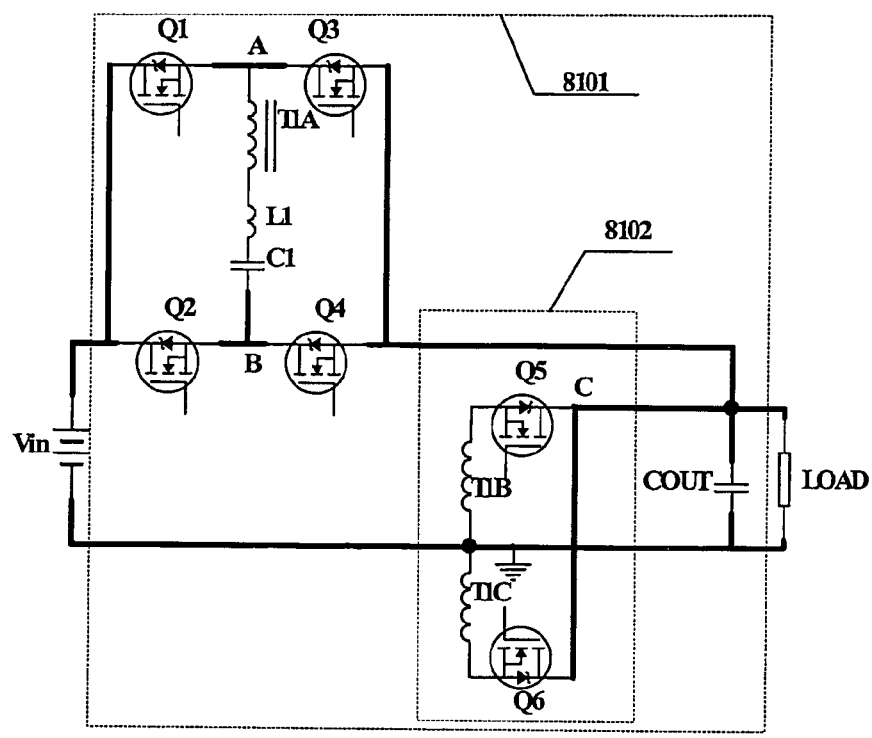
FIG. 81 is a schematic diagram of a full-bridge series resonant converter embodiment of the converter of FIG. 68A with center tapped transformer rectifier.

Referring to FIG. 81, an alternate full-bridge series resonant converter 8101 is shown. The converter 8101 has six MOSFETs (Q1 to Q6), one transformer (T1) with one primary winding and two secondary windings, and one output capacitor (Cout). A resonant tank has one inductor (L1) and one capacitor (C1), the capacitor C1 is in series with the primary winding of T1 and inductor L1.

The converter 8101 has two circuits, a high side circuit and a rectifier circuit 8101. High side circuit has a primary winding of transformer T1, auxiliary section (Q1 to Q4) and resonant tank (L1, C1); while Q5 and Q6, the transformer T1 secondary winding and Cout form the center tapped transformer rectifier circuit.

Q1 to Q4 are primary switches. They can be implemented by, for example, IRF7467 from International Rectifier. Q5, Q6 are synchronous rectifier switches, they can be implemented by, for example, IRLR8103 from International Rectifier. Q5, Q6 can also be replaced by diodes. Other switches such as IGBT or GTO can also be used for Q1 to Q6.

Figure 82:
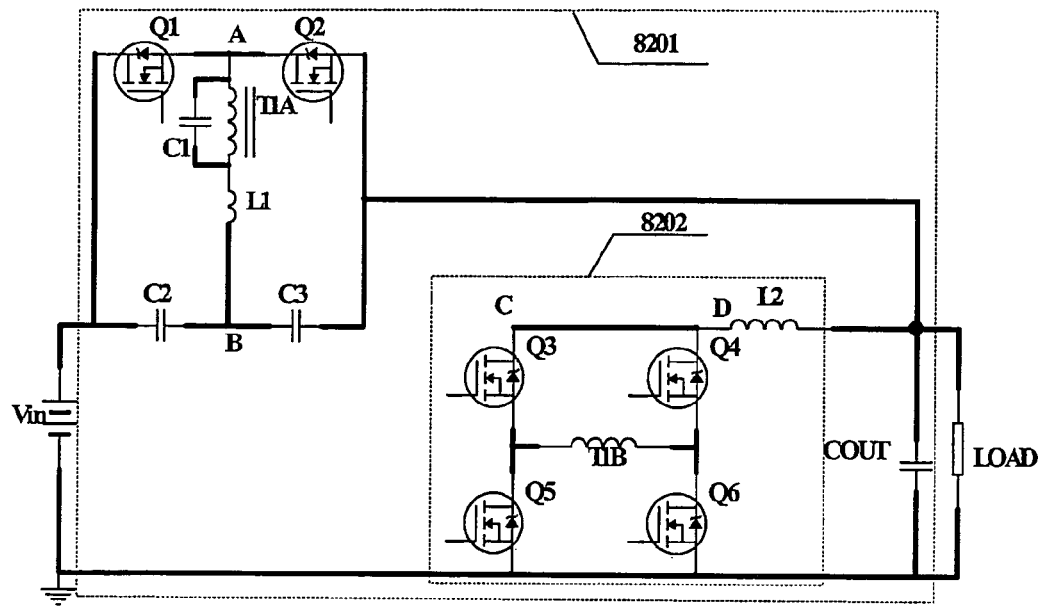
FIG. 82 is a schematic diagram of a non-isolated parallel resonant half-bridge DC—DC converter embodiment of the converter of FIG. 68A with full-bridge rectifier.

A number of non-isolated half-bridge parallel resonant converters embodiments of the converter 9601 will now be described. Referring to FIG. 82 a non-isolated half-bridge parallel resonant converter 8201 is shown. The converter 8201 has six MOSFETs (Q1 to Q6), one transformer (T1) with one primary winding and one secondary winding, two voltage divider capacitors (C2 and C3), one output inductor (L2) and one output capacitor (Cout). A resonant tank has one inductor (L1) and one capacitor (C1), the capacitor C1 is in parallel with the primary winding of T1 and in series with inductor L1.

The converter 8201 has two circuits, a high side circuit and a rectifier circuit. The high side circuit has the primary winding of transformer T1, an auxiliary section (Q1 and Q2 and two voltage divider capacitors—C2 and C3) and a resonant tank (L1, C1); while Q3 to Q6, transformer T1 secondary winding, and L2 form the full-bridge rectifier circuit 8202.

Q1 to Q2 are primary switches. They can be implemented by, for example, IRF7467 from International Rectifier. Q3 to Q6 are synchronous rectifier switches, they can be implemented by, for example, IRLR8103 from International Rectifier or be replaced by diodes. Other switches such as IGBT or GTO can also be used for Q1 to Q6.

Figure 83:
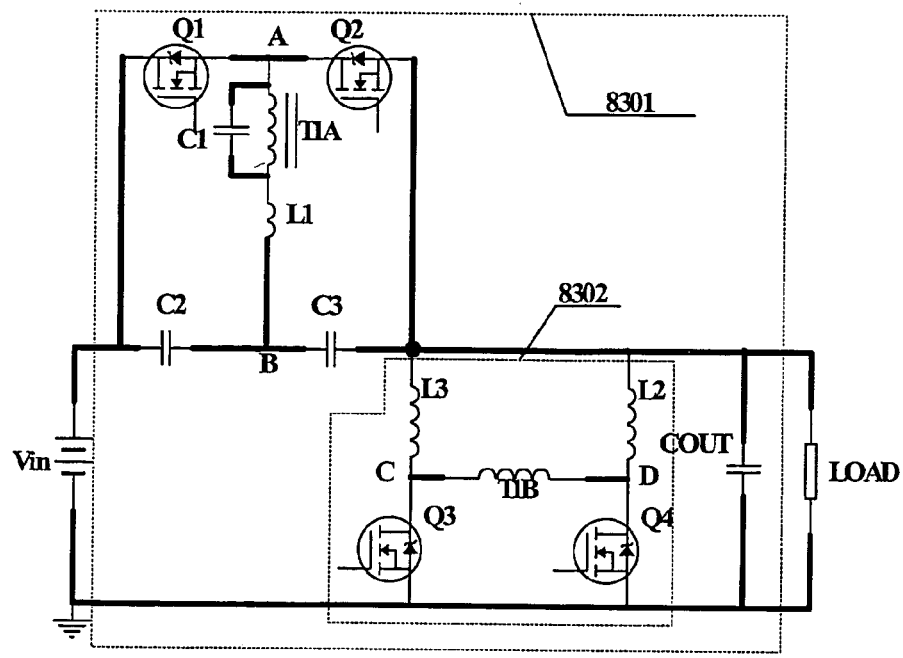
FIG. 83 is a schematic diagram of a non-isolated parallel pesonant half-bridge DC—DC Converter embodiment of the converter of FIG. 68A with current doubler rectifier.

Referring to FIG. 83, a further alternate half-bridge parallel resonant converter 8301 is shown. Its high side circuit is the same as the topology shown in FIG. 82, but the rectifier circuit is changed from full-bridge rectifier in FIG. 82 to current doubler 8302. The current doubler 8302 has two MOSFETs (Q3 and Q4), two output inductors (L2 and L3), and the secondary winding of the transformer T1.

Q3 and Q4 are synchronous rectifier switches, they can be implemented by, for example, IRLR8103 from International Rectifier or be replaced by diodes. Other switches such as IGBT or GTO can also be used for Q1 to Q4.

Figure 84:
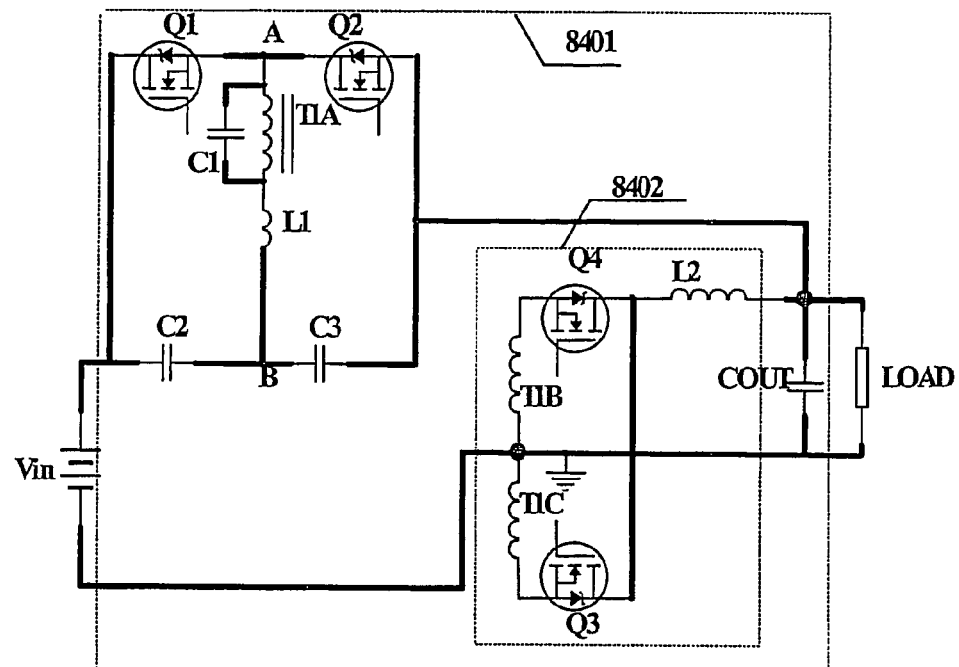
FIG. 84 is a schematic diagram of a non-isolated parallel resonant half-bridge DC—DC converter embodiment of the converter of FIG. 68A with center tapped transformer rectifier.

Referring to FIG. 84, a further alternate half-bridge parallel resonant converter 8401 is shown. Its high side circuit is the same as the topology shown in FIG. 82, but the rectifier circuit is changed from a full-bridge rectifier in FIG. 82 to a center tapped transformer rectifier 8402. The center tapped transformer rectifier 8402 has two MOSFETs (Q3 and Q4), one output inductor (12), and two secondary windings of the transformer T1.

Q3 and Q4 are synchronous rectifier switches, they can be implemented by, for example, IRLR8103 from International Rectifier or be replaced by diodes. Other switches such as IGBT or GTO can also be used for Q1 to Q4.

Figure 85:
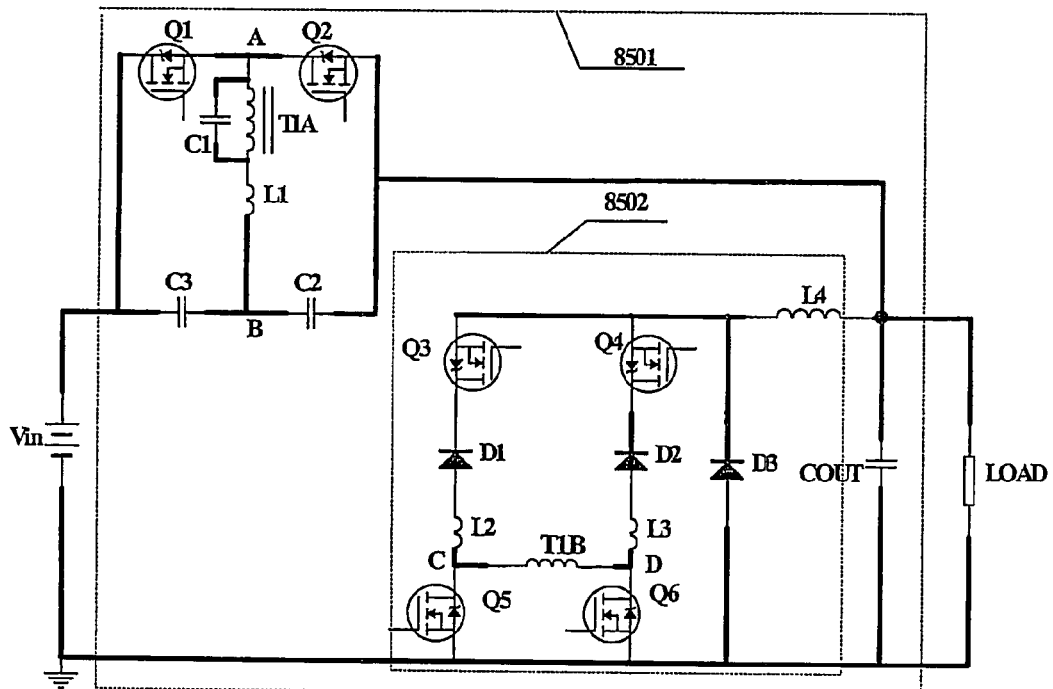
FIG. 85 is a schematic diagram of a non-isolated parallel resonant half-bridge DC—DC converter embodiment of the converter of FIG. 68A with phase control rectifier.

Referring to FIG. 85, a half-bridge parallel resonant converter 8501 is shown. Its high side circuit is the same as the topology shown in FIG. 82, but the rectifier circuit is changed from a frill-bridge rectifier in FIG. 82 to a phase control rectifier 8502. The phase control rectifier 8502 has four MOSFETs (Q3 to Q6), three diodes (D1 to D3), three inductors (L2 L3 and L4), and one secondary winding of the transformer T1.

D1 to D3 can also be replaced with MOSFETs to reduce conduction loss. Q3 to Q6 are synchronous rectifier switches, they can be implemented by, for example, IRLR8103 from International Rectifier. Other switches such as IGBT or GTO can also be used for Q1 to Q6.

Figure 86:
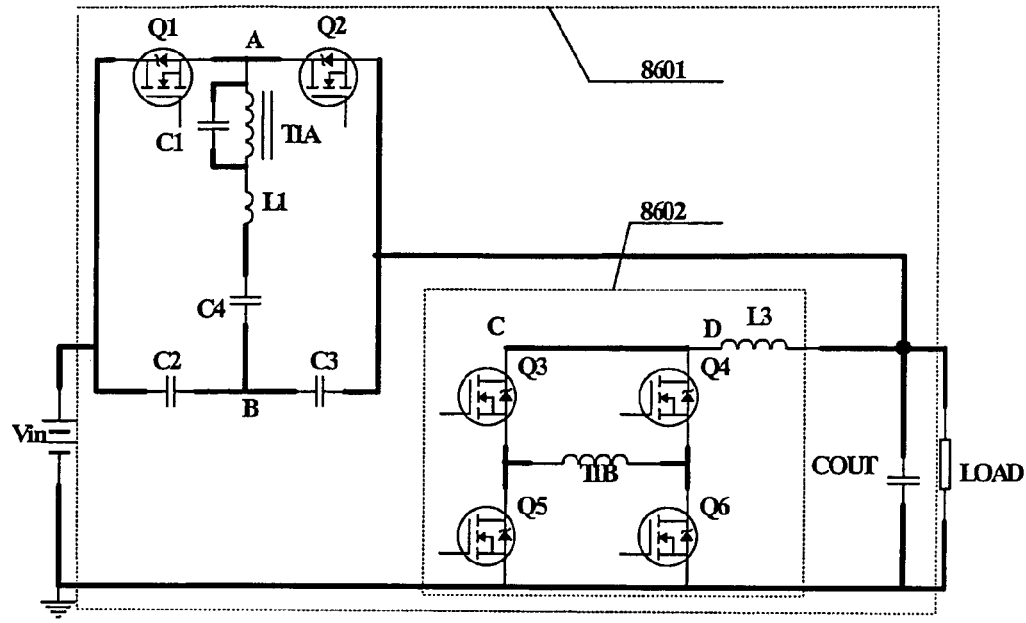
FIG. 86 is a schematic diagram of a non-isolated parallel resonant half-bridge DC—DC converter embodiment of the converter of FIG. 68A with LCC resonant tank and full-bridge rectifier.

Referring to FIG. 86, a further alternate half-bridge parallel resonant converter 8601 is shown. It is different from the topology shown in FIG. 82 in that the resonant tank is changed from one inductor one capacitor to two capacitors (C1 and C4) and one inductor L1. C1 is in parallel with the primary winding of the transformer T1 and in series with L1 and C4.

Other properties of this topology are similar to the converter 8201 in FIG. 82.

Figure 87:
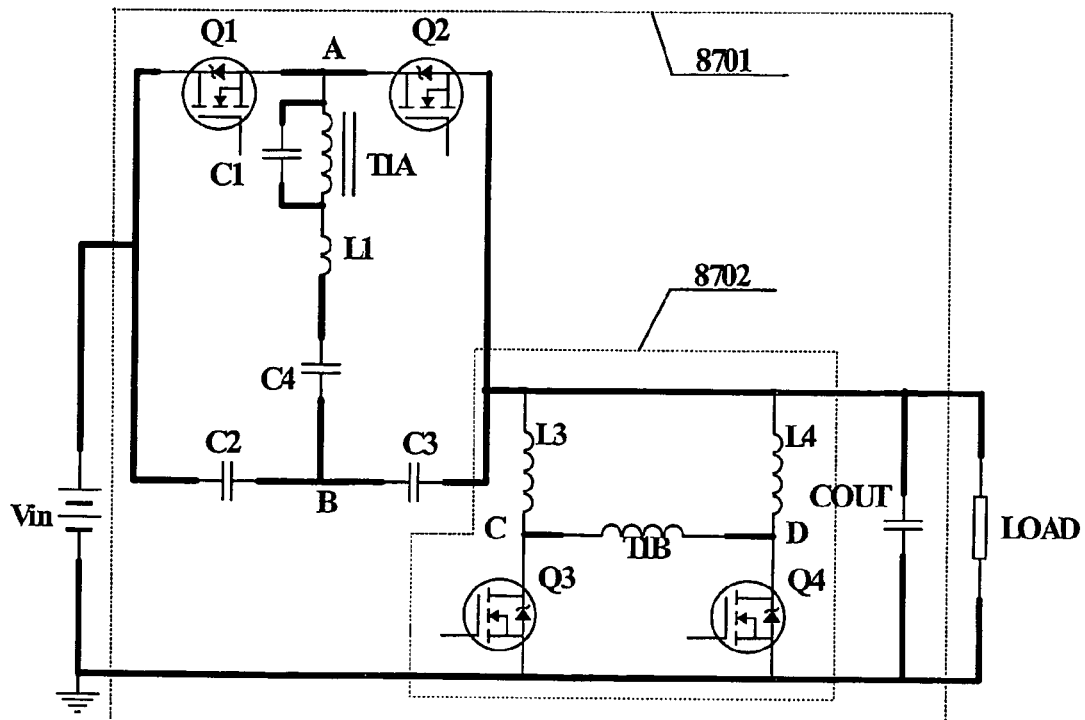
FIG. 87 is a schematic diagram of a non-isolated parallel resonant half-bridge DC—DC converter embodiment of the converter of FIG. 68A with LCC resonant tank and current doubler rectifier.

Referring to FIG. 87, a half-bridge parallel resonant converter 8701 is shown. It is different from the topology shown in FIG. 83 in that the resonant tank is changed from one inductor and one capacitor to two capacitors (C1 and C4) and one inductor L1. C1 is in parallel with the primary winding of the transformer T1 and in series with L1 and C4.

Other properties of this topology are similar to the topology in FIG. 83.

Figure 88:
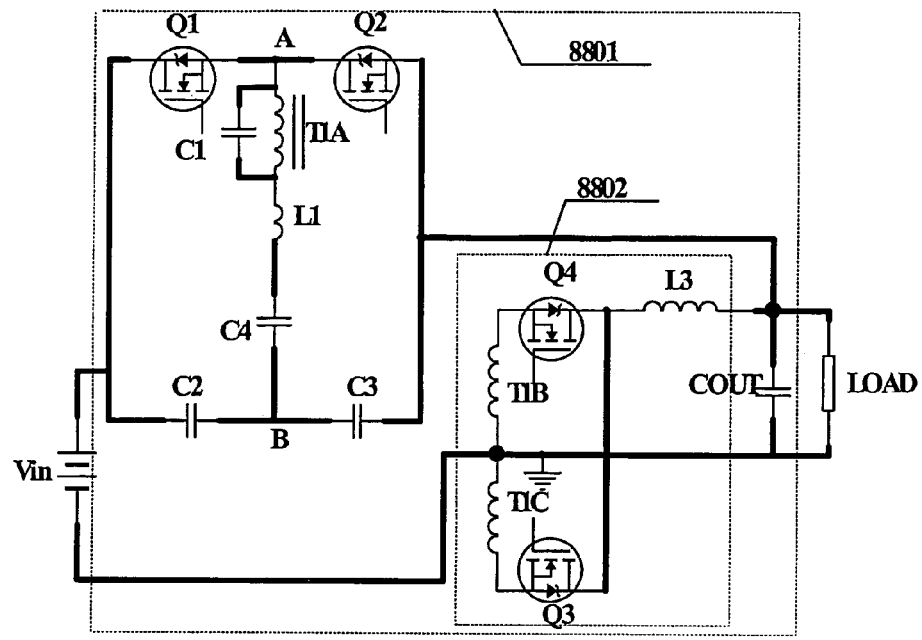
FIG. 88 is a schematic diagram of a non-isolated parallel resonant half-bridge DC—DC converter embodiment of the converter of FIG. 68A with LCC resonant tank and center tapped transformer rectifier.

Referring to FIG. 88, a further alternate half-bridge parallel resonant converter 8801 is shown. It is different from the topology shown in FIG. 84 in that the resonant tank is changed from one inductor and one capacitor to two capacitors (C1 and C4) and one inductor L1. C1 is in parallel with the primary winding of the transformer T1 and in series with L1 and C4.

Other properties of this topology are similar to the topology in FIG. 84.

Figure 89:
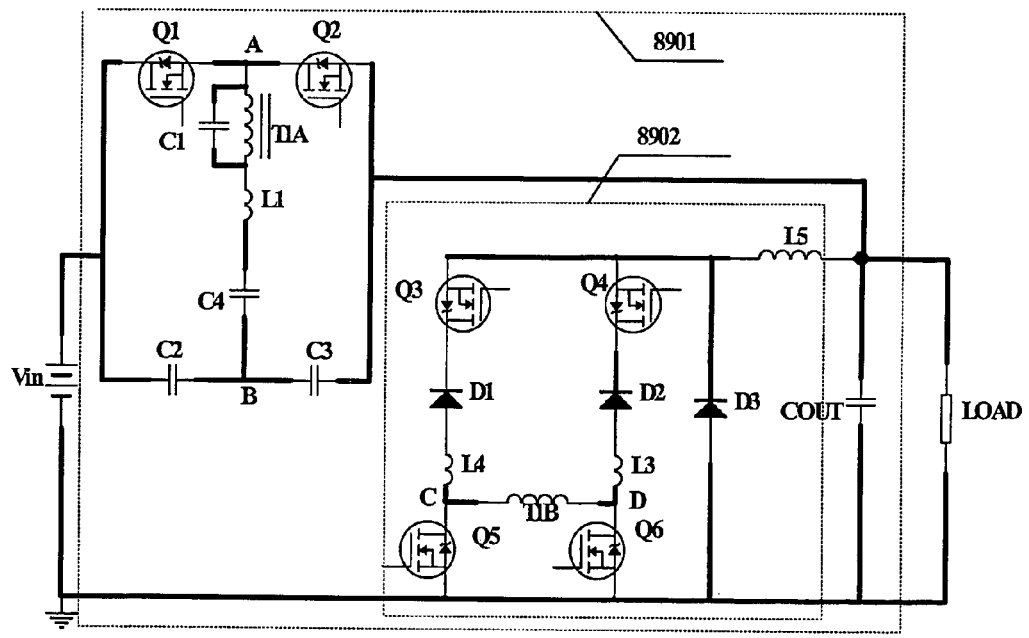
FIG. 89 is a schematic diagram of a non-isolated parallel resonant half-bridge DC—DC converter embodiment of the converter of FIG. 68A with LCC resonant tank and phase control rectifier.

Referring to FIG. 89, a further alternate half-bridge parallel resonant converter 8901 is shown. It is different from the topology shown in FIG. 85 in that the resonant tank is changed from one inductor and one capacitor to two capacitors (C1 and C4) and one inductor L1. C1 is in parallel with the primary winding of the transformer T1 and in series with L1 and C4.

Other properties of this topology are similar to the topology in FIG. 85.

Figure 90:
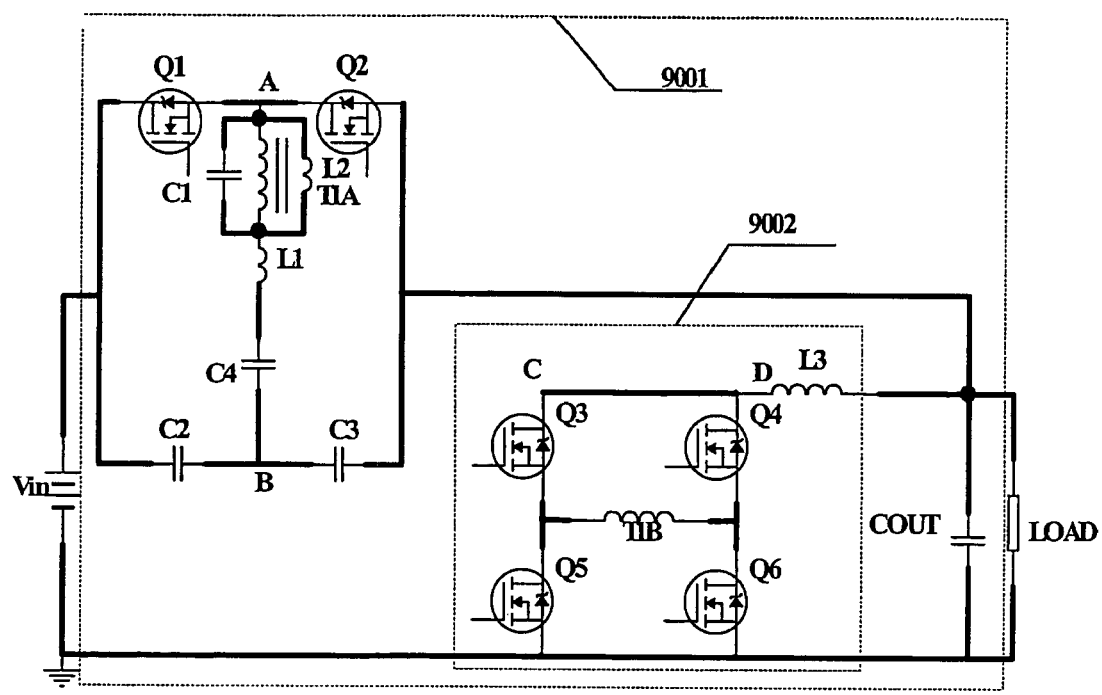
FIG. 90 is a schematic diagram of a non-isolated parallel resonant half-bridge DC—DC converter embodiment of the converter of FIG. 68A with LCLC resonant tank and full-bridge rectifier.

Referring to FIG. 90, a half-bridge parallel resonant converter 9001 is shown. It is different from the topology shown in FIG. 82 in that the resonant tank is changed from one inductor and one capacitor to two capacitors (C1 and C4) and two inductors (L1 and L2). C1 and L2 are in parallel with the primary winding of the transformer T1 and in series with L1 and C4.

Other properties of this topology are similar to the topology in FIG. 82.

Figure 91:
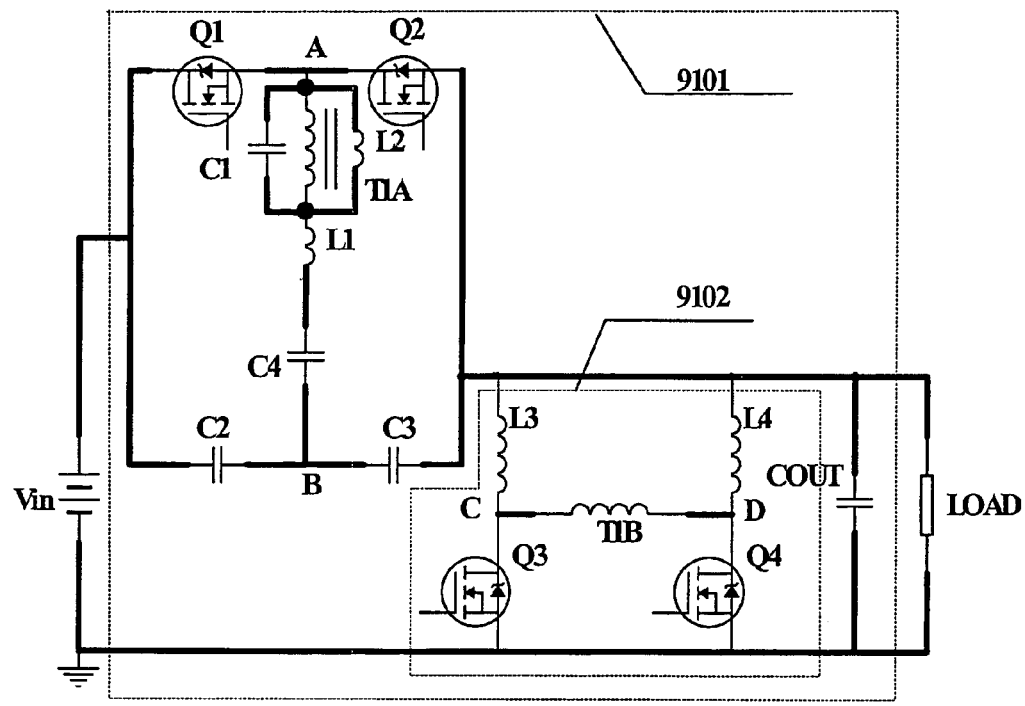
FIG. 91 is a schematic diagram of a non-isolated parallel resonant half-bridge DC—DC converter embodiment of the converter of FIG. 68A with LCLC resonant tank and current doubler rectifier.

Referring to FIG. 91, a further alternate half-bridge parallel resonant converter 9101 is shown. It is different from the topology shown in FIG. 83 in that the resonant tank is changed from one inductor and one capacitor to two capacitors (C1 and C4) and two inductors (L1 and L2). C1 and L2 are in parallel with the primary winding of the transformer T1 and in series with L1 and C4.

Other properties of this topology are similar to the topology in FIG. 83.

Figure 92:
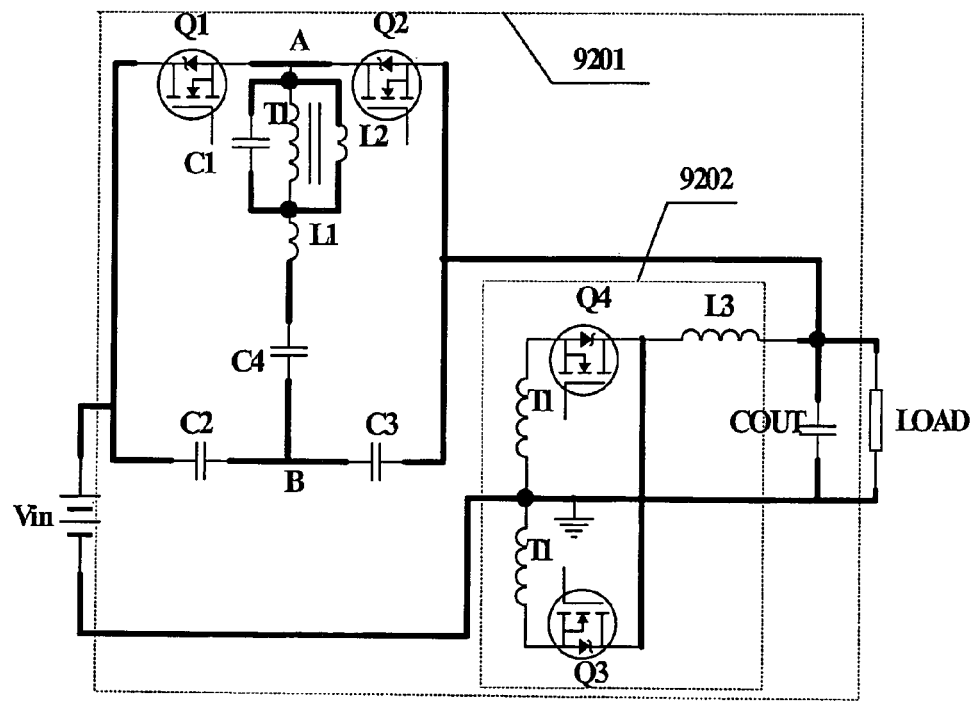
FIG. 92 is a schematic diagram of a non-isolated parallel resonant half-bridge DC—DC converter embodiment of the converter of FIG. 68A with LCLC resonant tank and center tapped transformer rectifier.

Referring to FIG. 92, a half-bridge parallel resonant converter 9201 is shown. It is different from the topology in FIG. 84 in that the resonant tank is changed from one inductor and one capacitor to two capacitors (C1 and C4) and two inductors (L1 and L2). C1 and L2 are in parallel with the primary winding of the transformer T1 and in series with L1 and C4.

Other properties of this topology are similar to the topology in FIG. 84.

Figure 93:
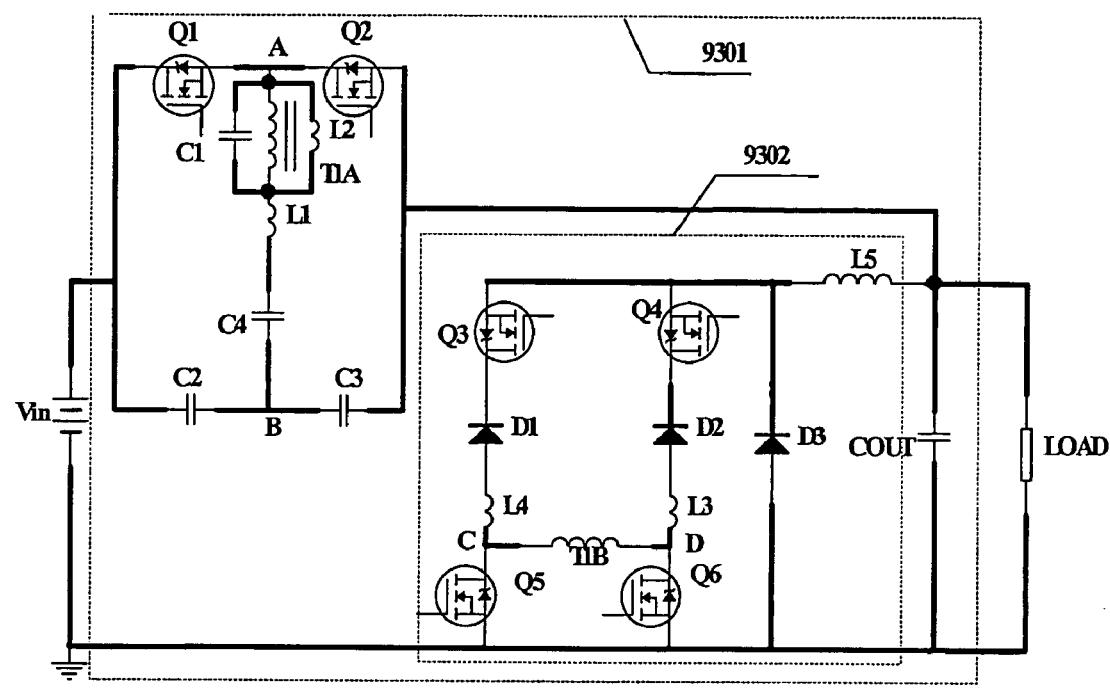
FIG. 93 is a schematic diagram of a non-isolated parallel resonant half-bridge DC—DC converter embodiment of the converter of FIG. 68A with LCLC resonant tank and phase control rectifier.

Referring to FIG. 93, a further alternate half-bridge parallel resonant converter 9301 is shown. It is different from the topology in FIG. 85 in that the resonant tank is changed from one inductor and one capacitor to two capacitors (C1 and C4) and two inductors (L1 and L2). C1 and L2 are in parallel with the primary winding of the transformer T1 and in series with L1 and C4.

Other properties of this topology are similar to the topology in FIG. 85.

Figure 94:
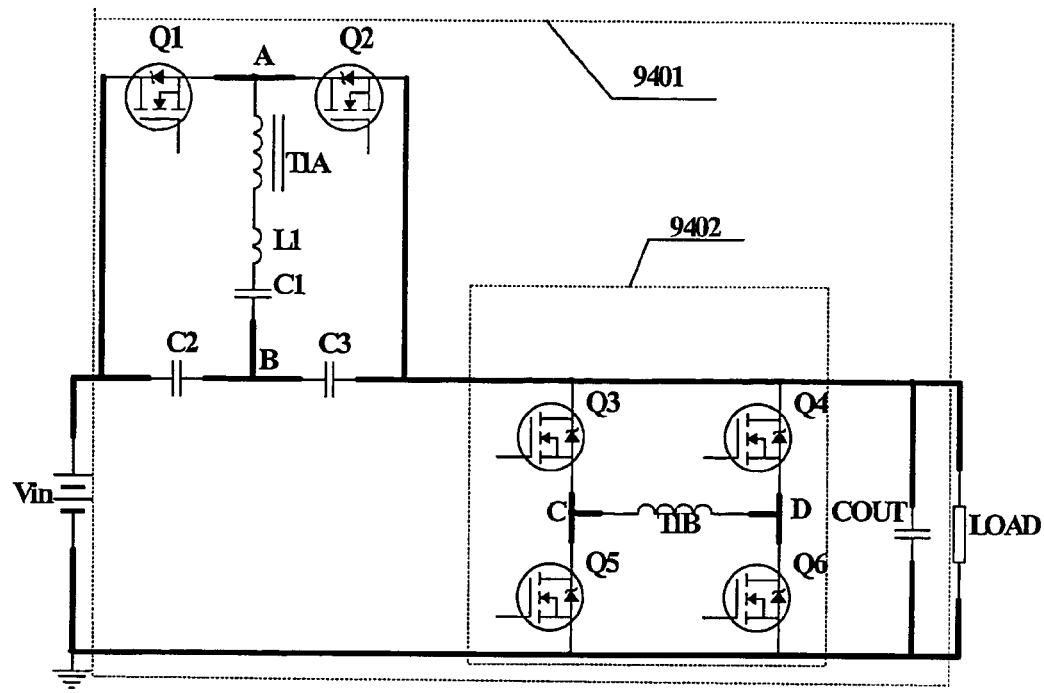
FIG. 94 is a schematic diagram of a non-isolated series resonant half-bridge DC—DC converter embodiment of the converter of FIG. 68A with full-bridge rectifier.

A number of non-isolated half-bridge series resonant converter embodiments of the converter 9601 will now be described. Referring to FIG. 94, a non-isolated half-bridge series resonant converter 9401 is shown. The converter 9401 has six MOSFETs (Q1 to Q6), one transformer (T1) with one primary winding and one secondary winding, two voltage divider capacitors (C2 and C3), and one output capacitor (Cout). A resonant tank has one inductor L1 and one capacitor C1, the capacitor C1 is in series with the primary winding of T1 and inductor L1.

The converter 9401 has two circuits, a high side circuit and a rectifier circuit. The high side circuit has the primary winding of transformer T1, an auxiliary section (Q1 and Q2 and two voltage divider capacitors C2 and C3) and a resonant tank (L1, C1); while Q3 to Q6 and transformer T1 secondary winding form the full-bridge rectifier circuit 9402.

Q1 and Q2 are primary switches. They can be implemented by, for example, IRF7467 from International Rectifier. Q3 to Q6 are synchronous rectifier switches, they can be implemented by, for example, IRLR8103 from International Rectifier. Q3 to Q6 can also be replaced by diodes. Other switches such as IGBT or GTO can also be used for Q1 to Q6.

For this topology the duty cycle of Q5 and Q6 can be controlled to change the output voltage.

Figure 95:
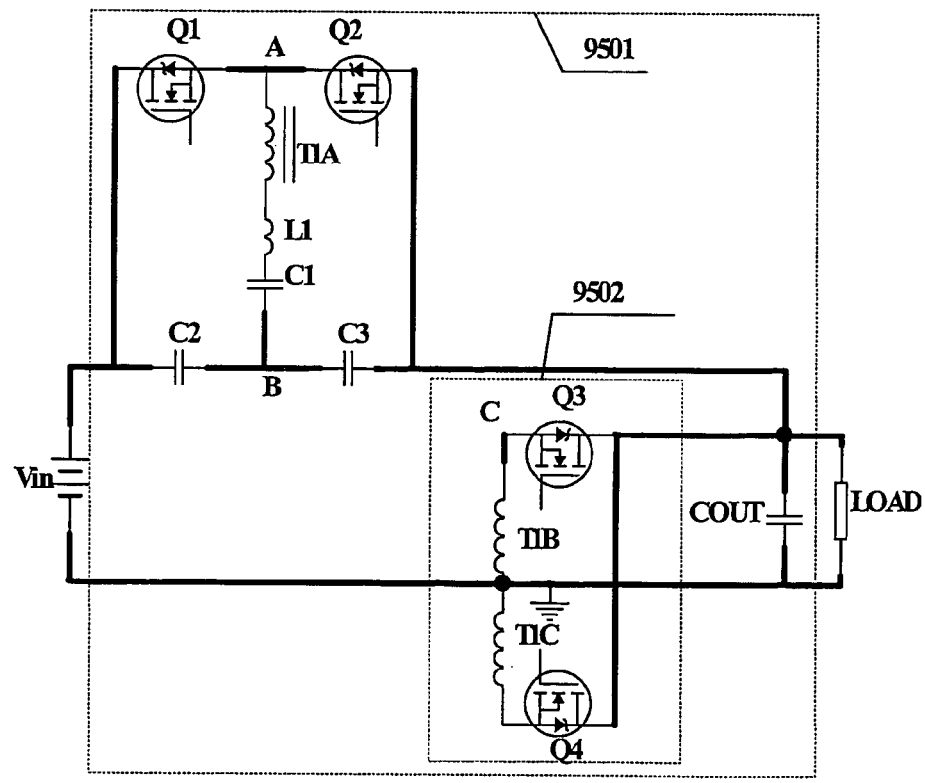
FIG. 95 is a schematic diagram of a non-isolated series resonant half-bridge DC—DC converter embodiment of the converter of FIG. 68A with center tapped transformer rectifier.

Referring to FIG. 95, an alternate half-bridge series resonant converter 9501 is shown. The converter 9501 has four MOSFETs (Q1 to Q4), one transformer (T1) with one primary winding and two secondary windings, two voltage divider capacitors (C2 and C3), and one output capacitor (Cout). A resonant tank has one inductor (L1) and one capacitor (C1), the capacitor C1 is in series with the primary winding of T1 and inductor L1.

The converter 9501 has two circuits, a high side circuit and a rectifier circuit. The high side circuit has the primary winding of transformer T1, an auxiliary section (Q1 and Q2 and two voltage divider capacitors C2 and C3) and a resonant tank (L1, C1); while Q3 and Q4 and transformer T1 secondary winding form the center tapped transformer rectifier circuit.

Q1 Q2 are primary switches. They can be implemented by, for example, IRF7467 from International Rectifier. Q3 Q4 are synchronous rectifier switches, they can be implemented by, for example, IRLR8103 from International Rectifier. Q3,Q4 can also be replaced by diodes. Other switches such as IGBT or GTO can also be used for Q1 to Q4.

For this topology the duty cycle of Q3 and Q4 can be controlled to change the output voltage.

Using similar techniques other resonant converters can also be built. This is shown in the block diagram in FIG. 68A. By using different and/or multiple high side circuits, different resonant tanks, multiple primary and/or secondary windings, and/or different and/or multiple rectifier circuits, different converters can be formed. Those circuits and tanks include such high side circuits, resonant tanks and rectifier circuits as would be understood by those skilled in the art to be applicable for these purposes, including those circuits described as such anywhere in this description. The techniques described herein for creating non-resonant tank converters using multiple high side circuits and multiple rectifier circuits are equally applicable to resonant tank converters.

The advantages of these topologies include, because the primary and secondary sides (high side and rectifier circuits) are not isolated, the primary and secondary sides being coupled directly, resulting in an increase in efficiency or a decrease in power loss during conversion. This can significantly improve the life of the converter, as the junction temperature of semiconductors is reduced. In addition, this can make the converter size smaller. It can also simplify the mechanical design of the computer motherboard, which can reduce the cost.

Another advantage of these converters is that they can operate with very high switching frequency because the switches can operate in ZVS or ZCS ("zero current switching") mode, with a resulting reduction in switch losses.

As previously mentioned, the control methods for use with resonant tank converters can include switching frequency control, phase shift control, and phase control, alone or together.

It will be understood by those skilled in the art that this description is made with reference to the preferred embodiment and that it is possible to make other embodiments employing the principles of the invention which fall within its spirit and scope as defined by the following claims.

We claim:

1. A DC—DC converter for use with a DC power source having a DC voltage across a first voltage source output and a second voltage source output and with a load, the converter comprising:
   a. an input for accepting the DC voltage, the input having a first voltage input point and a second voltage input point,
   b. an output for outputting a converted DC voltage, the output having a first voltage output point and a second voltage output point,
   c. a high side circuit including a first primary winding of a first transformer and an auxiliary section, the high side circuit directly connected between the first voltage input point and the first voltage output point,
   d. a rectifier circuit having a first secondary winding of the first transformer, the rectifier circuit connected between the first voltage output point and the second voltage output point, and
   e. an output capacitor connected between the first voltage output point and the second voltage output point and across the rectifier circuit,
   wherein an output converted DC voltage between the first voltage output point and the second voltage output point has the same polarity as a DC voltage input between the first voltage input point and the second voltage input point, wherein the auxiliary section is for causing the first transformer to transfer power from the first primary winding to the first secondary winding and to operate without saturation, wherein the high side circuit has one and only one high side circuit output point connected such that current flowing through the first primary winding is directed between the high side circuit output point and the first voltage output point, wherein the rectifier circuit is for converting output of the first secondary winding into a one-direction waveform and converting the one-direction waveform into a DC voltage, and wherein the output capacitor is for filtering the converted DC voltage.

2. The converter of claim 1, wherein the auxiliary section comprises switches for repeatedly connecting and disconnecting the primary winding from the input, and allows for resetting of the first transformer.

3. The converter of claim 2, wherein the auxiliary section comprises a combination of switches and capacitors.

4. The converter of claim 1, wherein the auxiliary section comprises four switches.

5. The converter of claim 4, wherein each switch is a MOSFET.

6. The converter of claim 1, wherein the auxiliary section comprises a first switch connected between a first side of the first primary winding and the first voltage input point, a second switch connected between a second side of the first primary winding and the first voltage input point, a third switch connected between the first side of the first primary winding and the high side circuit output point, and a fourth switch connected between the second side of the first primary winding and the high side circuit output point.

7. The converter of claim 6, wherein each switch has an input for a gate drive signal for controlling the operation of the switch.

8. The converter of claim 7, wherein the gate drive signals repeatedly turn on and turn off the first and fourth switch, as well as turn on and off the second and third switch.

9. The converter of claim 1, wherein the auxiliary section comprises a first switch connected between a first side of the first primary winding and the first voltage input point, a first capacitor connected between a second side of the first primary winding and the first voltage input point, a second switch connected between the first side of the first primary winding and the high side circuit output point, and a second capacitor connected between the second side of the first primary winding and the high side circuit output point.

10. The converter of claim 9, wherein each switch has an input for a gate drive signal for controlling the operation of the switch.

11. The converter of claim 10, further comprising gate drive signals adapted to repeatedly turn on and turn off the first switch and the second switch, whereby the first transformer can be reset from the capacitors.

12. The converter of claim 10, wherein the capacitors are large enough that the voltage across the capacitors will not change significantly during normal operation of the converter.

13. The converter of claim 1, wherein the auxiliary section comprises a first switch connected between a first side of the first primary winding and the first voltage input point, a first diode connected between a second side of the first primary winding and the first voltage input point for forward conduction from the second side of the first primary winding to the first voltage input point, a second switch connected between the second side of the first primary winding and the high side circuit output point, and a second diode connected between the first side of the first primary winding and the high side circuit output point for forward conduction from the high side circuit output point to the first side of the first primary winding.

14. The converter of claim 13, wherein each switch has an input for a gate drive signal for controlling the operation of the switch.

15. The converter of claim 14, further comprising gate drive signals adapted to repeatedly turn on and turn off the first switch and the second switch, whereby the first transformer can be reset by current flowing through the first and second diodes.

16. The converter of claim 1, wherein the auxiliary section comprises a first side of the first primary winding connected to the first voltage input point, a first switch connected between the first side of the first primary winding and the first side of the first capacitor, the second side of the first capacitor connected to the second side of the first primary winding, a second switch connected between the second side of the first primary winding and the high side circuit output point.

17. The converter of claim 16, wherein each switch has an input for a gate drive signal for controlling the operation of the switch.

18. The converter of claim 17, further comprising gate drive signals adapted to repeatedly turn on the first switch, while turning off the second switch, and turn off the first switch, while turning on the second switch, whereby the first transformer can be reset from the first capacitor.

19. The converter of claim 1, wherein the rectifier circuit further comprises a combination of inductors and switches, wherein the switches are for converting alternating voltage in the first secondary winding into pulsating one-direction voltage and the inductors are for converting pulsating one-direction voltage into DC voltage.

20. The converter of claim 1, wherein the rectifier circuit further comprises a combination of inductors and diodes, wherein the diodes are for converting pulsating alternating voltage in the first secondary winding into pulsating one-direction voltage and the inductors are for converting pulsating one-direction voltage into DC voltage.

21. The converter of claim 1, wherein the rectifier circuit further comprises a first rectifier switch connected between the second voltage output point and a first side of the first secondary winding, a second rectifier switch connected between a second side of the first secondary winding and the second voltage output point, a first inductor connected between the first side of the first secondary winding and the first voltage output point, and a second inductor connected between the second side of the first secondary winding and the first voltage output point.

22. The converter of claim 21, wherein each switch has an input for a gate drive signal for controlling the operation of the switch.

23. The converter of claim 22, further comprising gate drive signals adapted to switch the first and second rectifier switches to convert bi-directional AC voltage at the first secondary winding into one-direction pulsating voltage.

24. The converter of claim 1, wherein the rectifier circuit further comprises a first rectifier switch connected between the second voltage output point and a first side of the first secondary winding, a second rectifier switch connected between a second side of the first secondary winding and the second voltage output point, and a first inductor connected between the first side of the first secondary winding and the first voltage output point not in series with the second rectifier switch.

25. The converter of claim 1, wherein the rectifier circuit further comprises first and second rectifier diodes and a first inductor, wherein the first diode is connected between a first side of the first secondary winding and the first inductor, and the inductor is further connected between the first diode and the first voltage output point, for forward conduction from the secondary winding through the inductor, and the second diode is connected between (a) a point between the second side of the first secondary winding and the second voltage output point and (b) a point between the first inductor and first diode, also for forward conduction from the secondary winding through the inductor.

26. The converter of claim 1, wherein the rectifier circuit further comprises a second secondary winding, first and second rectifier diodes and a first inductor, wherein a second side of the first secondary winding is connected to a first side of the second secondary winding and the second voltage output point, and the first diode is connected between a first side of the first secondary winding and the first inductor, and the inductor is further connected between the first diode and the first voltage output point, for forward conduction from the secondary winding through the inductor, and the second diode is connected between the second side of the second secondary winding and a point between the first inductor and first diode, also for forward conduction from the secondary winding through the inductor.

27. The converter of claim 1, wherein the rectifier circuit further comprises a second secondary winding, first and second rectifier switches and a first inductor, wherein a second side of the first secondary winding is connected to a first side of the second secondary winding and the inductor which is further connected to the first voltage output point, and the first rectifier switch is connected between a first side of the first secondary winding and the second voltage output point, and the second rectifier switch is connected between a second side of the second secondary winding and the second voltage output point.

28. The converter of claim 21, wherein the first and second rectifier switches, the first secondary winding and the first and second inductors are comprised within a first rectifier section, and the rectifier circuit further comprises a second rectifier section similar to the first rectifier section, and the first and second rectifier sections are connected in parallel with one another and with the output capacitor and the output.

29. The converter of claim 26, wherein the first and second diodes, the first secondary and second secondary windings and the inductor are comprised within a first rectifier section, and the rectifier circuit further comprises a second rectifier section similar to the first rectifier section, and the first and second rectifier sections are connected in parallel with one another and with the output capacitor and the output.

30. The converter of claim 27, wherein the first and second rectifier switches, the first secondary and second secondary windings and the inductor are comprised within a first rectifier section, and the rectifier circuit further comprises a second rectifier section similar to the first rectifier section, and the first and second rectifier sections are connected in parallel with one another and with the output capacitor and the output.

31. The converter of claim 1, further comprising a second converter similar to the converter of claim 1, wherein the two converters are connected in parallel with one another at their respective inputs and outputs.

32. The converter of claim 31, wherein the output capacitors of the two converters are combined as a single physical capacitor.

33. The converter of claim 31, wherein the two converters have inputs for interleaved gate drive signals, whereby voltage ripple incoming to the output capacitor is reduced, allowing for reduction in the size of the output capacitor.

34. The converter of claim 1, further comprising a second transformer and wherein the high side circuit further comprises a second primary winding of the second transformer, and first and second second primary switches, wherein the first second primary switch is connected between the first voltage input point and a first side of the second primary winding, and the second second primary switch is connected between the first side of the second primary winding and the first voltage output point, and a second side of the second primary winding is connected to a side of the first primary winding, and wherein the rectifier circuit comprises a second rectifier circuit similar to and connected in parallel with the first rectifier circuit, wherein the second rectifier circuit includes a second second rectifier secondary of the second transformer.

35. The converter of claim 34, wherein the second primary switches have inputs for gate drive signals for operating the second primary winding out of phase with the first primary winding.

36. The converter of claim 1, further comprising a second transformer and wherein the high side circuit further comprises a second primary winding of the second transformer, and first and second second primary switches, wherein the first second primary switch is connected between the first voltage input point and a first side of the second primary winding, and the second second primary switch is connected between the first side of the second primary winding and the high side circuit output point, and a second side of the second primary winding is connected to a side of the first primary winding, and wherein the rectifier circuit comprises a second rectifier secondary winding, a second rectifier inductor and a second rectifier switch, wherein a first side of the second rectifier secondary winding is connected to a first side of the first secondary winding and the second rectifier switch is connected between a second side of the second secondary winding and the second voltage output point, and the inductor is connected between the second side of the second secondary winding and the high side circuit output point, not in series with the second rectifier switch.

37. The converter of claim 36, wherein the second primary switches have inputs for gate drive signals for operating the second primary winding out of phase with the first primary winding, and the first and second rectifier circuits have inputs for gate drive signals for operating the rectifier circuit secondary windings phase shifted from one another.

38. The converter of claim 1, further comprising a second transformer and a third transformer, wherein the high side circuit further comprises a second primary winding of the second transformer, and first and second second primary switches, and wherein the first second primary switch is connected between the first voltage input point and a first side of the second primary winding, and the second second primary switch is connected between the first side of the second primary winding and the high side circuit output point, and a second side of the second primary winding is connected to a side of the first primary winding, and wherein the rectifier circuit comprises a second rectifier circuit and a third rectifier circuit each similar to and connected in parallel with the first rectifier circuit, wherein the second rectifier circuit includes a second second rectifier secondary of the second transformer and the third rectifier circuit includes a third third rectifier secondary of the third transformer.

39. The converter of claim 38, wherein the second primary switches have inputs for gate drive signals for operating the second primary winding out of phase with the first primary winding, and no additional drive components are added for the third primary winding, wherein the converter has gate drive inputs for operating the third primary winding partially in phase with the first primary winding and partially in phase with the second primary winding.

40. The converter of claim 1, wherein the first voltage input point is for accepting a DC potential that is positive when compared to a DC potential for acceptance by the second voltage input point.

41. The converter of claim 40, wherein the DC potential of the first voltage output point is positive when compared to the DC potential of the second voltage output point.

42. The converter of claim 1, wherein the input voltage is within a range of 10.8 volts DC to 13.2 volts DC, and the output voltage is within a range of 0.8 volts DC to 1.6 volts DC.

43. The converter of claim 1, wherein the duty cycle is between 40% and 60%.

44. The converter of claim 1, wherein the duty cycle is approximately 50%.

45. The converter of claim 31, wherein the duty cycle of each of the first and second converters is between 40% and 60%.

46. The converter of claim 31, wherein the duty cycle of each of the first and second converters is approximately 50%.

47. The converter of claim 38, wherein the duty cycle of each of the first, second and third transformers is approximately 33⅓%.

48. The converter of claim 1, further comprising a second high side circuit similar to the first high side circuit, connected in parallel with the first high side circuit, and a second rectifier circuit connected in parallel with the first rectifier circuit.

49. The converter of claim 48, further comprising inputs for drive signals to operate the first high side circuit and the first rectifier circuit out of phase with the second high side circuit and the second rectifier circuit, respectively.

50. The converter of claim 48, further comprising gate drive signals for operating the first high side circuit and the first rectifier circuit out of phase with the second high side circuit and the second rectifier circuit, respectively.

51. The converter of claim 1, wherein the output of the first secondary winding is a pulsating voltage and the one-direction waveform is a one-direction voltage.

52. The converter of claim 1, wherein the high side circuit further comprises a resonant tank.

53. The converter of claim 52, wherein the resonant tank comprises a first capacitor in parallel with the first primary winding and a first inductor in series with the first primary winding between the first primary winding and the auxiliary circuit.

54. The converter of claim 53, wherein the resonant tank further comprises a second capacitor in series with the first inductor between the first primary circuit and the auxiliary circuit.

55. The converter of claim 54, wherein the resonant tank further comprises a second inductor in parallel with the first primary winding and the first capacitor.

56. The converter of claim 52, wherein the resonant tank comprises a first inductor and a first capacitor in series with one another between the first primary winding and the auxiliary circuit.

57. The converter of claim 52, wherein the rectifier circuit comprises a full-bridge rectifier.

58. The converter of claim 52, wherein the rectifier circuit comprises a half-bridge rectifier.

59. The converter of claim 52, comprising switches that are controlled by switching frequency control to regulate the output voltage.

60. The converter of claim 52, wherein the auxiliary section is a full-bridge auxiliary section.

61. The converter of claim 60, wherein switches within the auxiliary section are controlled by phase shift control.

62. The converter of claim 57, wherein switches within the rectifier circuit are controlled by phase control.

63. A DC—DC converter for use with a DC power source having a DC voltage across a first voltage source output and a second voltage source output and with a load, the converter comprising:
 a. an input for accepting the DC voltage, the input having a first voltage input point and a second voltage input point,
 b. an output for outputting a converted DC voltage, the output having a first voltage output point and a second voltage output point,
 c. a high side circuit including a first primary winding of a first transformer and an auxiliary section, the high side circuit directly connected in series with a current sensor between the high side circuit output point and the first voltage output point,
 d. a rectifier circuit having a first secondary winding of the first transformer, the rectifier circuit connected between the first voltage output point and the second voltage output point, and
 e. an output capacitor connected between the first voltage output point and the second voltage output point and across the rectifier circuit,
 wherein an output converted DC voltage between the first voltage output point and the second voltage output point has the same polarity as a DC voltage input between the first voltage input point and the second voltage input point,
 wherein the auxiliary section is for causing the first transformer to transfer power from the first primary winding to the first secondary winding and to operate without saturation,
 wherein the high side circuit has one and only one high side circuit output point connected such that current flowing through the first primary winding is directed between the high side circuit output point and the first voltage output point,
 wherein the rectifier circuit is for converting output of the first secondary winding into a one-direction waveform and converting the one-direction waveform into a DC voltage, and wherein the output capacitor is for filtering the converted DC voltage.

64. The converter of claim 63, wherein current sensed at the current sensor is for use in determining the timing of gate drive signals for operating the high side circuit.

65. A method of operating a DC—DC converter for use with a DC power source having a DC voltage across a first voltage source output and a second voltage source output and with a load, the converter comprising:

a. an input for accepting the DC voltage, the input having a first voltage input point and a second voltage input point,
b. an output for outputting a converter DC voltage, the output having a first voltage output point and a second voltage output point,
c. a high side circuit including a first primary winding of a first transformer and an auxiliary section, the high side circuit directly connected between the first voltage input point and the second voltage output point,
d. a rectifier circuit having a first secondary winding of the first transformer, the rectifier circuit connected between the first voltage output point and the second voltage output point, and
e. an output capacitor connected between the first voltage output point and the second voltage output point and across the rectifier circuit,
wherein an output converted DC voltage between the first voltage output point and the second voltage output point has the same polarity as a DC voltage input between the first voltage input point and the second voltage input point,
wherein the auxiliary section is for causing the first transformer to transfer power from the first primary winding to the first secondary winding and to operate without saturation,
wherein the high side circuit has one and only one high side circuit output point connected such that current flowing through the first primary winding is directed between the high side circuit output point and the first voltage output point,
wherein the rectifier circuit is for converting output of the first secondary winding into a one-direction waveform and converting the one-direction waveform into a DC voltage, and
wherein the output capacitor is for filtering the converted DC voltage, the method comprising the steps of:
   driving the auxiliary section to cause the first transformer to transfer power from the first primary winding to the first secondary winding,
   while at the same time driving the auxiliary section to cause the transformer to operate without saturation.

66. A DC—DC converter for use with a DC power source having a DC voltage across a first voltage source output and a second voltage source output and with a load, the converter comprising:

a. an input for accepting the DC voltage, the input having a first voltage input point and a second voltage input point,
b. an output for outputting a converted DC voltage, the output having a first voltage output point and a second voltage output point, and the output having the same polarity as the input,
c. a high side circuit including a first primary winding of a first transformer and an auxiliary section connected for causing the first transformer to transfer power from the first primary winding to a first secondary winding and to operate without saturation, the high side circuit connected between the first voltage input point and the first voltage output point, and the high side circuit having one and only one high side circuit output point connected such that current flowing through the first primary winding is directed between the high side circuit output point and the first voltage output point,
d. a rectifier circuit including the first secondary winding, the rectifier circuit connected between the first voltage output point and the second voltage output point for converting output of the first secondary winding into a one-direction waveform and converting the one-direction waveform into a DC voltage, and
e. an output capacitor connected between the first voltage output point and the second voltage output point and across the rectifier circuit for filtering the converted DC voltage.

* * * * *